US007957490B2

(12) United States Patent
Limberg

(10) Patent No.: US 7,957,490 B2
(45) Date of Patent: Jun. 7, 2011

(54) INSERTION OF REPETITIVE PN SEQUENCES INTO DTV DATA FIELDS

(76) Inventor: Allen LeRoy Limberg, Port Charlotte, FL (US)

( * ) Notice: Subject to any disclaimer, the term of this patent is extended or adjusted under 35 U.S.C. 154(b) by 823 days.

(21) Appl. No.: 11/903,044

(22) Filed: Sep. 20, 2007

(65) Prior Publication Data

US 2008/0075201 A1   Mar. 27, 2008

Related U.S. Application Data

(60) Provisional application No. 60/846,215, filed on Sep. 21, 2006, provisional application No. 60/851,393, filed on Oct. 13, 2006.

(51) Int. Cl.
*H03D 1/24* (2006.01)
*H03K 9/00* (2006.01)
(52) U.S. Cl. ........................ 375/321; 375/316
(58) Field of Classification Search .................. 375/321, 375/320, 316
See application file for complete search history.

(56) References Cited

U.S. PATENT DOCUMENTS

| | | | |
|---|---|---|---|
| 5,065,242 A | 11/1991 | Dieterich et al. | |
| 5,377,207 A | 12/1994 | Perlman | |
| 5,594,496 A * | 1/1997 | Nielsen et al. | 348/21 |
| 6,768,517 B2 * | 7/2004 | Limberg et al. | 348/614 |
| 6,816,204 B2 | 11/2004 | Limberg | |
| 6,975,689 B1 | 12/2005 | Limberg | |
| 7,050,491 B2 | 5/2006 | McDonald | |
| 2002/0181581 A1 | 12/2002 | Birru | |
| 2002/0181599 A1 * | 12/2002 | Choi et al. | 375/240.27 |
| 2002/0186790 A1 | 12/2002 | Choi | |
| 2002/0194570 A1 | 12/2002 | Birru | |
| 2003/0021341 A1 | 1/2003 | Vigil et al. | |
| 2003/0079173 A1 | 4/2003 | Birru | |
| 2004/0028076 A1 | 2/2004 | Strolle et al. | |
| 2004/0057535 A1 | 3/2004 | Strolle et al. | |
| 2004/0104828 A1 * | 6/2004 | Bretl et al. | 341/50 |
| 2004/0237024 A1 * | 11/2004 | Limberg | 714/784 |
| 2006/0244865 A1 | 11/2006 | Simon | |
| 2007/0237263 A1 | 11/2007 | Strolle et al. | |
| 2009/0028247 A1 | 1/2009 | Suh et al. | |
| 2009/0274242 A1 | 11/2009 | Kwon et al. | |

* cited by examiner

*Primary Examiner* — David C. Payne
*Assistant Examiner* — Brian J Stevens

(57) ABSTRACT

An echo cancellation reference signal is generated within a DTV transmitter by approximating a pair of successive repetitive PN sequences with 8VSB symbols arranged in sequences that are capable of being generated by ⅔ trellis coding. The trellis coding is controlled so that the two sequences of 8VSB symbols can be linearly combined to generate a repetitive PN sequence doubled in amplitude and superposed on a constant-value pedestal. After this linear combining is performed by a comb filter in a DTV receiver, the resulting signal is convolved with the PN sequence as known a priori at the DTV receiver. This is a correlation procedure which generates the impulse response of the channel through which the DTV signal was received. The channel impulse response (CIR) provides a basis for computing the weighting coefficients of adaptive channel-equalization filtering in the DTV receiver.

27 Claims, 26 Drawing Sheets

6 SUCCESSIVE DATA SEGMENTS OF A DTV DATA FIELD

| SEGMENT NO. N OF ODD FIELD OF DATA | DSS | 24-SYMBOL TRANSITION CODE NO. 1 | INITIAL 804 SYMBOLS OF 1ST APPROX. REPETITIVE-PN1023 SEQUENCE, HAVING -3, -1, +5 & +7 MODULATION LEVELS |
|---|---|---|---|
| SEGMENT NO. (N+1) OF ODD FIELD OF DATA | DSS | | 828 FURTHER SYMBOLS OF 1ST APPROXIMATED REPETITIVE-PN1023 SEQUENCE, HAVING -3, -1, +5 & +7 MODULATION LEVELS |
| SEGMENT NO. (N+2) OF ODD FIELD OF DATA | DSS | | FINAL 828 SYMBOLS OF 1ST APPROXIMATED REPETITIVE-PN1023 SEQUENCE, HAVING -3, -1, +5 & +7 MODULATION LEVELS |

• • • • • •

| SEGMENT NO. N OF EVEN FIELD OF DATA | DSS | 24-SYMBOL TRANSITION CODE NO. 2 | INITIAL 804 SYMBOLS OF 2ND APPROX. REPETITIVE-PN1023 SEQUENCE, HAVING -3, -1, +5 & +7 MODULATION LEVELS |
|---|---|---|---|
| SEGMENT NO. (N+1) OF EVEN FIELD OF DATA | DSS | | 828 FURTHER SYMBOLS OF 2ND APPROXIMATED REPETITIVE-PN1023 SEQUENCE, HAVING -3, -1, +5 & +7 MODULATION LEVELS |
| SEGMENT NO. (N+2) OF EVEN FIELD OF DATA | DSS | | FINAL 828 SYMBOLS OF 2ND APPROXIMATED REPETITIVE-PN1023 SEQUENCE, HAVING -3, -1, +5 & +7 MODULATION LEVELS |

6 SUCCESSIVE DATA SEGMENTS OF A DTV DATA FRAME, 3 IN THE EARLIER DATA FIELD & 3 IN THE LATER DATA FIELD

Fig. 16

| | | |
|---|---|---|
| SEGMENT NO. 311 OF Mth DATA FIELD — DSS | 24-SYMBOL TRANSITION CODE NO. 1 | INITIAL 804 SYMBOLS OF 1ST APPROX. REPETITIVE-PN1023 SEQUENCE, HAVING -3, -1, +5 & +7 MODULATION LEVELS |
| SEGMENT NO. 312 OF Mth DATA FIELD — DSS | | 828 FURTHER SYMBOLS OF 1ST APPROXIMATED REPETITIVE-PN1023 SEQUENCE, HAVING -3, -1, +5 & +7 MODULATION LEVELS |
| SEGMENT NO. 313 OF Mth DATA FIELD — DSS | | FINAL 828 SYMBOLS OF 1ST APPROXIMATED REPETITIVE-PN1023 SEQUENCE, HAVING -3, -1, +5 & +7 MODULATION LEVELS |
| SEGMENT NO. 1 OF (M+1)th DATA FIELD — DSS | | 828 SYMBOLS OF DFS SIGNAL |
| SEGMENT NO. 2 OF (M+1)th DATA FIELD — DSS | 24-SYMBOL TRANSITION CODE NO. 2 | INITIAL 804 SYMBOLS OF 2ND APPROX. REPETITIVE-PN1023 SEQUENCE, HAVING -3, -1, +5 & +7 MODULATION LEVELS |
| SEGMENT NO. 3 OF (M+1)th DATA FIELD — DSS | | 828 FURTHER SYMBOLS OF 2ND APPROXIMATED REPETITIVE-PN1023 SEQUENCE, HAVING -3, -1, +5 & +7 MODULATION LEVELS |
| SEGMENT NO. 4 OF (M+1)th DATA FIELD — DSS | | FINAL 828 SYMBOLS OF 2ND APPROXIMATED REPETITIVE-PN1023 SEQUENCE, HAVING -3, -1, +5 & +7 MODULATION LEVELS |

7 SUCCESSIVE DATA SEGMENTS OF A DTV DATA FRAME

Fig. 17

| SEGMENT NO. N OF ODD FIELD OF DATA | DSS | 24-SYMBOL TRANSITION CODE NO. 1 | INITIAL 804 SYMBOLS OF 1ST REPETIVE-PN1023 SEQUENCE, HAVING -5 & +3 MODULATION LEVELS |
|---|---|---|---|
| SEGMENT NO. (N+1) OF ODD FIELD OF DATA | DSS | | 828 FURTHER SYMBOLS OF 1ST REPETITIVE-PN1023 SEQUENCE, HAVING -5 & +3 MODULATION LEVELS |
| SEGMENT NO. (N+2) OF ODD FIELD OF DATA | DSS | | FINAL 828 SYMBOLS OF 1ST REPETITIVE-PN1023 SEQUENCE, HAVING -5 & +3 MODULATION LEVELS |
| ⋮ | | | |
| SEGMENT NO. N OF EVEN FIELD OF DATA | DSS | 24-SYMBOL TRANSITION CODE NO. 2 | INITIAL 804 SYMBOLS OF 2ND REPETITIVE-PN1023 SEQUENCE, HAVING -5 & +3 MODULATION LEVELS |
| SEGMENT NO. (N+1) OF EVEN FIELD OF DATA | DSS | | 828 FURTHER SYMBOLS OF 2ND REPETITIVE-PN1023 SEQUENCE, HAVING -5 & +3 MODULATION LEVELS |
| SEGMENT NO. (N+2) OF EVEN FIELD OF DATA | DSS | | FINAL 828 SYMBOLS OF 2ND REPETITIVE-PN1023 SEQUENCE, HAVING -5 & +3 MODULATION LEVELS |

6 SUCCESSIVE DATA SEGMENTS OF A DTV DATA FRAME,
3 IN THE EARLIER DATA FIELD & 3 IN THE LATER DATA FIELD

Fig. 21

| $Z_0$ | 1 | 0 | 1 | 0 | 1 | 0 | 1 |
|---|---|---|---|---|---|---|---|
| S | 0 | 1 | 0 | 1 | 0 | 1 | 0 |
| $Z_1$ | 1 | 0 | 0 | 0 | 0 | 0 | 0 |
| A | 1 | 1 | 0 | 1 | 0 | 1 | 0 |

Fig. 30

| $Z_0$ | 1 | 1 | 0 | 1 | 0 | 1 | 0 |
|---|---|---|---|---|---|---|---|
| S | 1 | 0 | 1 | 0 | 1 | 0 | 1 |
| $Z_1$ | 0 | 0 | 0 | 0 | 0 | 0 | 0 |
| A | 1 | 1 | 0 | 1 | 0 | 1 | 0 |

Fig. 34

| $Z_0$ | 0 | 0 | 1 | 0 | 1 | 0 | 1 |
|---|---|---|---|---|---|---|---|
| S | 0 | 1 | 0 | 1 | 0 | 1 | 0 |
| $Z_1$ | 1 | 1 | 0 | 0 | 0 | 0 | 0 |
| A | 1 | 0 | 0 | 1 | 0 | 1 | 0 |

Fig. 29

| $Z_0$ | 0 | 1 | 0 | 1 | 0 | 1 | 0 |
|---|---|---|---|---|---|---|---|
| S | 1 | 0 | 1 | 0 | 1 | 0 | 1 |
| $Z_1$ | 0 | 0 | 0 | 0 | 0 | 0 | 0 |
| A | 1 | 0 | 1 | 0 | 1 | 0 | 1 |

Fig. 33

| $Z_0$ | 1 | 0 | 1 | 0 | 1 | 0 | 1 |
|---|---|---|---|---|---|---|---|
| S | 0 | 1 | 0 | 1 | 0 | 1 | 0 |
| $Z_1$ | 0 | 0 | 0 | 0 | 0 | 0 | 0 |
| A | 0 | 1 | 0 | 1 | 0 | 1 | 0 |

Fig. 28

| $Z_0$ | 1 | 1 | 0 | 1 | 0 | 1 | 0 |
|---|---|---|---|---|---|---|---|
| S | 1 | 0 | 1 | 0 | 1 | 0 | 1 |
| $Z_1$ | 1 | 1 | 0 | 0 | 0 | 0 | 0 |
| A | 0 | 1 | 0 | 1 | 0 | 1 | 0 |

Fig. 32

| $Z_0$ | 0 | 0 | 1 | 0 | 1 | 0 | 1 |
|---|---|---|---|---|---|---|---|
| S | 0 | 1 | 0 | 1 | 0 | 1 | 0 |
| $Z_1$ | 0 | 1 | 0 | 0 | 0 | 0 | 0 |
| A | 0 | 0 | 0 | 1 | 0 | 1 | 0 |

Fig. 27

| $Z_0$ | 0 | 1 | 0 | 1 | 0 | 1 | 0 |
|---|---|---|---|---|---|---|---|
| S | 1 | 0 | 1 | 0 | 1 | 0 | 1 |
| $Z_1$ | 1 | 0 | 0 | 0 | 0 | 0 | 0 |
| A | 0 | 0 | 1 | 0 | 1 | 0 | 1 |

Fig. 31

INSERTION OF REPETITIVE PN SEQUENCES INTO DTV DATA FIELDS

This application is filed under 35 U.S.C. 111(a) claiming, pursuant to 35 U.S.C. 119(e)(1), benefit of the filing dates of provisional U.S. Pat. App. Ser. No. 60/846,215 filed 21 Sep. 2006 pursuant to 35 U.S.C. 111(b) and of provisional U.S. Pat. App. Ser. No. 60/851,393 filed 13 Oct. 2006 pursuant to 35 U.S.C. 111(b). U.S. Pat. App. Ser. No. 60/851,393 is incorporated herein by reference.

The invention relates to digital television (DTV) signals for over-the-air broadcasting, transmitters for such broadcast DTV signals, and receivers for such broadcast DTV signals, which broadcast DTV signals include novel training signal components for initializing the parameters of adaptive filters used in the DTV receivers for channel-equalization and echo-cancellation.

BACKGROUND OF THE INVENTION

The Advanced Television Systems Committee (ATSC) published a Digital Television Standard in 1995 as Document A/53, hereinafter referred to simply as "A/53" for sake of brevity. Annex D of A/53 titled "RF/Transmission Systems Characteristics" is particularly incorporated by reference into this specification. Annex D specifies that the data frame shall be composed of two data fields, each data field composed of 313 data segments, and each data segment composed of 832 symbols. The 8-level symbols in the 8VSB signal have normalized modulation values of −7, −5, −3, −1, +1, +3, +5 and +7 superposed on a +1.25 normalized modulation value associated with the production of a pilot carrier signal. The 8-level symbols result from ⅔ trellis coding of successive bit pairs or "nibbles". Each 8-level symbol codes a $Z_2$ most significant bit, a $Z_1$ next most significant bit, and a $Z_0$ least significant bit derived from preceding $Z_1$ bits. Annex D specifies that each data segment shall begin with a 4-symbol data-segment-synchronization (DSS) sequence rendered as successive +5, −5, −5 and +5 normalized modulation values. Annex D specifies that the initial data segment of each data field shall contain a data-field synchronization (DFS) signal following the 4-symbol DSS sequence therein. The fifth through 515th symbols in each A/53 DFS signal are a specified PN511 sequence—that is a pseudo-random noise sequence composed of 511 symbols which are rendered as +5 or −5 normalized modulation values. The 516th through 704th symbols in each A/53 DFS signal are a triple-PN63 sequence composed of a total of 189 symbols which are rendered as +5 or −5 normalized modulation values. The middle PN63 sequence is inverted in polarity every other data field. The 705th through 728th symbols in each A/53 DFS signal contain a VSB mode code specifying the nature of the vestigial-sideband (VSB) signal being transmitted. The remaining 104 symbols in the each A/53 DFS signal were reserved, with the last twelve of these symbols being a precode signal that repeats the last twelve symbols of the data in the last data segment of the previous data field. A/53 specifies such precode signal to implement trellis coding and decoding procedures being able to resume in the second data segment of each field proceeding from where those procedures left off processing the data in the preceding data field.

The broadcast TV signal to which the receiver synchronizes its operations is called the principal signal, and the principal signal is usually the direct signal received over the shortest transmission path. Thus, the multipath signals received over other paths are usually delayed with respect to the principal signal and appear as lagging ghost signals. It is possible however, that the direct or shortest path signal is not the signal to which the receiver synchronizes. When the receiver synchronizes its operations to a (longer path) signal that is delayed respective to the direct signal, there will be a leading multipath signal caused by the direct signal. Often there will a plurality of leading multipath signals, caused by the direct signal and other reflected signals of lesser delay than the reflected signal to which the receiver synchronizes. Multipath signals are referred to as "ghosts" in the analog TV art, but in the DTV art multipath signals are customarily referred to as "echoes". The multipath signals that lead the principal signal are referred to as "pre-echoes", and the multipath signals that lag the principal signal are referred to as "post-echoes". The echoes vary in number, amplitude and delay time from location to location and from channel to channel at a given location. Post-echoes with significant energy have been reported as being delayed from the reference signal by as many as sixty microseconds. Pre-echoes with significant energy have been reported leading the reference signal by as many as thirty microseconds. This 90-microsecond or so possible range of echoes of is appreciably more extensive than was generally supposed before spring 2000.

The transmission of DTV signal to the receiver is considered to be through a transmission channel that has the characteristics of a sampled-data time-domain filter that provides weighted summation of variously delayed responses to the transmitted signal. In the DTV signal receiver the received signal is passed through equalization and echo-cancellation filtering that compensates at least partially for the time-domain filtering effects that originate in the transmission channel. This equalization and echo-cancellation filtering is customarily sampled-data filtering performed in the digital domain. Time-domain filtering effects differ for the channels through which broadcast digital television signals are received from various transmitters. Furthermore, time-domain filtering effects change over time for the broadcast digital television signals received from each particular transmitter. Changes referred to as "dynamic multipath" are introduced while receiving radio-frequency signal from a single transmitter when the lengths of reflective transmission paths change, owing to the reflections being from moving objects. Accordingly, adaptive filter procedures are required for adjusting the weighting coefficients of the sampled-data filtering that provides echo-cancellation and equalization.

Computation of the weighting coefficients of the sampled-data filtering that provides equalization and echo-cancellation is customarily attempted using one or more methods of three distinctive general types. Methods of the Wiener type adjust the weighting coefficients of the sampled-data filtering incrementally using auto-regressive decision-feedback based on the effects of multipath just on intermittent echo-cancellation reference (ECR) signals included in the transmitted signal specifically to facilitate such analysis. Methods of the Kalman type adjust the weighting coefficients of the sampled-data filtering incrementally using auto-regressive decision-feedback based on the effects of multipath on all portions of the transmitted signal. Methods of the Dietrich-Greenberg type calculate the weighting coefficients by DFT methods based on the effects of multipath on ECR signals that are repetitive PN sequences. See U.S. Pat. No. 5,065,242 titled "Deghosting apparatus using pseudorandom sequences", which was granted 23 Aug. 1994 to C. B. Dietrich and A. Greenberg.

While the PN511 and triple-PN63 sequences in the initial data segments of the data fields in the ATSC standard DTV signal were originally proposed for use as ECR signals to implement the computation of the weighting coefficients of the sampled-data filtering by a method of Dietrich-Greenberg type, the VSB receiver performance in actual field environments has demonstrated that these sequences inadequately support such computation. So, most DTV manufacturers have used decision-feedback methods of Kalman type that rely on analysis of the effects of multipath on all portions of the transmitted signal for adapting the weighting coefficients of the sampled-data filtering. Decision-feedback methods that utilize least-mean-squares (LMS) method or block LMS method can be implemented in an integrated circuit of reasonable size. Kalman-type decision-feedback provides for tracking dynamic multipath conditions reasonably well after the equalization and echo-cancellation filtering has initially been converged to substantially optimal response by Wiener-type decision-feedback. That is, providing that the sampling rate through the filtering is appreciably higher than symbol rate and providing that the rate of change of the dynamic multipath does not exceed the slewing rate of the decision-feedback loop.

However, these decision-feedback methods tend to be unacceptably slow in converging the equalization and echo-cancellation filtering to nearly optimal response when initially receiving a DTV signal that has severe multipath distortion. Severe multipath distortion conditions include cases where echoes of substantial energy lead or lag the principal received signal by more than ten or twenty microseconds, cases where there is an ensemble of many echoes with differing timings relative to the principal received signal, cases where multipath distortion changes rapidly, and cases where it is difficult to distinguish principal received signal from echo(es) because of similarity in energy level.

Worse yet, convergence is too slow when tracking of dynamic multipath conditions must be regained after the slewing rate of the decision-feedback loop has not been fast enough to keep up with rapid change in the multipath conditions. Data dependent equalization and echo cancellation methods that provide faster convergence than LMS or block-LMS decision-feedback methods are known, but there is difficulty in implementing them in an integrated circuit of reasonable size.

Accordingly, it is desirable to modify A/53 DTV signal to introduce periodically an ECR signal that will "instantly" converge the equalization and echo-cancellation filtering to substantially optimally response. A repetitive pseudo-random noise (PN) sequence has uniquely strong auto-correlation properties, particularly when wrapped around to fit a cylindrical coordinate system. An auto-correlation response corresponding to the impulse response of the channel supplying a repeating long PN sequence is simply generated by passing an interior cycle of the repeating sequence through a convolution filter with a kernel having weights in accordance with the PN sequence. U.S. Pat. No. 6,816,204 granted to A. L. R. Limberg on 9 Nov. 2004 and titled "Ghost cancellation reference signals for broadcast digital television signal receivers and receivers for utilizing them" describes the insertion of repetitive PN511 sequences into 8VSB digital television signals such that data segment sync signals are subsumed into the sequences. Limberg presumed an echo range of only 45 microseconds or so, and the ECR signals specifically described rely on repetitive PN511 sequences with baud-rate symbols rendered as +5 or −5 values. U.S. Pat. No. 6,768,517 granted to A. L. R. Limberg, J. D. McDonald and C. B. Patel on 27 Jul. 2004 and titled "Repetitive-PN1023-sequence echo-cancellation reference signal for single-carrier digital television broadcast systems" describes the insertion of repetitive-PN1023 sequences into 8VSB digital television signals such that data segment sync signals are subsumed into the sequences. These longer sequences better accommodate the 90-microsecond or so possible range of echoes that was reported from field observations in spring 2000.

The channel impulse response (CIR) obtained in the response of a PN1023 match filter to a repetitive-PN1023 sequence inserted into an 8VSB digital television signal also provides a good basis for subsequent DFT computations of CIR under dynamic multipath reception conditions. These subsequent DFT computations involve sliding window procedures using auto-correlation of successive blocks of a few thousand consecutive 8VSB symbols throughout data fields. Such computations are described in U.S. Pat. No. 6,975,689 titled "Digital modulation signal receiver with adaptive channel equalization employing discrete Fourier transforms" granted on 13 Dec. 2005 to A. L. R. Limberg and J. D. McDonald. Further such computations are described in U.S. Pat. No. 7,050,491 titled "Adaptive equalization of digital modulating signal recovered from amplitude-modulated signal subject to multipath" granted on 23 May 2006 to J. D. McDonald and A. L. R. Limberg.

It was proposed that the ECR signal composed of repetitive-PN1023 sequences be put into data segments contiguous with the data segment containing the DFS signal. ATSC members deemed it highly desirable that an ECR signal not interfere with the operation of DTV signal receivers already in the field. Unfortunately, there were legacy DTV receivers already in the field that could not accommodate the cessation of trellis decoding other than for the initial segments of data fields containing DFS signals. So, the proposal to amend A/53 to permit insertion of ECR signals composed of repetitive-PN1023 sequences into DTV signals was not taken up.

In 2005 the DTV industry began to give serious attention to the problems of on-channel auxiliary transmitters for DTV signals used for implementing a single-frequency network (SFN). One of the problems was that there was no provision in A/53 for standardizing the phasing of the ⅔ trellis coding that converted bit pairs to bit triplets defining 8-level data symbols. Information to standardize the phasing of the ⅔ trellis coding for all transmitters broadcasting the same signal on the same channel was necessary. It was needed to avoid DTV receivers receiving the signal from more than one of the transmitters being unable to resolve phasing of the ⅔ trellis coding. Brief transition codes that could standardize phasing of the ⅔ trellis coding were known, but there remained the problem of how best to insert them into the fields of interleaved and trellis-coded data supplied to the DTV signal as modulating signal. The procedure used to synchronize ⅔ trellis coding (and pre-coding, if that were used to help overcome interference from co-channel NTSC signal) is called "determinate trellis resetting" or "DTR" for short.

Another problem associated with on-channel repeaters for DTV signals is that some DTV receivers receiving the signal from more than one transmitter will be subject to multipath reception afflicted with strong pre-echoes. These pre-echoes can be advanced by several microseconds and can be nearly as strong as the principal signal, which defines the "cursor" tap in time-domain equalization filtering. The equalization of DTV signals with strong pre-echoes is advantageously done by pre-filtering the signals so as to alter the time-domain spectrum to one in which the principal signal is substantially stronger than echo signals, especially pre-echo signals. The pre-filter can be one the kernel of which mirrors the time-domain channel impulse response (CIR) as described by R. W. Citta, S. M. LoPresto and J. Xia in U.S. Pat. No. 6,650,700 granted 18 Nov. 2003 and titled "Dual path ghost eliminating equalizer with optimum noise enhancement". The pre-filter can be one which combines the received DTV signal with itself as subjected to suitable delay as A. L. R. Limberg described in his U.S. Pat. No. 7,151,797 granted 19 Dec. 2006 and titled "Adaptive K-factor-improvement filter for receiver of radio signals subject to multipath distortion". A more complex pre-filter is described in U.S. Pat. No. 7,072,392 titled "Equalizer for Time Domain Signal Processing", which issued 4 Jul. 2006 to J. Xia, R. W. Citta, S. M. LoPresto and W. Zhang.

The design of each of these pre-filters is predicated on knowledge of the CIR of the DTV signal as originally received. The need for expeditiously ascertaining CIR suggested that an ECR signal be inserted into the interleaved data field which ECR would support computation of CIR by a Dietrich-Greenberg type of method. The problem is that the ECR signal has to comply with the ⅔ trellis coding prescribed by A/53 in order not to disrupt the proper operation of legacy DTV receivers. The repetitive PN511 sequences described in U.S. Pat. No. 6,816,204 and the repetitive-PN1023 sequences described in U.S. Pat. No. 6,768,517 do not conform to symbols generated by ⅔ trellis coding because all the $Z_0$ bits in the symbols are zero-valued. Approximating a repetitive PN sequence by symbols that could be generated by ⅔ trellis coding generally introduces $Z_0$ bits that are variably ONEs and ZEROes. The presence of these variable $Z_0$ bits compromises the unique auto-correlation properties of the repetitive PN sequence and introduces appreciable errors into the CIR generated by auto-correlation filtering.

The insertion of an ECR signal that occupies a number N of contiguous segments of the interleaved data field affects bytes in a number (N+51) data segments of the data field without interleaving. It would be desirable that these (N+51) data segments as so modified not disrupt the operation of legacy DTV receivers nor noticeably degrade reception.

In a U.S. published Pat. App. No. 20030021341 published 30 Jan. 2003 and entitled "Method of effective backwards compatible ATSC-DTV multipath equalization through training symbol induction" A. J. Vigil and M. A. Belkerdid describe ECR signals dispersed throughout the interleaved data field. Their patent application indicates that these ECR signals will compromise R-S codewords so as to interfere with the operation of legacy DTV receivers. In their patent application Vigil and Belkerdid suggested two mechanisms for enabling legacy DTV receivers to reject the compromised R-S codewords. One is to use a special packet identifier (PID) sequence in the headers of the codewords; the other is to modify the R-S codewords so legacy DTV receivers will find them to be incapable of being corrected. If an ECR signal is contiguous over N segments of the interleaved data field, it is probably impractical to use special PIDs to identify R-S codewords affected by bytes of ECR signal. U.S. published Pat. App. No. 20030021341 provides no specific description of how to insure that legacy DTV receivers will find modified R-S codewords to be incapable of being corrected.

U.S. Pat. No. 5,377,207 granted 27 Dec. 1994 to M. Perlman and titled "Mappings between codewords of two distinct (N, K) Reed-Solomon codes over GF ($2^J$)". Perlman points out that a Berlekamp alternative (N, K) R-S code is orthogonal to the conventional-architecture (N, K) R-S code. That is, R-S decoders in legacy receivers will find Berlekamp-architecture (207, 187) R-S codewords incapable of correction. If robust transmissions used Berlekamp-architecture (207, 187) R-S coding, apparently there would no longer be any need to worry about legacy receiver reception of ordinary 8VSB data being disrupted. Furthermore, substantially the same hardware can be used for decoding either type of (N, K) R-S code. According to U.S. Pat. No. 5,490,154 granted to R. Mester on 6 Feb. 1996 and titled "Method of and circuit arrangement for decoding RS-coded data signals", Philips used substantially the same hardware for decoding either of the EBU D1 and ISO R-S codes employed in magnetic tape recording. It is known theoretically that other "orthogonal" (207, 187) R-S codes that sustain error correction besides the type described by Berlekamp exist. They differ from the A/53 standard (207, 187) R-S code in that their Galois fields are generated by primitive field generator polynomials with zero coefficient placements different from those in the primitive field generator polynomial shown in FIG. 6 of A/53 Annex D. (Other than in this paragraph, in this specification the variables N and K stand for things other than RS codeword length and data packet length.)

SUMMARY OF THE INVENTION

In general, the invention concerns how to introduce periodically recurring echo-cancellation reference (ECR) signals into 8VSB signals so as to span complete data segments in at least some of the byte-interleaved data fields. More particularly, the invention concerns the inclusion of repetitive-PN sequences within interleaved and trellis-coded data fields of digital television (DTV) broadcast signals without disrupting trellis coding. Aspects of the invention concern various DTV receiver apparatus for utilizing the repetitive-PN sequences as ECR signals.

DTV receiver apparatus embodying some aspects of the invention utilize an ECR signal within a digital television (DTV) broadcast signal manifested in electromagnetic field variations, which ECR signal is generated by approximating a pair of successive repetitive PN sequences with −3, −1, +5 and +7 symbols arranged so they could be generated by ⅔ trellis coding. Preferably each of these repetitive PN sequences is phased such that DSS sequences are subsumed into the repetitive PN sequence as closely as possible. The $Z_1$ bit in each of these symbols is a ONE, so successive $Z_0$ bits in each of the twelve phases of trellis coding will have a repetitive ONE, ONE, ZERO, ZERO pattern. Properly staggering the respective ONE, ONE, ZERO, ZERO patterns in the two successive approximated repetitive PN sequences of the same type permits the sequences to be summed to generate a repetitive PN sequence doubled in amplitude and superposed on a constant-value pedestal. After this sort of summation is performed by a comb filter in a DTV receiver, the sum signal is convolved with the PN sequence as known a priori at the DTV receiver. This is a correlation procedure which generates the CIR—i. e., the impulse response of the channel through which the DTV signal was received. In this aspect of the invention the amplitude of the pilot carrier wave is substantially increased during the ECR signal. This is beneficial to a DTV receiver of proper design, but may disrupt reception in some legacy DTV receivers.

DTV receiver apparatus embodying other aspects of the invention utilize an ECR signal within a DTV broadcast signal manifested in electromagnetic field variations, which ECR signal is generated by approximating a repetitive PN sequence with −5 and +3 symbols. This repetitive PN sequence is convolved with the PN sequence as known a priori at the DTV receiver to generate the CIR. In this aspect of the invention the amplitude of the pilot carrier wave is decreased during the ECR signal, which is apt to disrupt reception in some legacy DTV receivers.

DTV receiver apparatus embodying still other aspects of the invention utilize an ECR signal within a DTV broadcast signal manifested in electromagnetic field variations, in which DTV broadcast signal the amplitude of the pilot carrier wave is not substantially increased or decreased during the ECR signal. A pair of successive repetitive PN sequences with −3, −1, +5 and +7 symbols arranged so they could be generated by ⅔ trellis coding is interleaved symbol by symbol with another pair of successive repetitive PN sequences with −7, −5, +1 and +3 symbols arranged so they could be generated by ⅔ trellis coding. The resulting ECR signal is comb filtered in the DTV receiver apparatus, and the comb filter response is filtered to suppress a pedestal before being convolved with either of the PN sequences as known a priori at the DTV receiver. This is a correlation procedure that generates the CIR.

Figure 5:
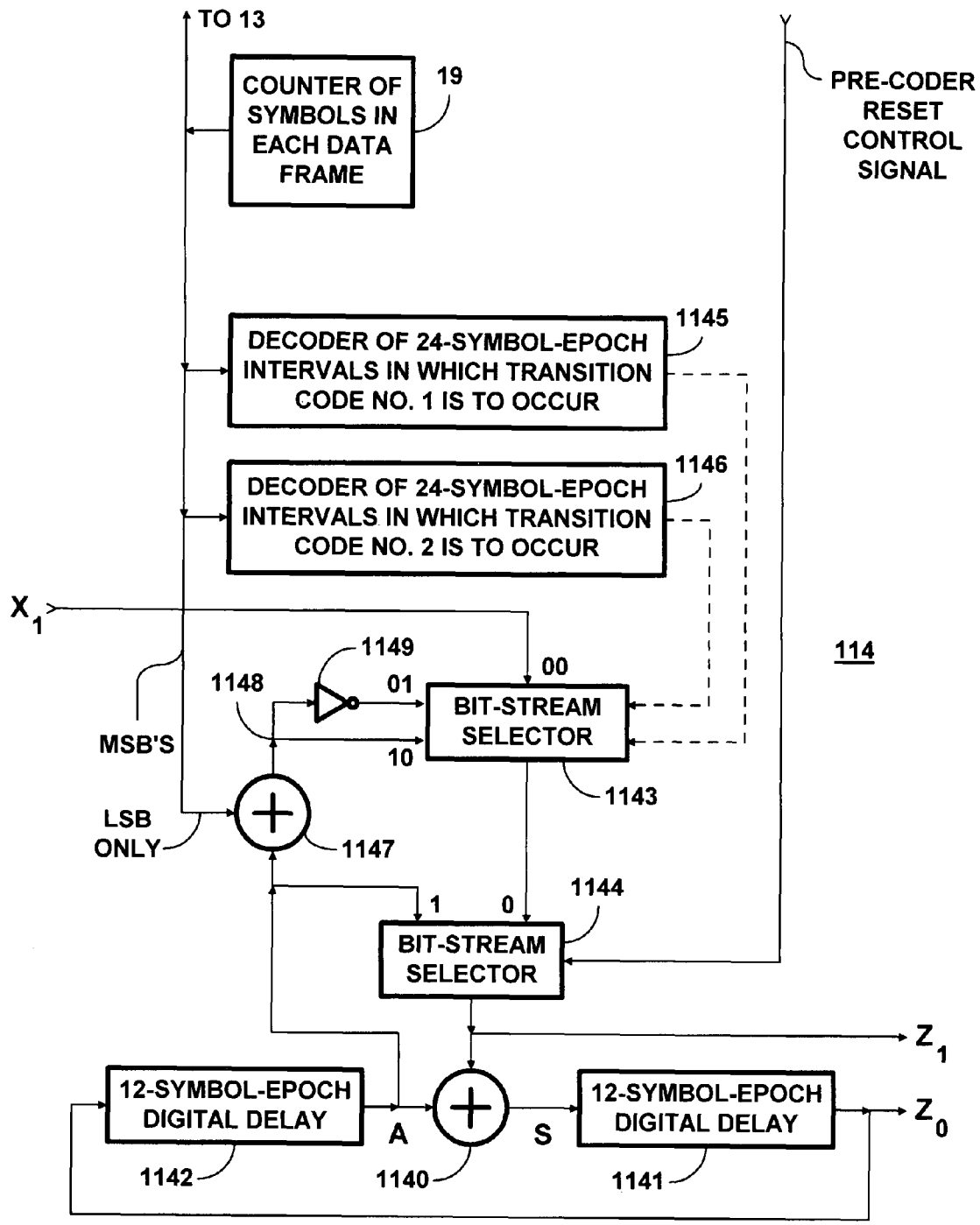
FIG. 5 is a schematic diagram showing in more detail a special 12-phase trellis encoder included in some embodiments of the FIG. 3 DTV transmitter apparatus.

Each of FIGS. 6, 7, 8, 9, 10, 11, 12 and 13 is a table showing states in one phase of the 12-phase coding performed by the FIG. 5 trellis encoder at the outset of approximated repetitive PN sequence transmission, given a particular set of previous transmission conditions.

Figure 3:
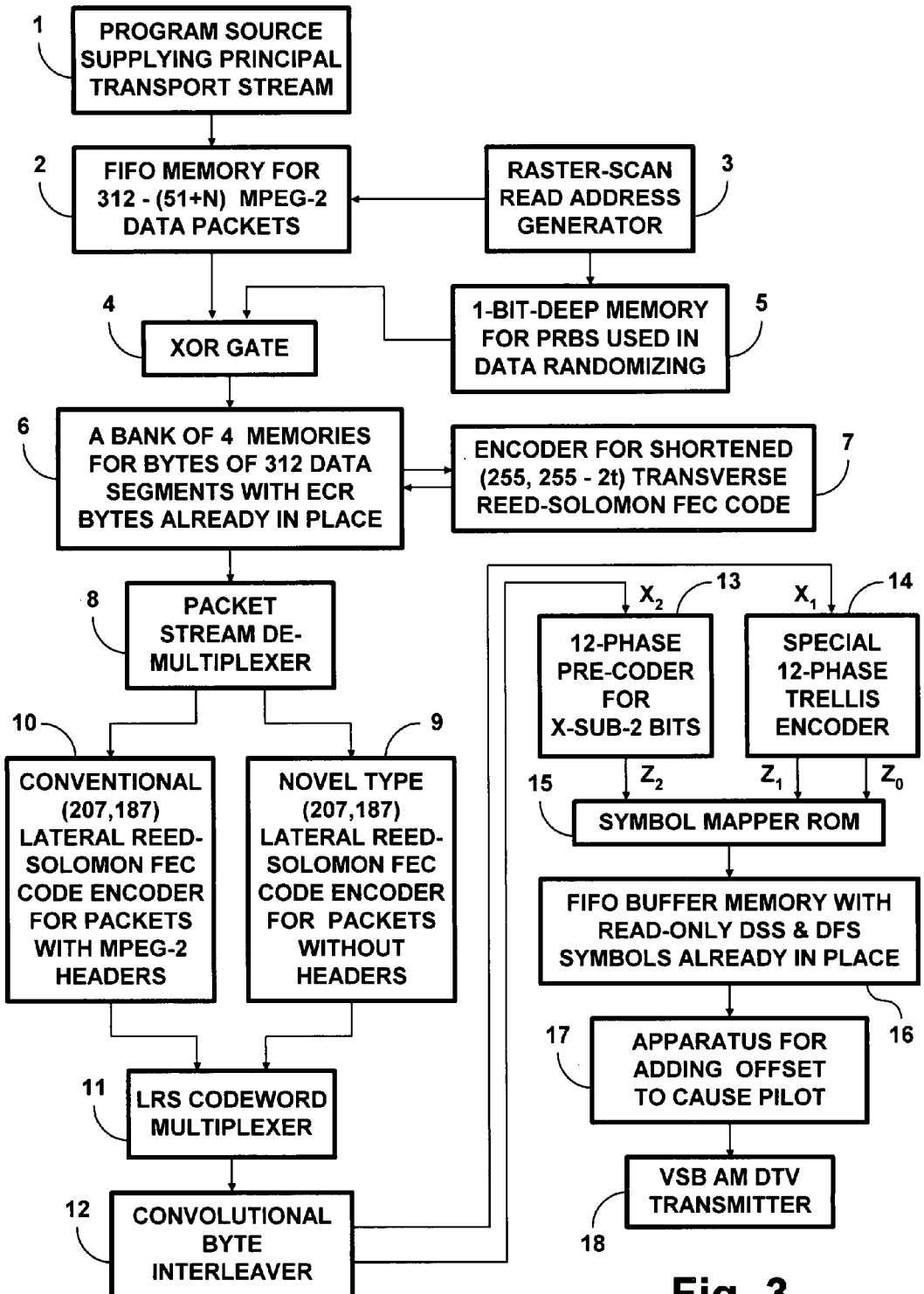
FIG. 3 is a schematic diagram of DTV transmitter apparatus for transmitting DTV signals that, in accordance with an aspect of the invention, include echo-cancellation reference (ECR) signals in the concluding portions of selected 1664-symbol segments within the ⅔ trellis-coded data fields.
Figure 14:
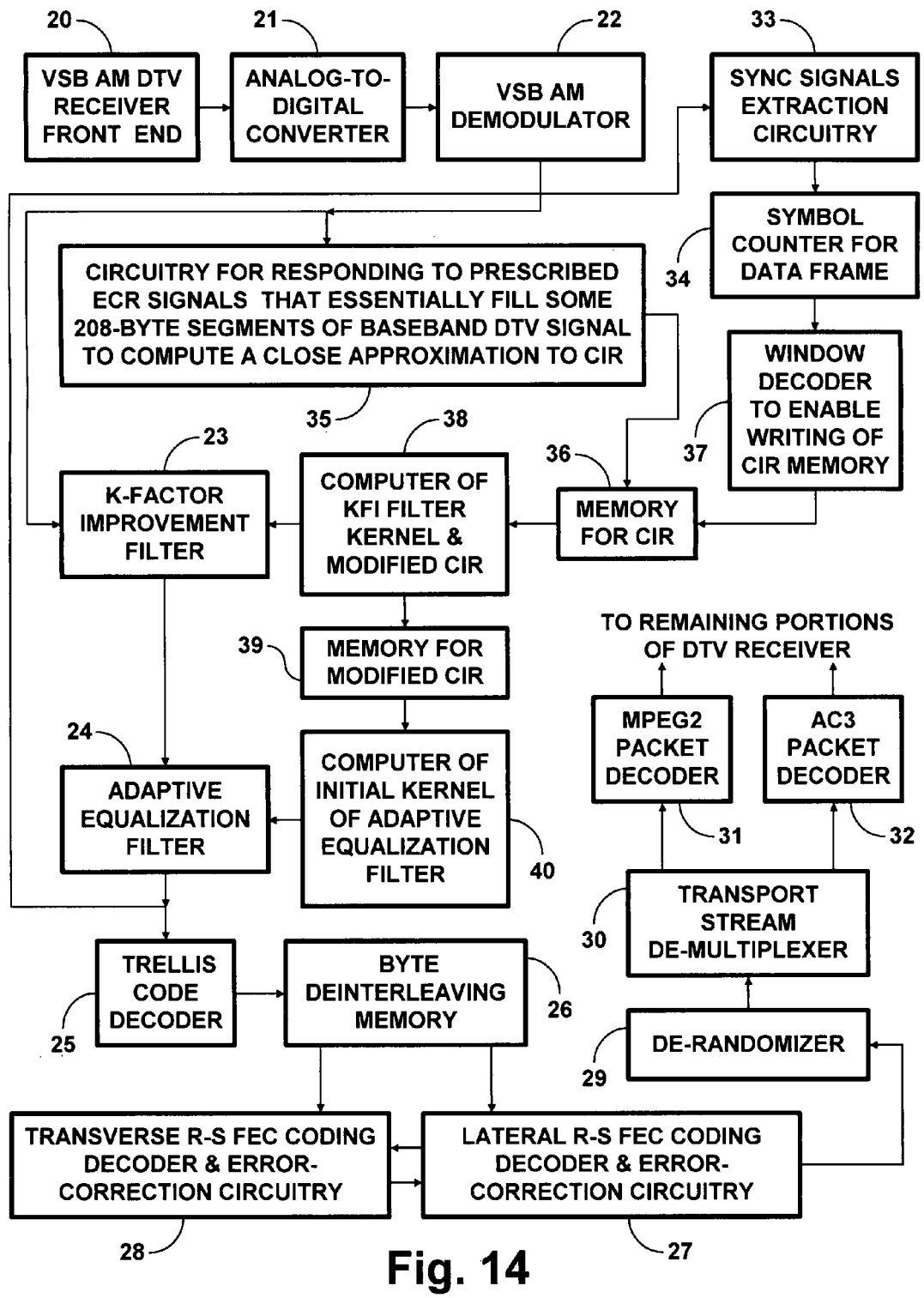

FIG. 14 is a schematic diagram of generic DTV receiver apparatus that, in accordance with an aspect of the invention, extracts CIR from prescribed training signal sequences that occupy most of selected ⅔ trellis coded data segments in DTV signals transmitted from the FIG. 3 generic DTV transmitter apparatus.

Figure 1:
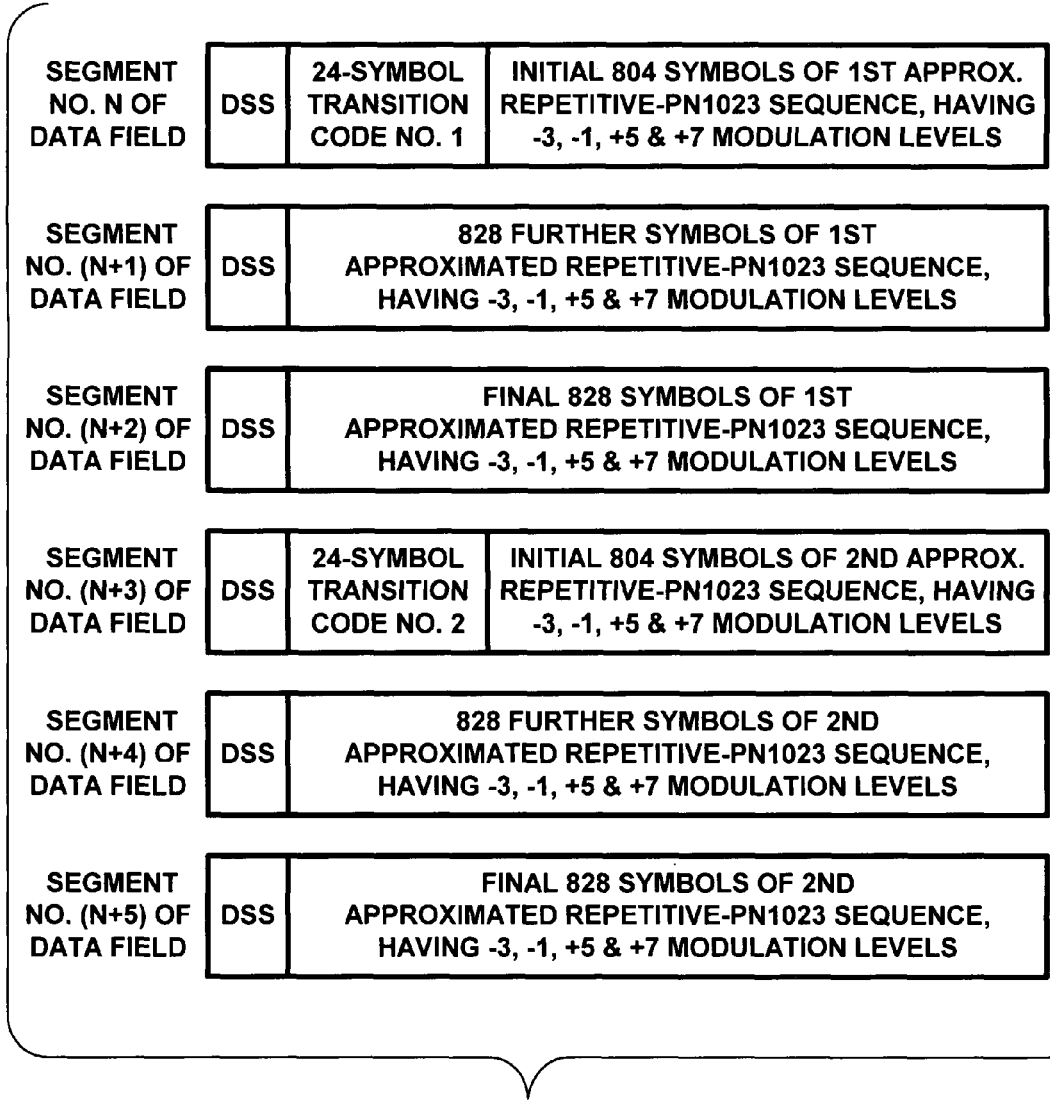
FIG. 1 is a diagram of six successive segments of a field of interleaved DTV data that, in accordance with an aspect of the invention, contain a pair of approximated repetitive-PN1023 sequences each composed mostly of symbols having −3, −1, +5 and +7 normalized modulation levels.
Figure 15:
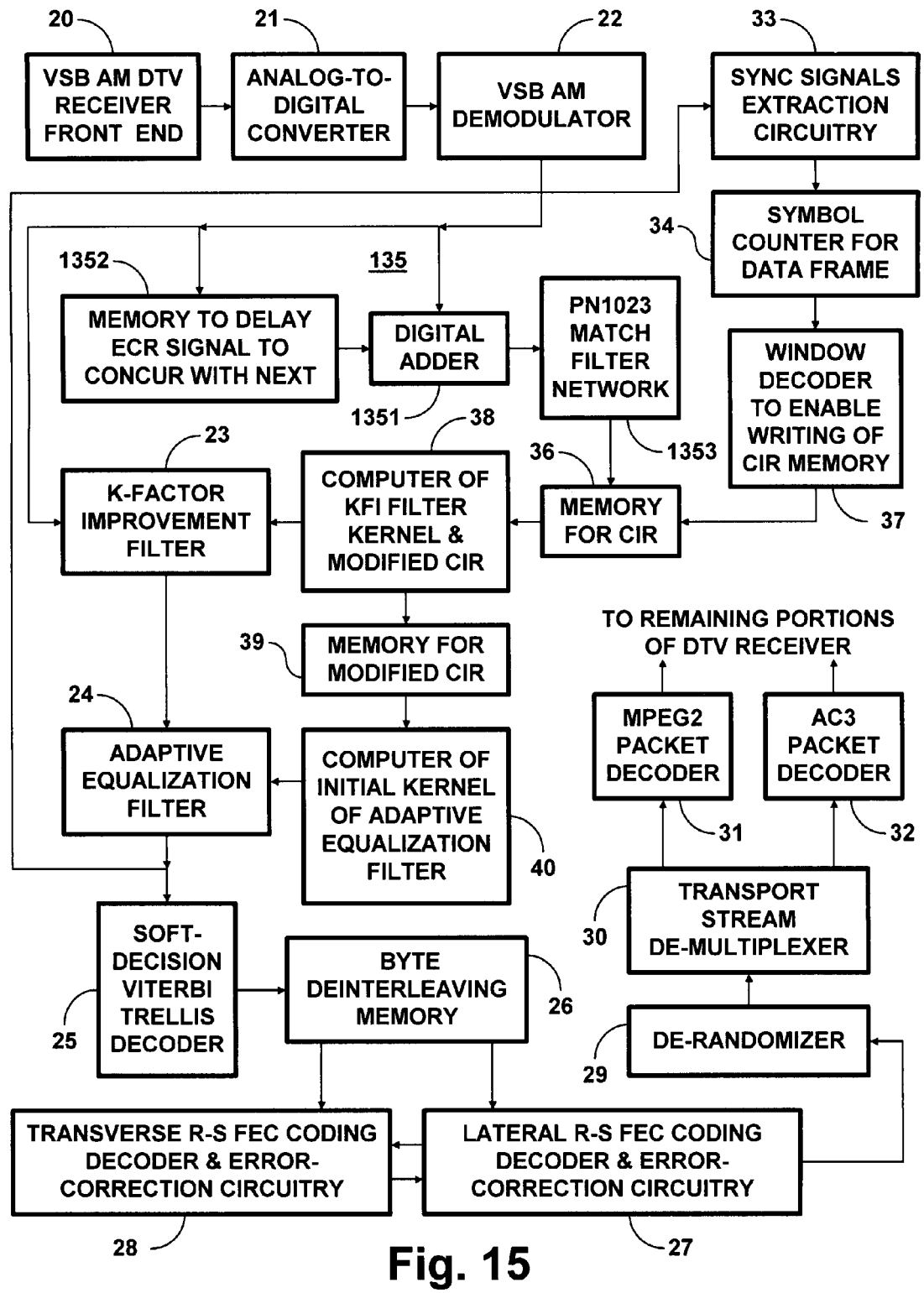

FIG. 15 is a schematic diagram of DTV receiver apparatus for receiving DTV signals including ECR signals per FIG. 1, 16 or 17 of a specific type in which the second repetitive-PN1023 sequence is similar to the first repetitive-PN1023 sequence in each ECR signal and, in accordance with an aspect of the invention, extracting CIR from the approximated repetitive-PN1023 sequences that are included in those ECR signals.

FIG. 16 is a diagram of three successive segments in each of two successive fields of interleaved DTV data, each of which groups of three successive segments in accordance with an aspect of the invention contains a respective approximated repetitive-PN1023 sequence composed mostly of symbols having −3, −1, +5 and +7 normalized modulation levels.

FIG. 17 is a diagram of DTV signal wherein, in accordance with an aspect of the invention, a respective DFS sequence is interposed between halves of ECR signals each containing a respective approximated repetitive-PN1023 sequence composed mostly of symbols having −3, −1, +5 and +7 normalized modulation levels.

Figure 18:
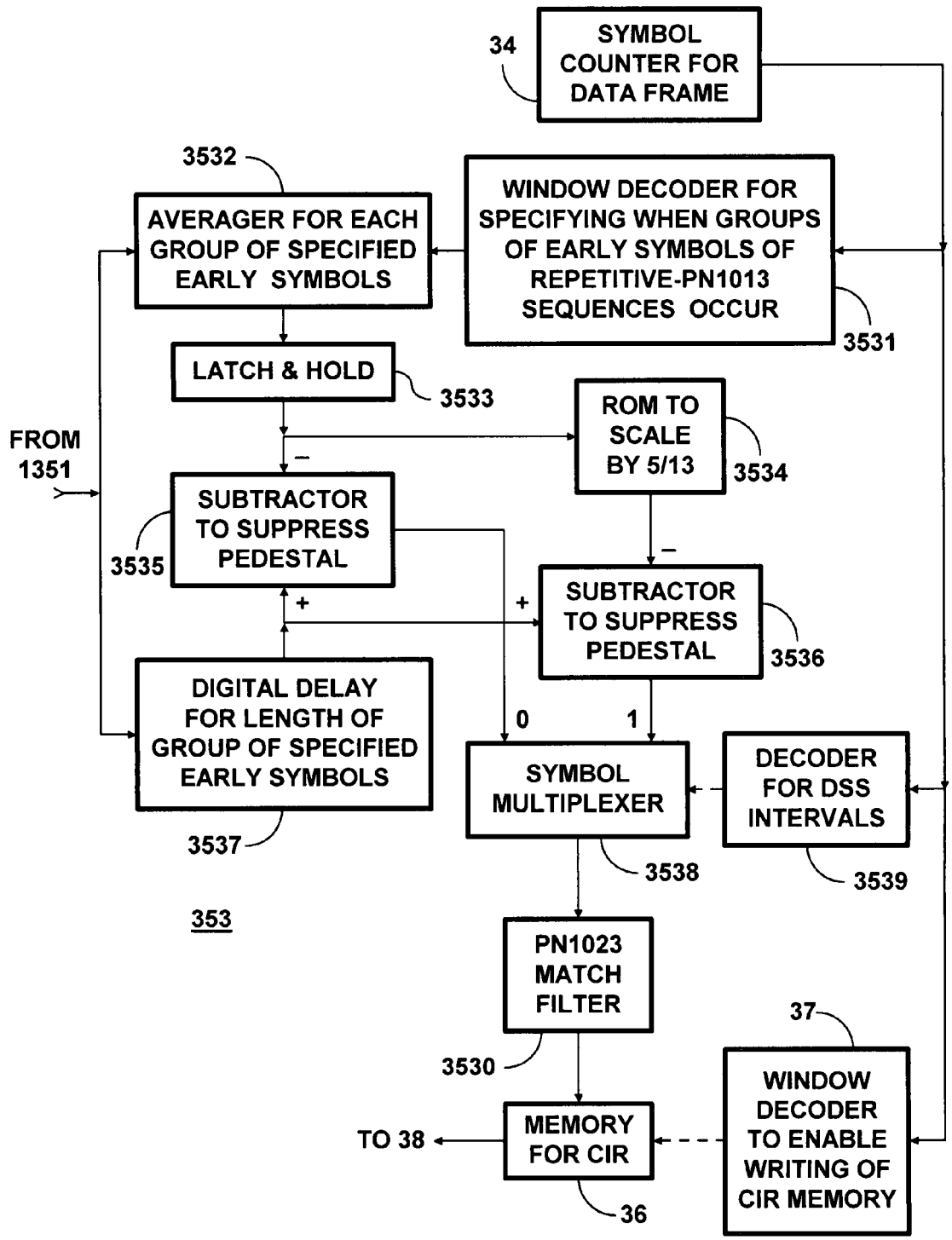
Figure 19:
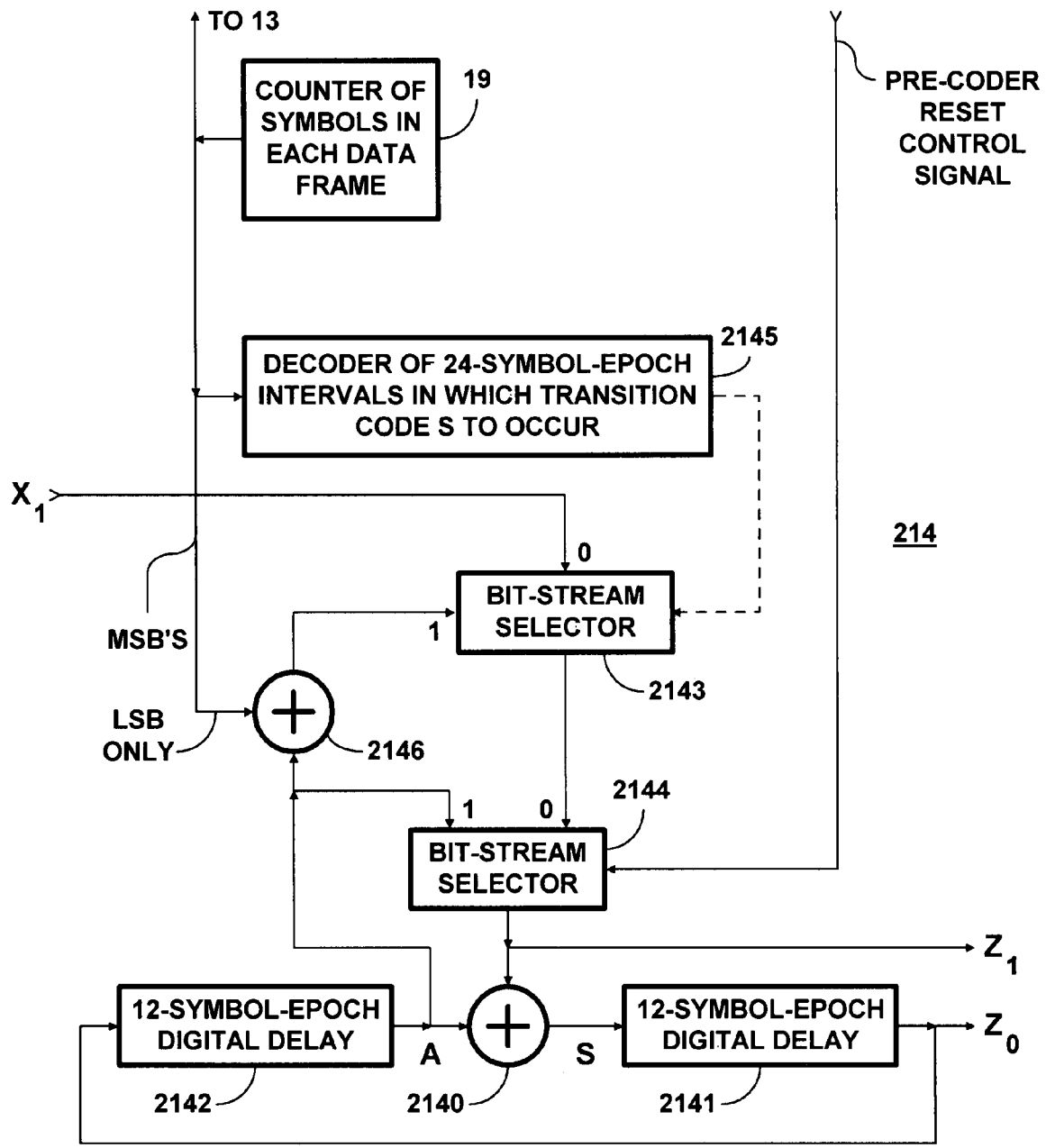

FIG. 18 is a schematic diagram showing in more detail the PN1023 match filter network including pedestal-suppression circuitry, as used in the DTV receiver apparatuses of FIGS. 15, 17 and 19.

FIG. 19 is a schematic diagram showing in more detail an alternative type of special 12-phase trellis encoder included in specific embodiments of the FIG. 3 DTV transmitter apparatus that transmit DTV signals including ECR signals in which the repetitive-PN components of the initial and final halves of each ECR signal are complementary to each other, rather than being the same.

Figure 20:
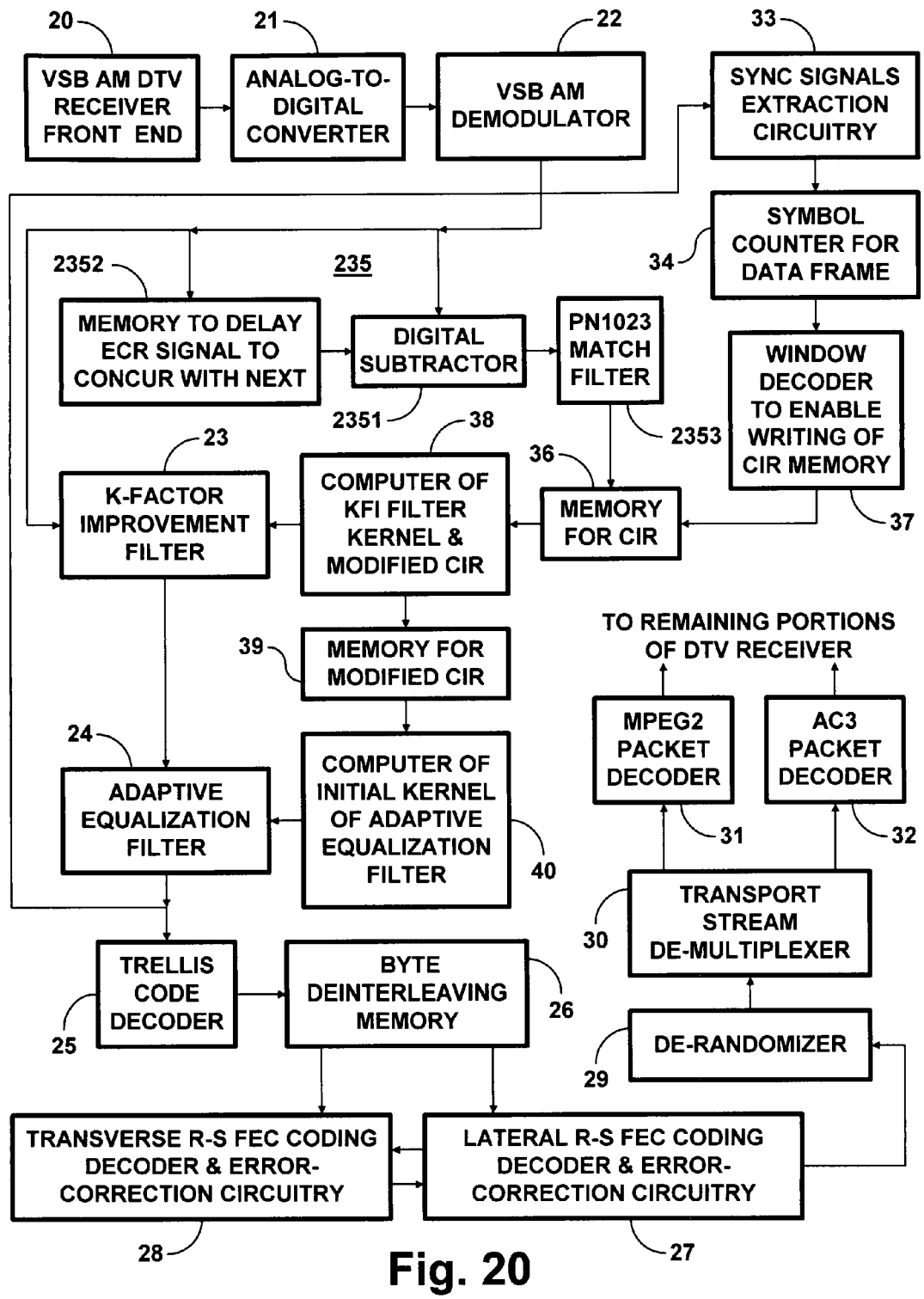

FIG. 20 is a schematic diagram of DTV receiver apparatus which in accordance with an aspect of the invention is suited for extracting CIR from received DTV signals incorporating ECR signal as shown in FIG. 1, 16 or 17 that is of the type in which the second repetitive-PN1023 sequence is complementary to the first repetitive-PN1023 sequence in each ECR signal, rather than being the same.

FIG. 21 is a diagram of respective groups of three successive segments similarly located in each of two successive fields of interleaved DTV data, each of which groups of three successive segments in accordance with an aspect of the invention contains a respective approximated repetitive-PN1023 sequence composed mostly of symbols having −5 and +3 normalized modulation levels.

Figure 22:
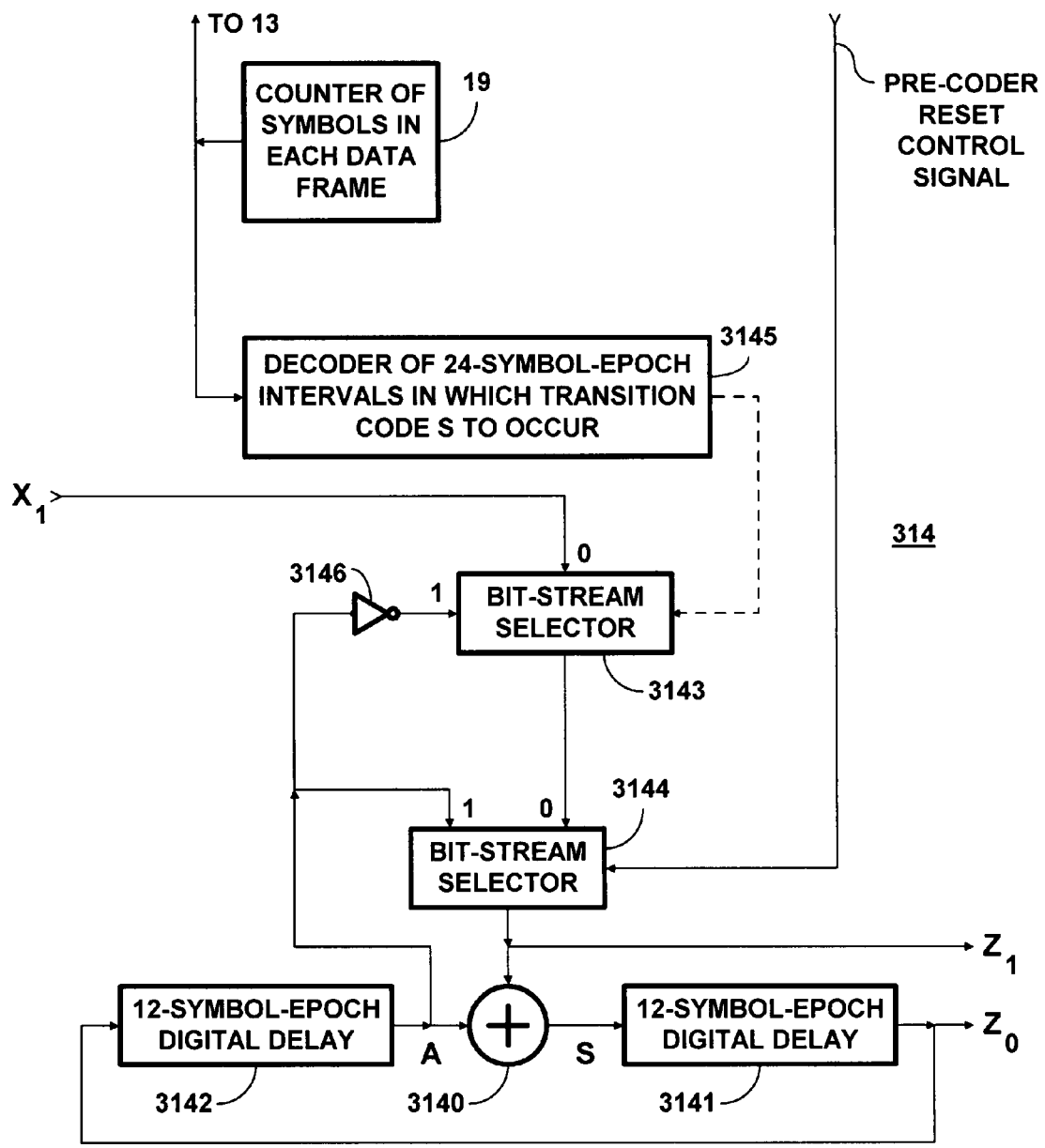

FIG. 22 is a schematic diagram showing in more detail a special 12-phase trellis encoder included in specific embodiments of the FIG. 3 DTV transmitter apparatus for transmitting DTV signals including ECR signals per FIG. 21.

Figure 23:
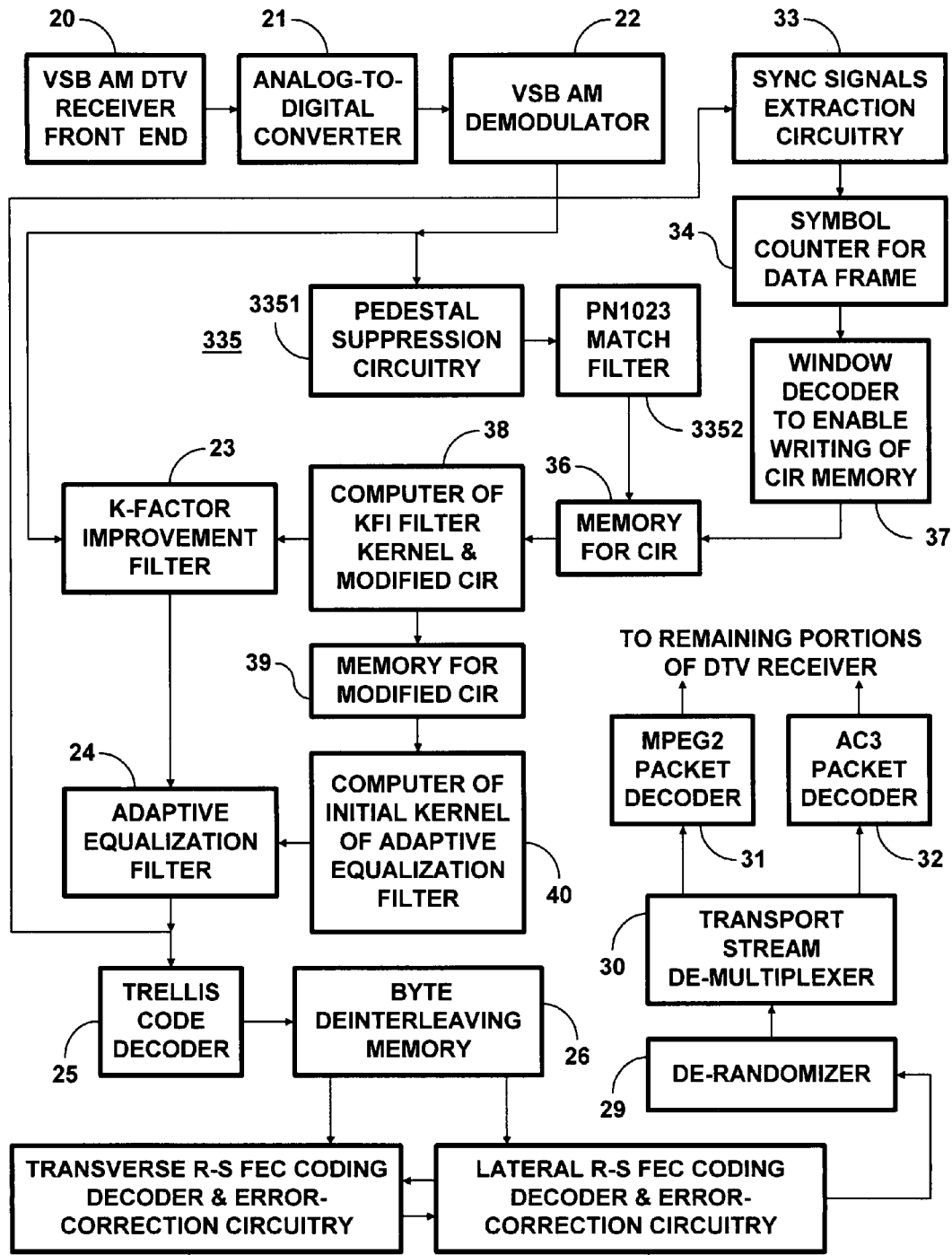

FIG. 23 is a schematic diagram of DTV receiver apparatus for receiving DTV signal transmissions including ECR signals per FIG. 21 of a type in which the second repetitive-PN 1023 sequence is similar to the first repetitive-PN1023 sequence in each ECR signal and, in accordance with an aspect of the invention, extracting CIR from the approximated repetitive-PN1023 sequences that are included in received DTV signals.

Figure 24:
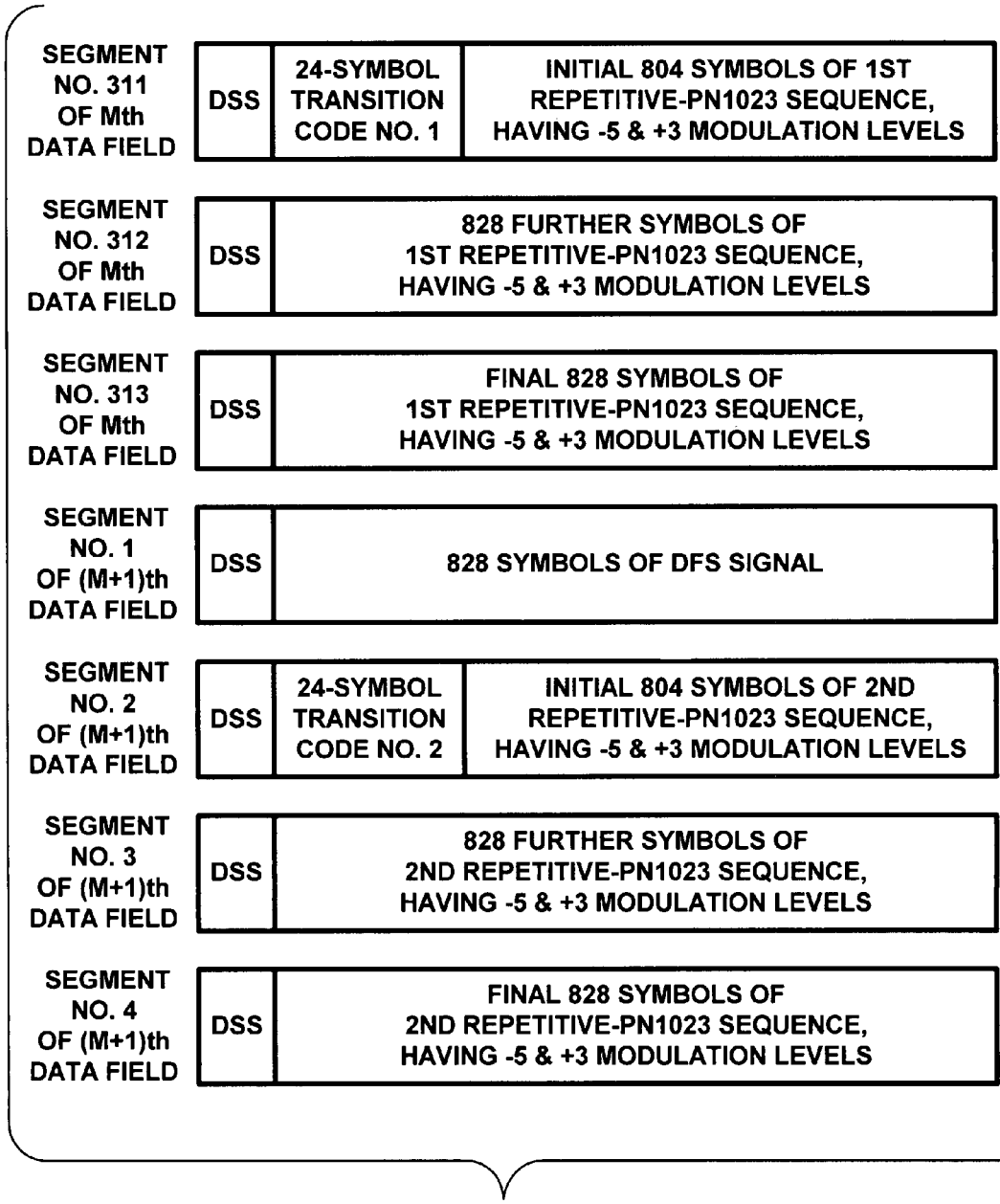

FIG. 24 is a diagram of respective groups of three successive segments concluding the earlier and beginning the later of two successive fields of interleaved DTV data, each of which groups of three successive segments in accordance with an aspect of the invention contains a respective approximated repetitive-PN1023 sequence composed mostly of symbols having −5 and +3 normalized modulation levels.

Figure 25:
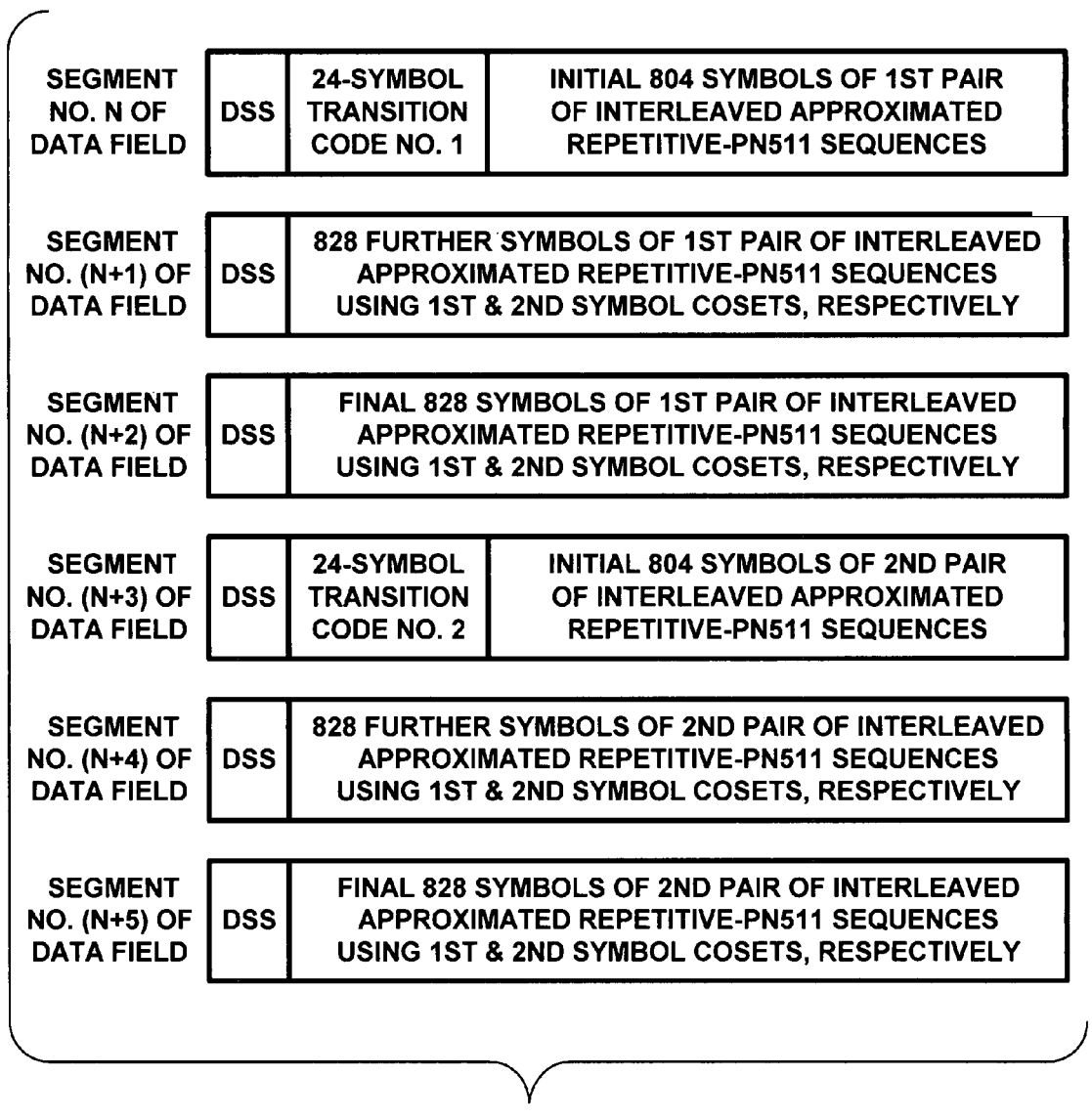

FIG. 25 is a diagram of six successive segments of a field of interleaved DTV data that in accordance with an aspect of the invention contain an ECR signal in each half of which a pair of approximated repetitive-PN511 sequences are interleaved with each other symbol by symbol.

Figure 26:
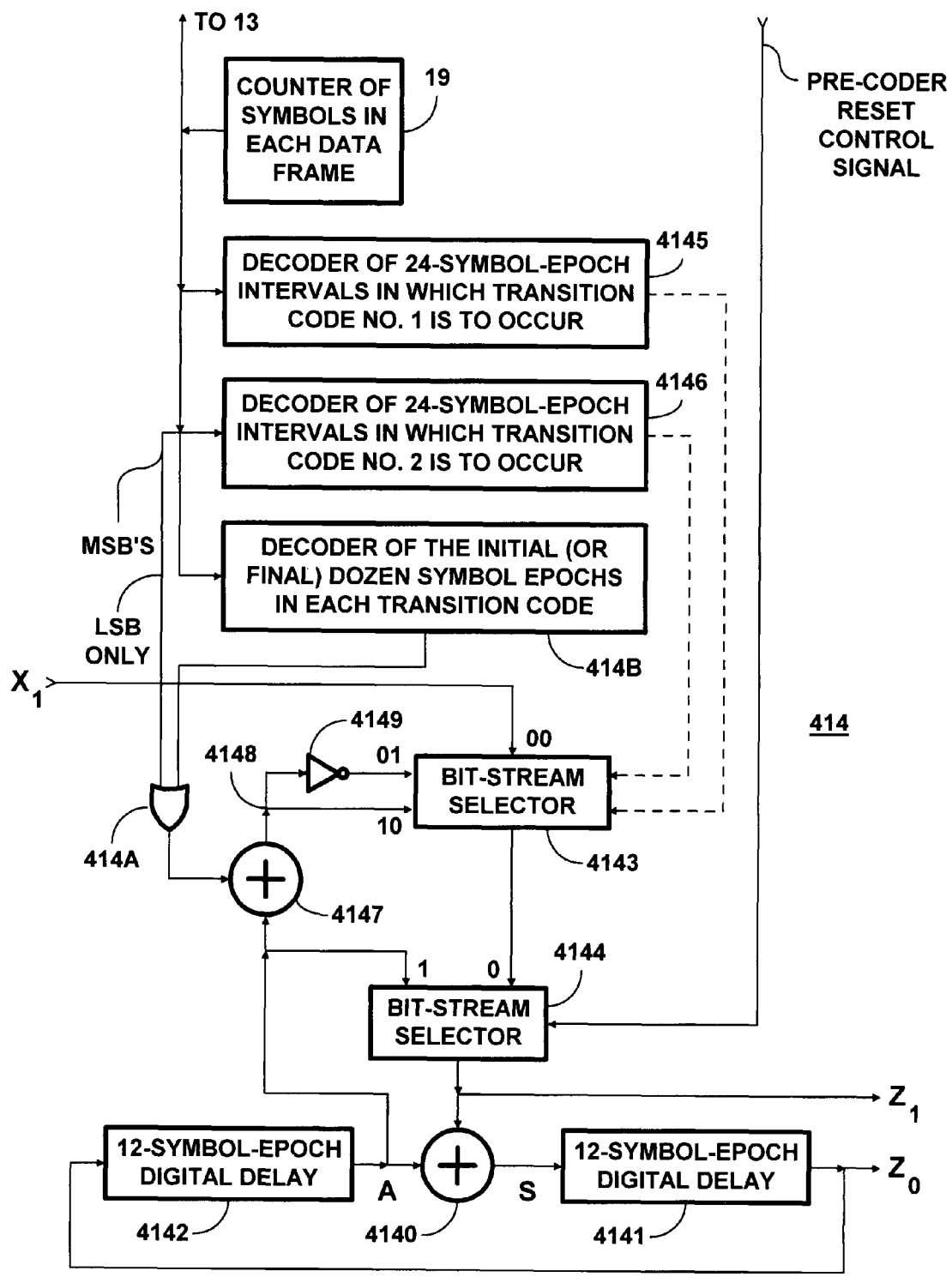
Figure 37:
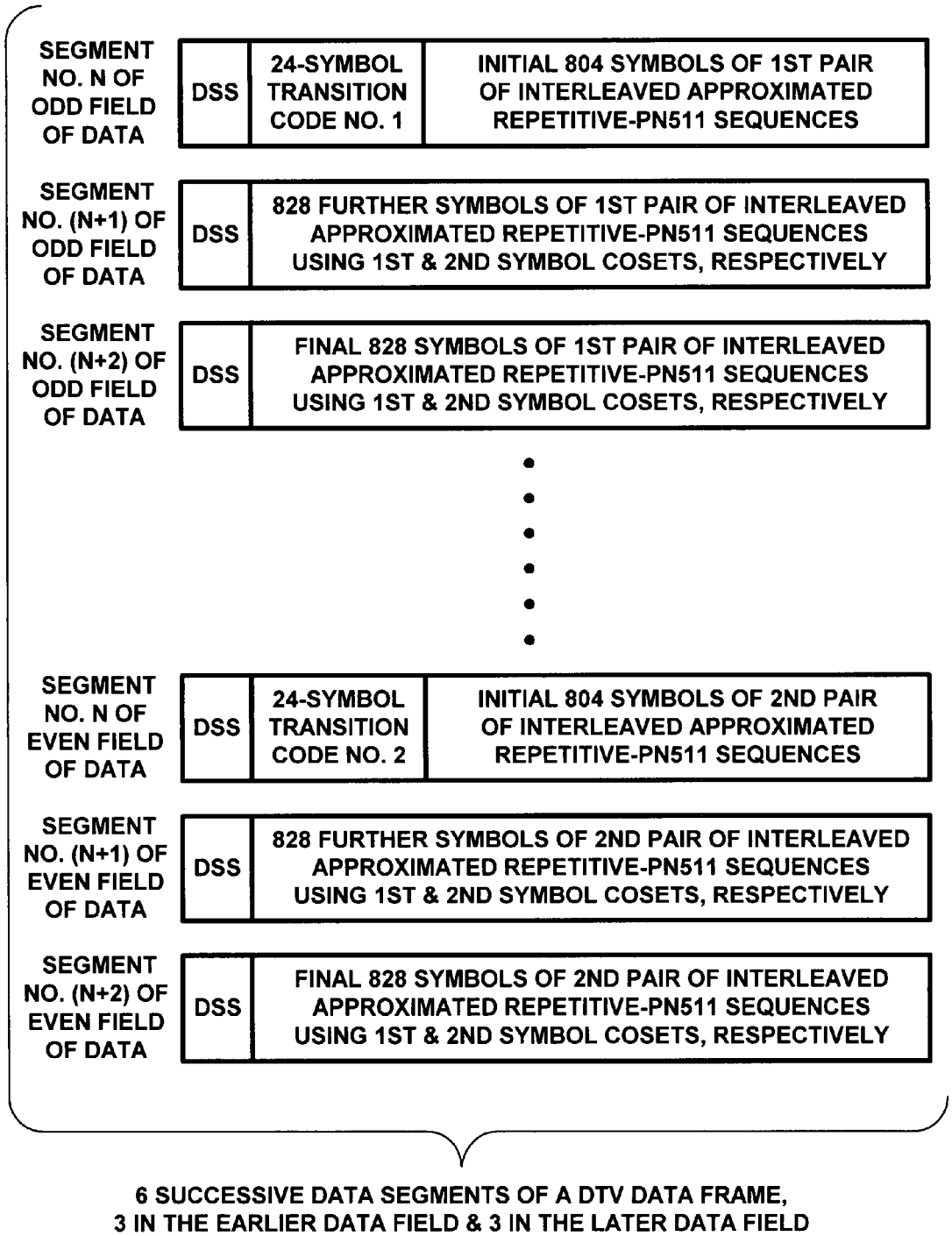
Figure 38:
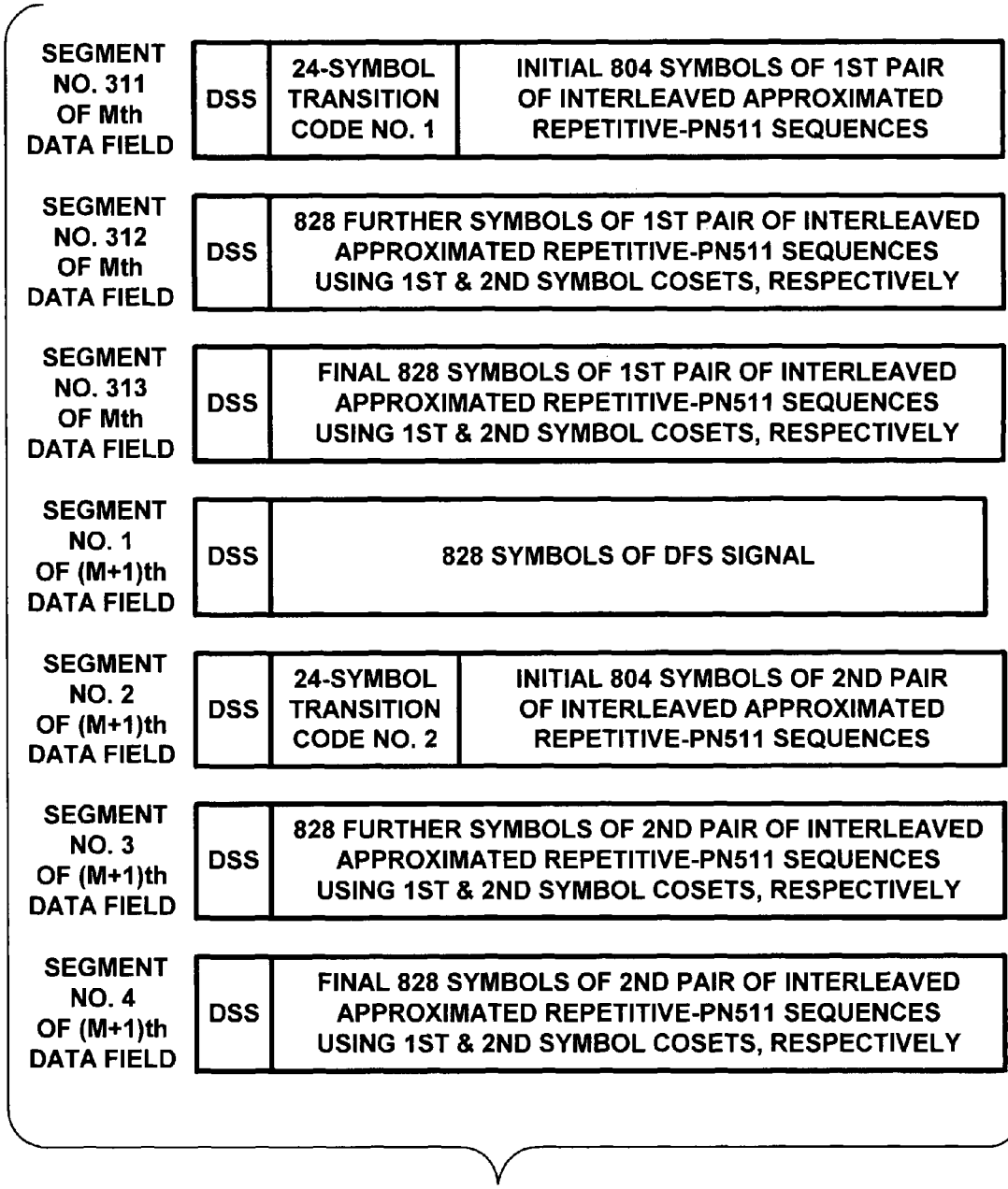

FIG. 26 is a schematic diagram showing in more detail a special 12-phase trellis encoder included in specific embodiments of the FIG. 3 DTV transmitter apparatus for transmitting DTV signals including ECR signals per FIG. 25, 37 or 38 that are of a specific type in which the interleaved approximated repetitive-PN sequences in the initial half and the final half of each ECR signal are essentially alike.

Each of FIGS. 27, 28, 29, 30, 31, 32, 33 and 34 is a table showing states in one phase of the 12-phase coding performed by the FIG. 3 trellis encoder at the outset of approximated repetitive PN sequence transmission per FIG. 25, given a particular set of previous transmission conditions.

Figure 35:
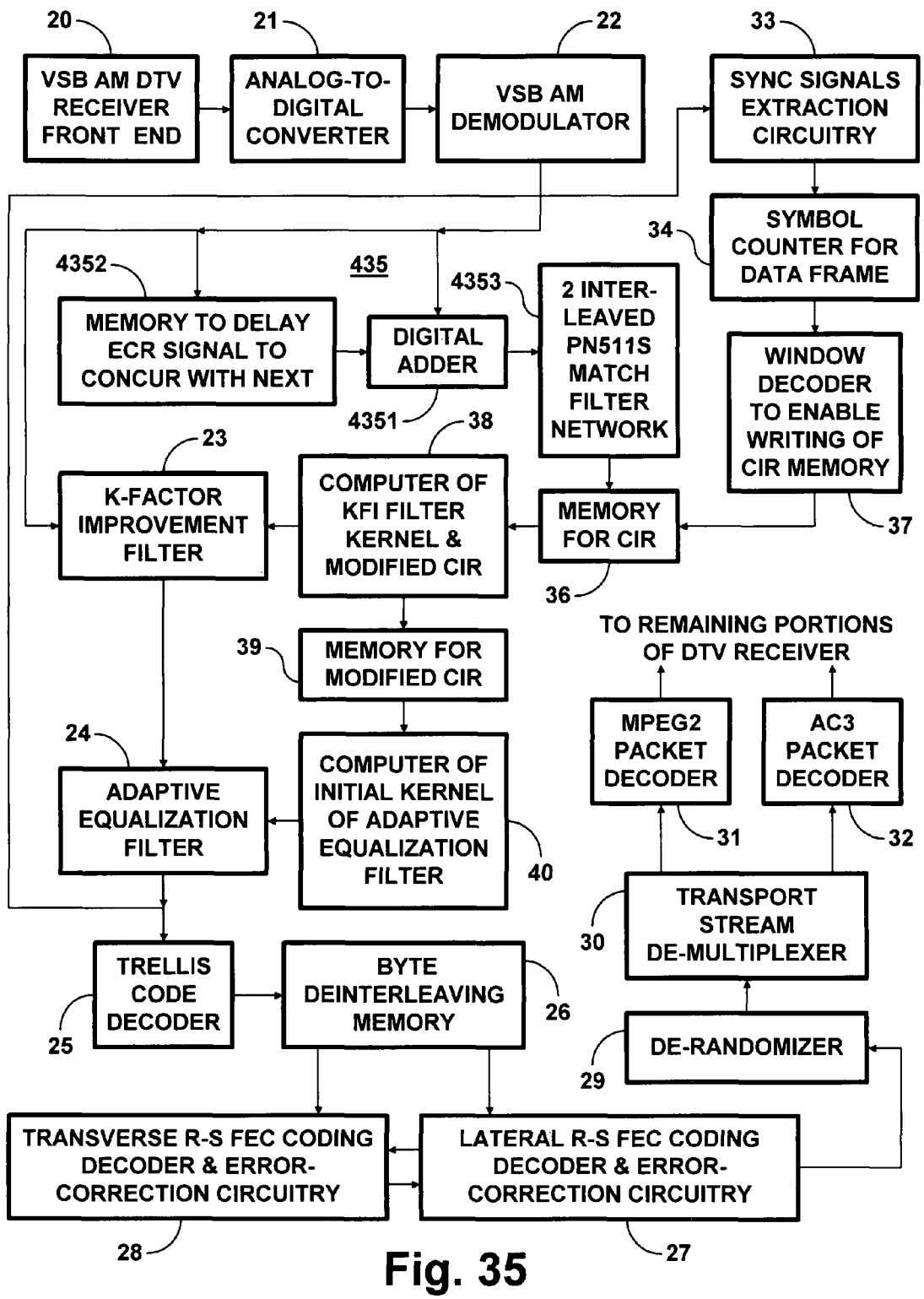

FIG. 35 is a schematic diagram of DTV receiver apparatus constructed in accordance with an aspect of the invention for extracting CIR from FIG. 25, 37 or 38 ECR signals that are included in received DTV signals and that are of a specific type in which the interleaved approximated repetitive-PN sequences in the initial half and the final half of each ECR signal are essentially alike.

Figure 36:
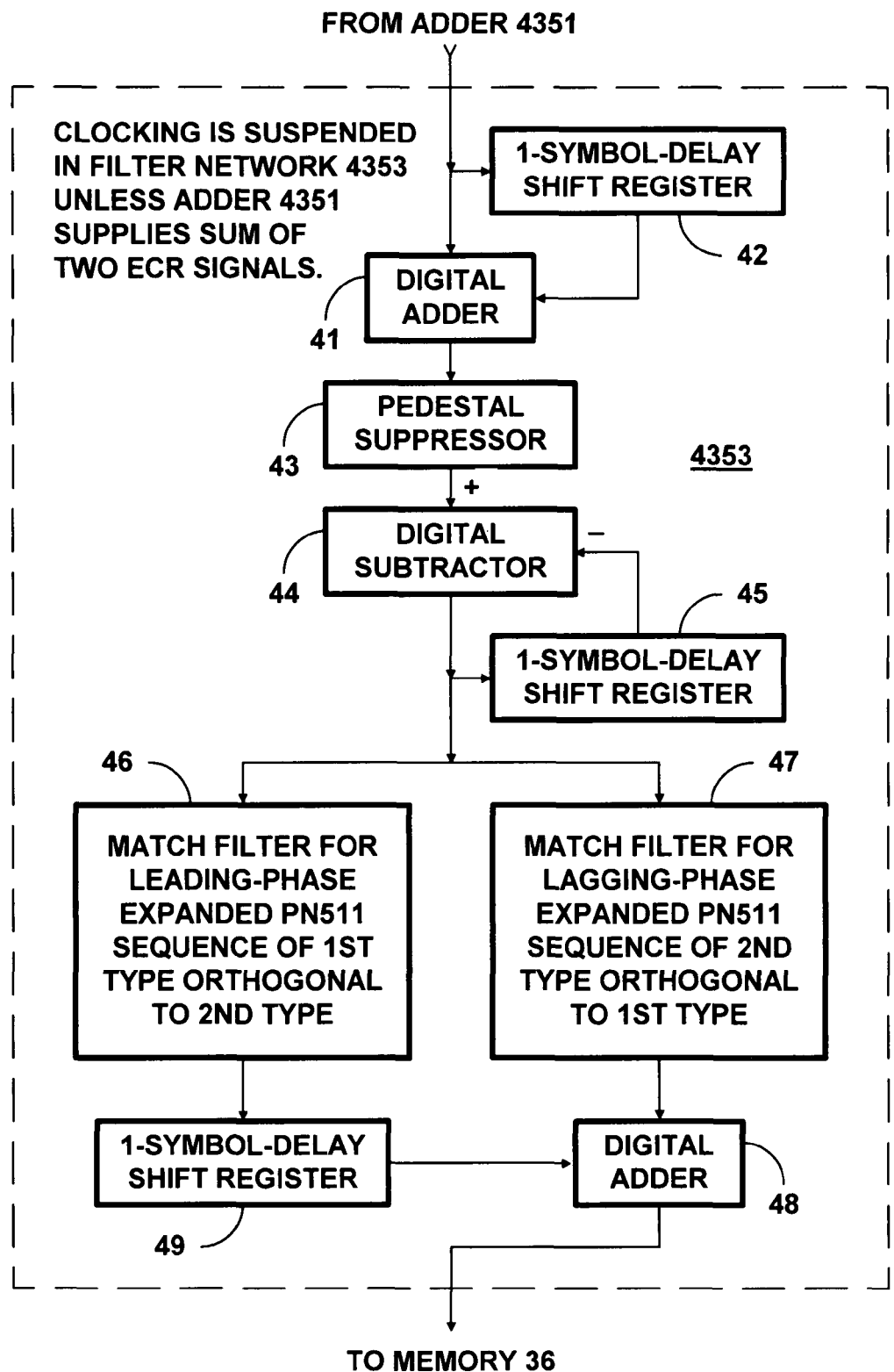

FIG. 36 is a schematic diagram showing in more detail the structure of a match filter network for interleaved expanded PN511 sequences, which match filter network is used in the FIG. 35 DTV receiver apparatus.

FIG. 37 is a diagram of three successive segments in each of two successive fields of interleaved DTV data, each of which groups of three successive segments in accordance with an aspect of the invention contains a respective ECR signal in which approximated repetitive-PN511 sequences are interleaved with each other symbol by symbol.

FIG. 38 is a diagram of DTV signal wherein, in accordance with an aspect of the invention, a respective DFS sequence is interposed between halves of ECR signals each containing a respective pair of approximated repetitive-PN511 sequences that are interleaved with each other symbol by symbol.

Figure 39:
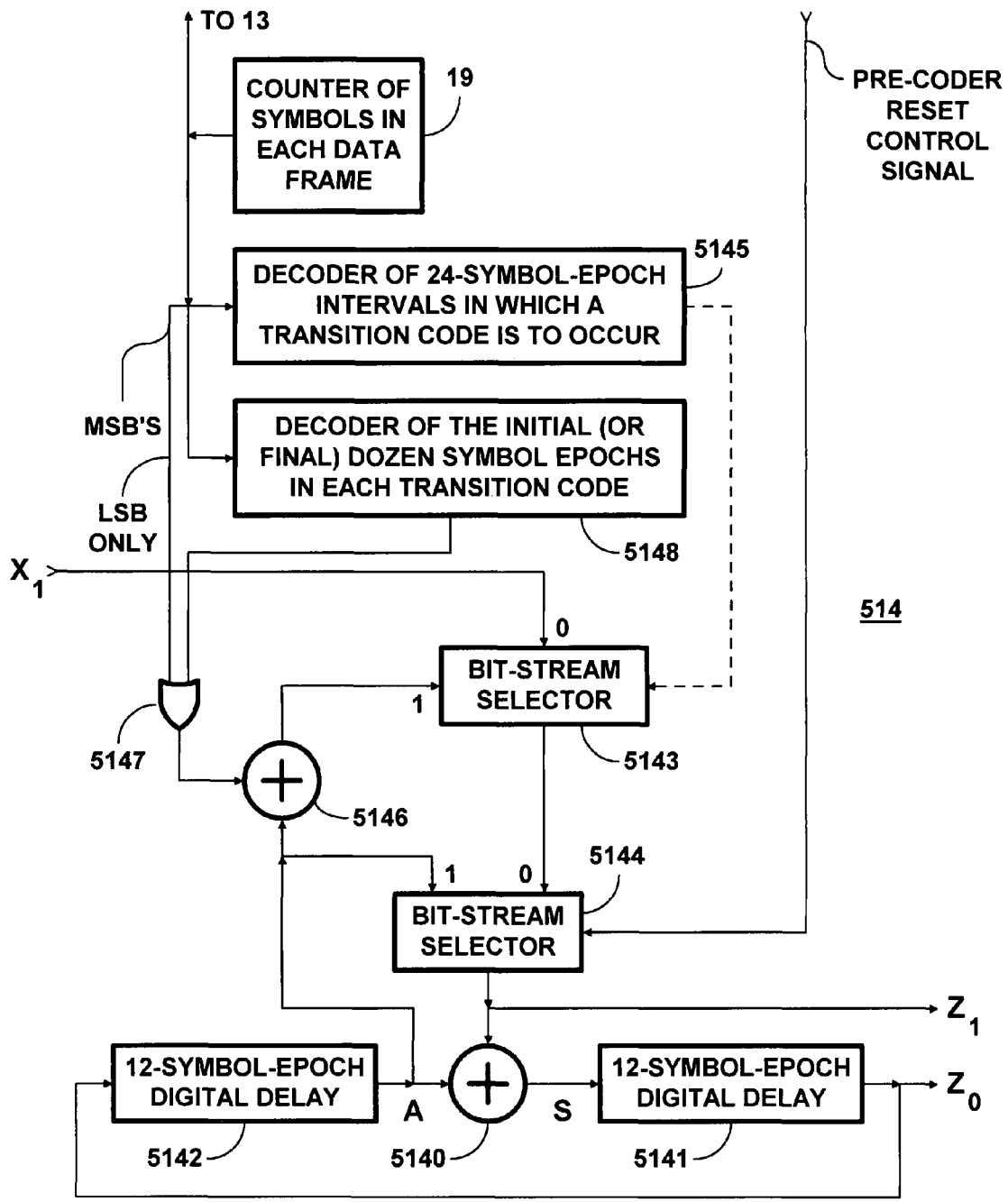

FIG. 39 is a schematic diagram showing in more detail a special 12-phase trellis encoder included in specific embodiments of the FIG. 3 DTV transmitter apparatus for transmitting DTV signals including ECR signals per FIG. 25, 37 or 38 that are of a specific type in which the interleaved repetitive-PN sequences in the final half of each ECR signal are essentially complementary to those in the initial half, rather than being essentially alike.

Figure 40:
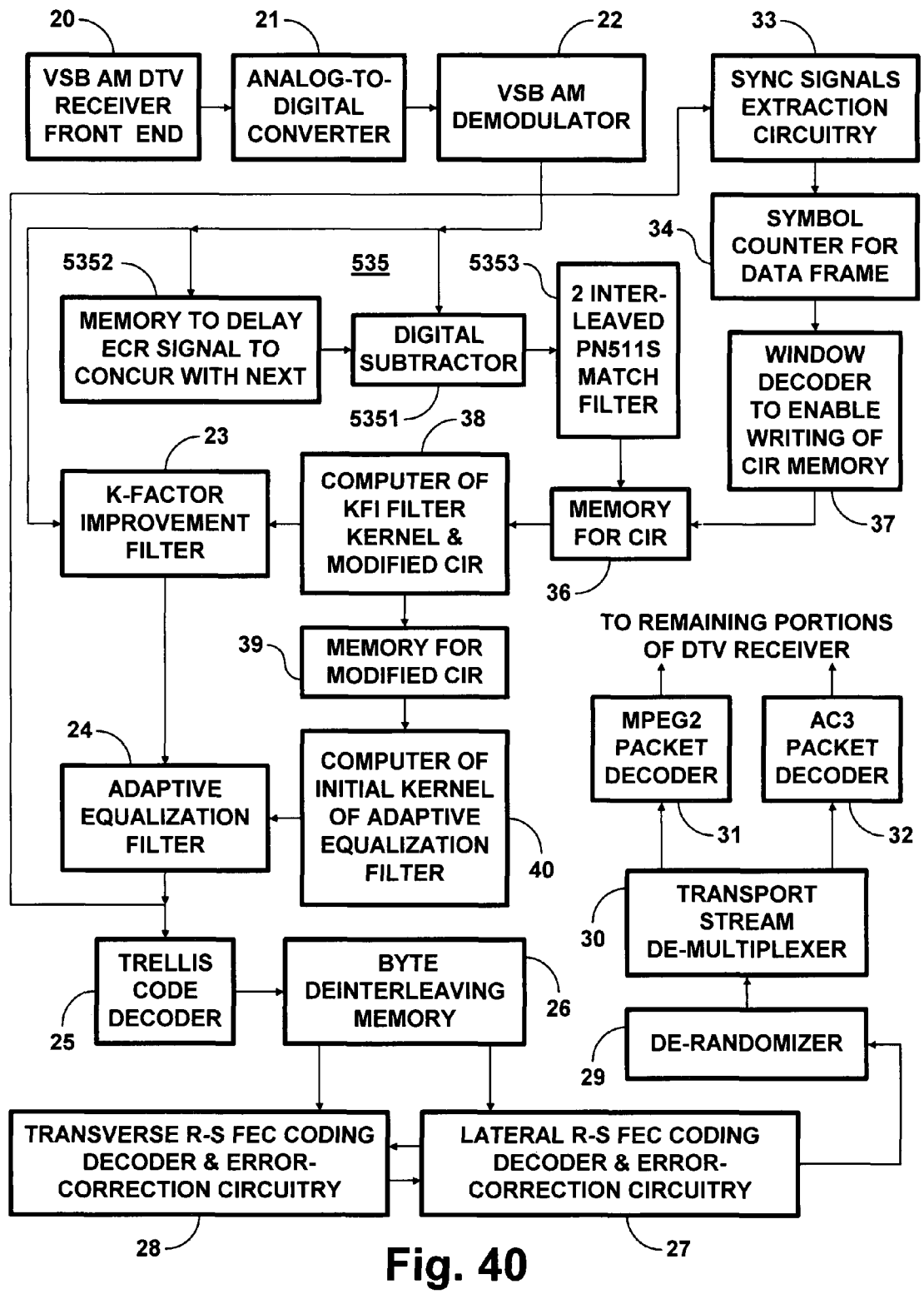

FIG. 40 is a schematic diagram of DTV receiver apparatus which in accordance with an aspect of the invention is suited for extracting CIR from received FIG. 25, 37 or 38 DTV signals of the specific type in which the interleaved repetitive-PN sequences in the final half of each ECR signal are essentially complementary to those in the initial half, rather than being essentially alike.

DETAILED DESCRIPTION

FIG. 1 shows that each of the six successive segments of a field of interleaved data containing an ECR signal begins with a DSS sequence. The initial one of these six data segments is the Nth one of a data field of 313 data segments. FIG. 1 shows Nth, (N+1)th, (N+2)th, (N+3)th, (N+4)th and (N+5)th consecutive data segments. The 4-symbol DSS sequence beginning the Nth data segment is followed by a 24-symbol transition code of a first type. This transition code establishes the pattern of $Z_0$ bits used in the first approximated repetitive-PN1023 sequence, which begins immediately thereafter. The initial 804 symbols of this first approximated repetitive-PN1023 sequence are arranged to complete the Nth data segment.

The next four symbols of the first approximated repetitive-PN1023 sequence are the DSS sequence of the following data segment, shown as the (N+1)th data segment in FIG. 1. FIG. 1 shows the next 828 symbols of the first approximated repetitive-PN1023 sequence arranged to complete the (N+1)th data segment.

The next four symbols of the first approximated repetitive-PN1023 sequence are the DSS sequence of the following data segment, shown as the (N+2)th data segment in FIG. 1. FIG. 1 shows the final 828 symbols of the first approximated repetitive-PN1023 sequence arranged to complete the (N+2)th data segment.

FIG. 1 shows the 4-symbol DSS sequence beginning the (N+3)th data segment being followed by a 24-symbol transition code of a second type. This transition code establishes the pattern of $Z_0$ bits used in the second approximated repetitive-PN1023 sequence, which begins immediately thereafter. The initial 804 symbols of this second approximated repetitive-PN1023 sequence are arranged to complete the (N+3)th data segment.

The next four symbols of the second approximated repetitive-PN1023 sequence are the DSS sequence of the following data segment, shown as the (N+4)th data segment in FIG. 1. FIG. 1 shows the next 828 symbols of the second approximated repetitive-PN1023 sequence arranged to complete the (N+4)th data segment.

The next four symbols of the second approximated repetitive-PN1023 sequence are the DSS sequence of the following data segment, shown as the (N+5)th data segment in FIG. 1. FIG. 1 shows the final 828 symbols of the second approximated repetitive-PN1023 sequence arranged to complete the (N+5)th data segment.

The $Z_0$ and $Z_1$ bits of the first and second transition codes are established by a special 12-phase trellis encoder in the DTV transmitter apparatus, as will be explained in greater detail further on in this specification. The first and second transition codes are contrived so that the patterns of $Z_0$ bits in the first and second approximated repetitive-PN1023 sequence are complementary to each other, and so that summing the two sequences term-by-corresponding-term will generate corresponding portions of a repetitive-PN1023 sequence superposed on a constant-value pedestal.

The sequence superposed on a constant-value pedestal will be a slightly-in-error repetitive-PN1023 sequence on a pedestal because the +10, −10, −10, +10 double-amplitude DSS sequences differ from the +12, −4, −4, +12 sequences that would occur in the exact repetitive-PN1023 sequence on a pedestal. However, the correlation between the exact PN1023 sequence and portions of the slightly-in-error repetitive-PN1023 sequence removed from the constant-value pedestal is good enough to support quite accurate CIR computations, since only four symbols out of each 832 is in error. The convolution of the exact PN1023 sequence with this error at DSS intervals has little energy compared to the convolution of the exact PN1023 sequence with the repetitive-PN1023 sequence that the error accompanies.

Figure 2:
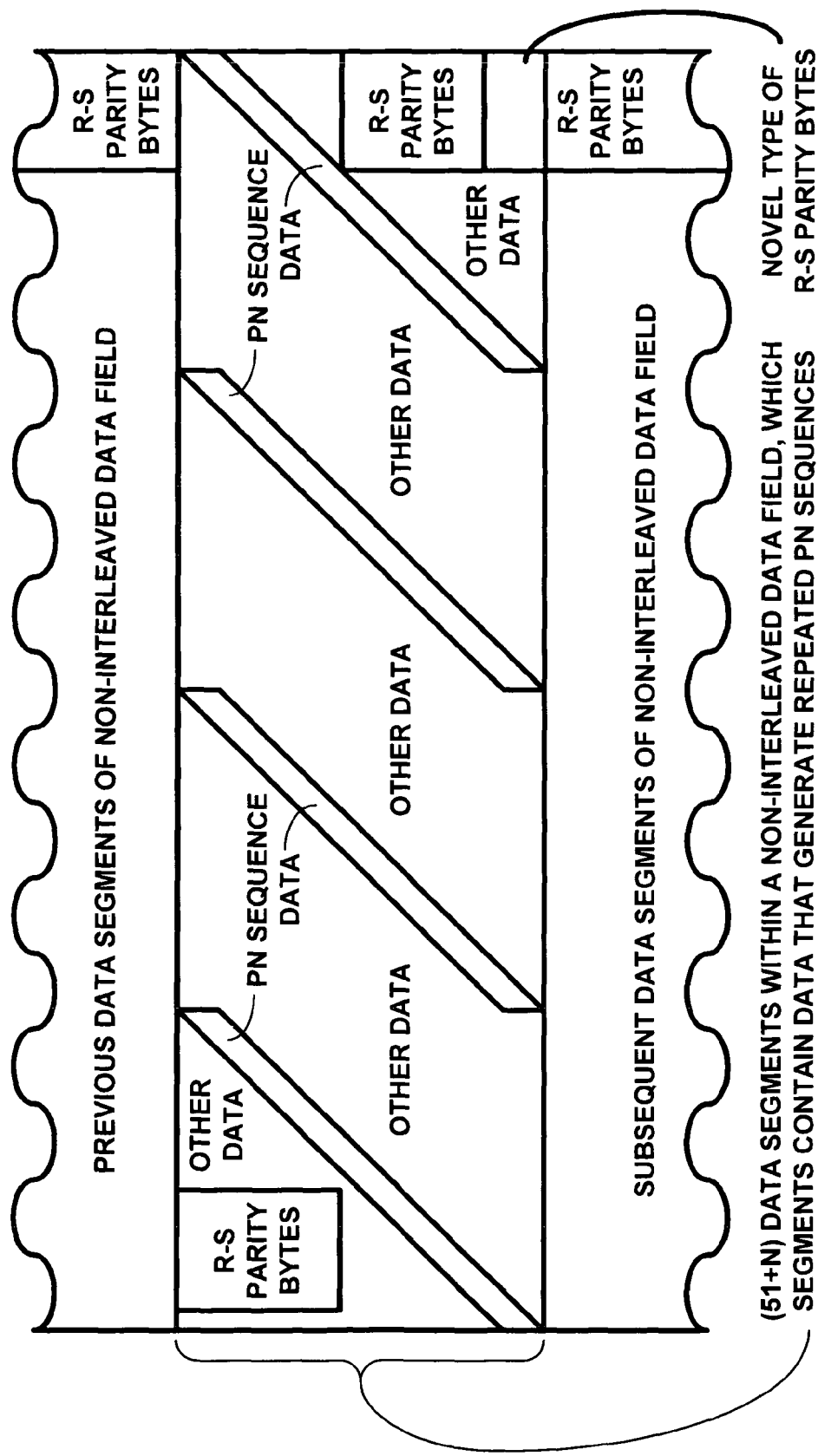
FIG. 2 is a diagram of a field of DTV data before interleaving or after de-interleaving, which field in accordance with the invention contains known data symbols that correspond with the approximated repetitive-PN1023 sequences shown in FIG. 1.

FIG. 2 shows how the symbols contained in the ECR signal appear in the field of data before interleaving or after de-interleaving, presuming that the convolutional byte interleaving is of a particular form. The symbols for the N successive segments of the interleaved data field appear as four diagonal bands of symbols crossing fifty-seven successive segments of the field of data before interleaving or after de-interleaving. While because of drafting limitations the sloping edges of these diagonal bands appear in the drawing to be smooth, each is actually a staircase with one-byte wide steps. The diagonal bands together occupy at least four and as many as thirty-two symbol epochs in each data segment, supposing N to be at least one and no more than eight, spoiling the fifty-seven successive data segments those bands cross for containing complete MPEG-2 data packets. Accordingly, procedures must be followed that cause legacy DTV receivers to disregard those fifty-seven "spoiled" data segments.

One procedure the inventor considered was incorporating a packet identifier (PID) in the header of each of the data packets in those fifty-seven "spoiled" data segments that would identify those data packets as ones to be discarded. The null packet PID comprising thirteen ONEs will cause legacy DTV receivers to discard the data packet from a "spoiled" data segment. However, the (N+2) final ones of the fifty-seven successive "spoiled" data segments preferably contain ECR signal where the PIDs would be in those data segments. PIDs conforming to the ECR signal in these (N+2) data segments could be excluded from those usable by legacy receivers, but this is not particularly desirable.

Another procedure the inventor considered was forward-error-correction coding each of the fifty-seven "spoiled" data segments with a (207, 187) Reed-Solomon code orthogonal to that prescribed by A/53 for ordinary 8VSB packets. This would cause the R-S decoders in legacy DTV receivers to find that none of those fifty-seven "spoiled" data segments to contain correctable MPEG-2 data packets. However, unfortunately, there are some legacy DTV receivers that shut down normal operation and go into a "sleep" mode if the number of MPEG-2 data packets per data field found not to be correctable exceeds some threshold. Accordingly, this procedure is restricted to initial ones of the fifty-seven successive "spoiled" data segments including those that contain ECR signal where the PIDs would be in those data segments. Preferably, this is the final (N+2) ones of those "spoiled" data segments.

The twenty parity bytes of the R-S codes cannot be located at the conclusions of the initial (N+20) of the fifty-seven successive "spoiled" data segments because this would interfere with bytes from the ECR signal. A (207, 187) R-S codeword can be modified to place twenty parity bytes at various locations within the codeword while still satisfying the parity equations for a (207, 187) R-S codeword concluding with twenty parity bytes. The twenty parity bytes of the respective (207, 187) R-S codeword in each of the initial (N+20) of the fifty-seven successive "spoiled" data segments are conveniently placed, in the fourth through twenty-third bytes of the codeword, for example. This leaves room for the respective initial 3-byte header of each of these initial (N+20) of the fifty-seven successive "spoiled" data segments. R-S coding that generates codewords each concluding with all its parity bytes is referred to as "systematic" Reed-Solomon coding; and an R-S codeword concluding with all its parity bytes is referred to as a "systematic" R-S codeword. R-S coding that generates codewords with parity bytes located other than just at its conclusion is referred to as "non-systematic" Reed-Solomon coding; and an R-S codeword with parity bytes located other than just at the conclusion thereof is referred to as a "non-systematic" R-S codeword.

Besides the three bytes for header and the twenty parity bytes of R-S code in each of the fifty-seven successive data segments, there are 184 data bytes for a total of 10,488 data bytes. Of these 10,488 data bytes, 6×184=1,104 of these data bytes are taken up by portions of the six segments of ECR signal. This leaves 9,384 data bytes in the fifty-seven successive data segments that can be used for some other purpose. One possible use of the 9,384 data bytes is to support turbo-coded robust transmissions. Such turbo-coded robust transmissions could be permitted to spill over into other segments of the data field as well.

Another possible use for most of the 9,384 data bytes is providing parity bytes for transverse Reed-Solomon forward-error-correction coding of the 312 data packets in each field of data before convolutional interleaving, by way of example. Transverse R-S FEC coding of DTV signals was described by A. L. R. Limberg in U.S. published Pat. App. No. 20040237024 published 25 Nov. 2004 and titled "Robust signal transmission in digital television broadcasting". It is simpler to exempt the bytes of the transition codes from the transverse R-S FEC coding since their values are not settled. Indeed, since the bytes of the PN sequence data are prescribed and therefore of known values, they may as well be exempted from the transverse R-S FEC coding also. Shortened 255-byte R-S FEC codes are used for transverse R-S FEC coding two groups of data packets in the remaining data field. E.g., one of these groups consists of 128 packets that are (150, 128) R-S FEC coded, and the other of these groups consists of 127 data packets that are (149, 127) R-S FEC coded. This requires a total of 2×22×207=9,108 parity bytes.

FIG. 3 shows representative DTV transmitter apparatus that can be employed for transmitting approximated repetitive-PN1023 sequences per FIG. 1. The FIG. 3 DTV transmitter apparatus also provides for transverse R-S FEC coding of 312−(51+N) packets of 8VSB data in each field of data before convolutional byte interleaving. I.e., for transverse R-S FEC coding of 255 packets when the number N of segments for transmitting approximated repetitive-PN1023 sequences is six per FIG. 1. A program source 1 supplies MPEG-2-compliant packets of data to a first-in/first-out memory 2 with storage capacity for at least 312−(51+N) packets of 8VSB data. Responsive to raster-scan read addresses supplied from a read-address generator 3, the stored data packets are read from the FIFO memory 2 as first input signal to an exclusive-OR gate 4. Responsive to the raster-scan read addresses supplied from the read-address generator 3, a one-bit-deep read-only memory 5 supplies second input signal to the XOR gate 4. This second input signal is composed of the successive bits of the pseudo-random binary sequence (PRBS) that A/53 prescribes for randomizing a data field yet to be interleaved. When approximated repetitive-PN1023 sequences per FIG. 1 are transmitted by the FIG. 3 DTV transmitter apparatus, the response from the XOR gate 4 is composed of the successive bits of the randomized 255 data packets in a data field yet to be interleaved.

A bank 6 of four memories for bytes of a field of 207-byte data segments, 312 in number, is operated on a four cycle basis. Certain storage locations in the four memories store bytes of the FIG. 1 ECR signal on a read-only basis. If the first and second repetitive-PN1023 sequences are the same in polarity, the same set of bytes is stored on a read-only basis in each of the four memories in the bank 6. If the first and second repetitive-PN1023 sequences differ in polarity, two different sets of bytes are stored on a read-only basis in the four memories in the bank 6. The first and third of the memories in the bank 6 written cyclically with XOR gate 4 response both store the bytes of the first repetitive-PN1023 sequence. The second and fourth of the memories in the bank 6 written cyclically with XOR gate 4 response both store the bytes of the second repetitive-PN1023 sequence.

During each of the four cycles of memory bank 6 operation, bytes of the successive bit of XOR gate 4 are written row by row into respective storage locations of a successive one of the four memories in bank 6. During the next two cycles of memory bank 6 operation, that memory is read column by column to a transverse Reed-Solomon forward-error-correction-code encoder 7. The TRS-FEC-code encoder 7 response is written back column by column into the same memory in an overwrite procedure, to reduce memory requirements in the encoder 7 for TRS FEC code. Then, during the next cycle of memory bank 6 operation, the memory storing TRS-FEC-code words is read row by row to a packet stream de-multiplexer 8.

The final (N+2) ones of each succession of fifty-seven data packets all containing bytes of the ECR signal do not have respective 3-byte headers complying with the MPEG-2 standard. The packet stream de-multiplexer 8 selects these packets without MPEG-2 headers to a (207, 187) lateral Reed-Solomon code encoder 9 for generating words of a novel type of (207, 187) LRS FEC code that are orthogonal to those words used in ordinary 8VSB signal. Legacy DTV receivers will find words of this novel type of (207, 187) LRS FEC code to contain byte errors incapable of correction and will disregard them. The packet stream de-multiplexer 8 selects all other data packets, which have MPEG-2 compliant headers, to a (207, 187) lateral Reed-Solomon code encoder 10 that generates conventional (207, 187) LRS-FEC-code words of the sort prescribed in A/53. Legacy DTV receivers are apt to find these words not to contain byte errors incapable of correction, but will disregard them because their PIDs indicate they contain null MPEG-2 packets. Some of the (207, 187) LRS codewords generated by the encoder 10 are in fact the type of (207, 187) LRS-FEC-code words prescribed in A/53, each concluding with its respective twenty bytes of parity. Others of the (207, 187) LRS codewords generated by the encoder 10 are of another type in which the parity bytes of each of them are disposed earlier in the codeword. The parity bytes are chosen to make the codeword conform to (207, 187) LRS codewords of the sort prescribed in A/53. New DTV receivers will use the same decoders for all (207, 187) LRS codewords generated by the encoder 10, but will discard different sets of parity bytes from correct(ed) LRS codewords of the two types to recover MPEG-2-compliant data packets. A time-division multiplexer 11 for lateral-Reed-Solomon codewords interleaves the LRS codewords from the (207, 187) LRS-FEC-code encoders 9 and 10 to generate fields of successive (207, 187) LRS codewords written to a convolutional byte interleaver 12.

The convolutional byte interleaver 12 comprises a dual-port memory with its random-access input/output port connected for receiving (207, 187) LRS codewords for storage. This dual-port memory is operated to interleave the bytes in the data read therefrom in accordance with conventional practice as prescribed by A/53, Annex D, §4.2.4 titled "Interleaving". Generally, the storage locations in the dual-port memory are 8-bit byte-organized with the serial output port arranged to supply each byte of each successive segment of the interleaved data field in four successive 2-bit nibbles. The more significant $X_2$ bits in the 2-bit nibbles provide input signal to a 12-phase pre-coder 13 of special design. The less significant $X_1$ bits in the 2-bit nibbles provide input signal to a 12-phase trellis encoder 14 of special design. Further on in this specification the pre-coder 13 and the trellis encoder 14 are described in more detail with reference to FIG. 4. Suffice for current consideration that the special designs of the pre-coder 13 and the trellis encoder 14 allow them to generate the 24-bit transition codes employed in the ECR signals of the invention. When NTSC broadcasting is discontinued, the pre-coder 13 will no longer be used and will be replaced by shim delay to compensate for latent delay in the trellis-code encoder 14.

Figures 6, 7, 8, 9, 10, 11, 12, 13:
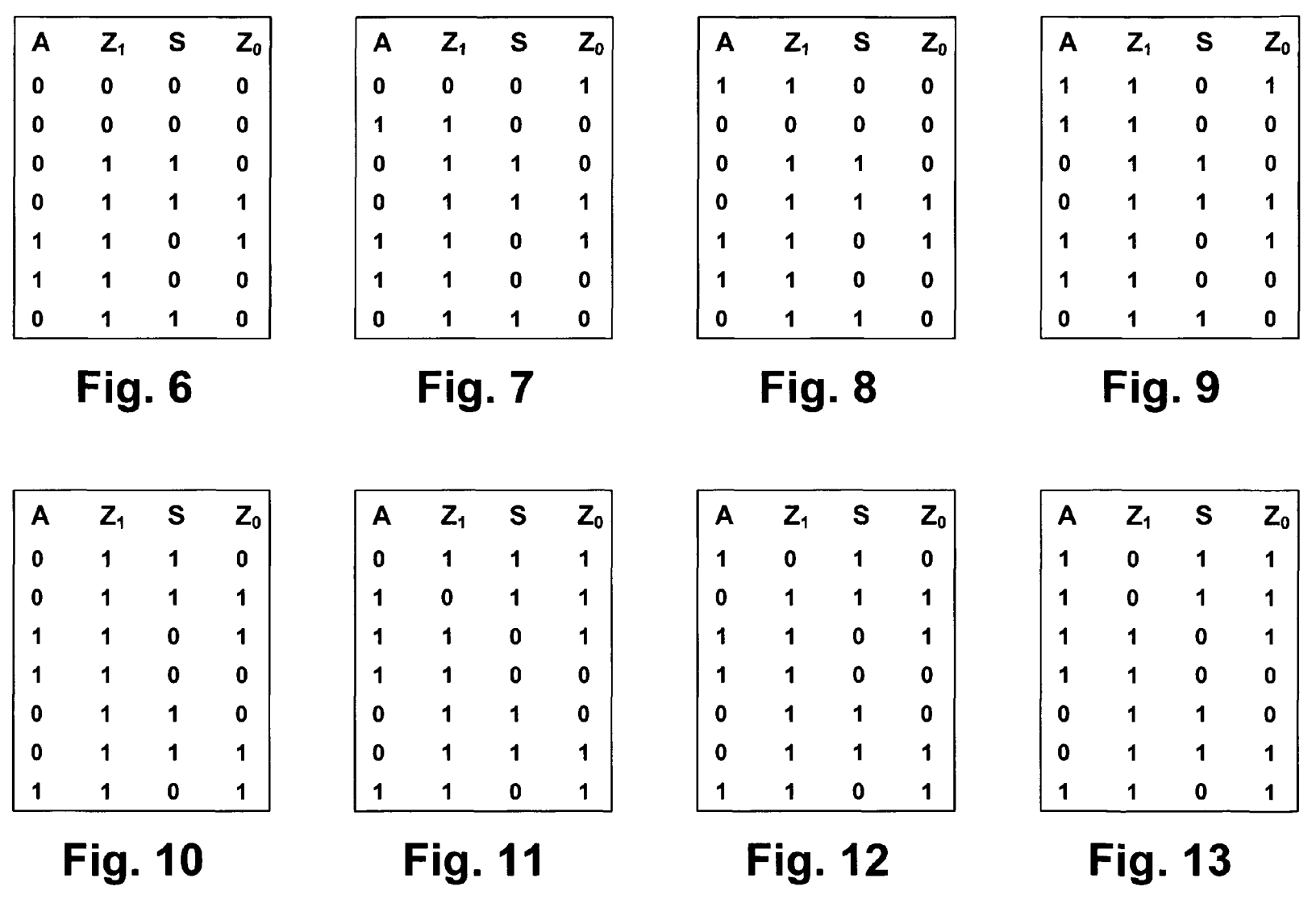

A conventional symbol-mapper read-only memory 15, as shown in FIG. 8 of A/53 Annex D, is connected to receive a $Z_2$ bit stream from the precoder 13 together with $Z_1$ and $Z_0$ bit streams from the trellis encoder 14. Each concurrent set of $Z_2$, $Z_1$ and $Z_0$ bits provides the ROM 15 a respective read address for generating a corresponding sample of preliminary digital modulating signal. The preliminary digital modulating signal is written to a first-in/first-out memory 16, which stores symbols of the DFS and DSS signals on a read-only basis. The read-out signal from the FIFO memory 16 is supplied to apparatus 17 for adding the offset term to cause pilot carrier. The response of the apparatus 17 is the final digital modulating signal supplied to the vestigial amplitude-modulation transmitter 18.

The parity bytes in LRS codewords computed by the encoder 9 for generating (207, 187) LRS FEC code are re-computed to take into account modifications of the three bytes in each of the transition codes that are made by the pre-coder 13 and the trellis-code encoder 14 of special designs. This can be done as follows. When each transition code first appears for application to the symbol mapper 15, writing of symbols from the symbol mapper 15 to the FIFO memory 16 is suspended. Byte former circuitry collects the $Z_1$ and $Z_2$ bits of the transition code from the pre-coder 13 and the trellis-code encoder 14 to generate bytes for over-writing the corresponding bytes of previous transition code in the 4-bank memory 6. Then, packets are serially read from the memory 6 beginning over with the initial one of the packets containing an over-written byte. The corrected packets are routed through the multiplexer 8 to the (207, 187)-LRS-code encoder 9 for re-computation of their respective R-S parity bytes. The LRS codeword multiplexer 11 is conditioned to reproduce the updated LRS codewords from the encoder 9 for application to the random-access port of the dual-port memory in the convolutional byte interleaver 12. The addressing of the dual-port memory is adjusted to over-write previous LRS codewords stored therein with the corrected with the re-computed LRS codewords, and the reading of the dual-port memory begins over to supply corrected data segments to the pre-coder 13 and the trellis-code encoder 14. When each transition code appears again for application to the symbol mapper 15, writing of symbols from the symbol mapper 15 to the FIFO memory 16 resumes.

Figure 4:
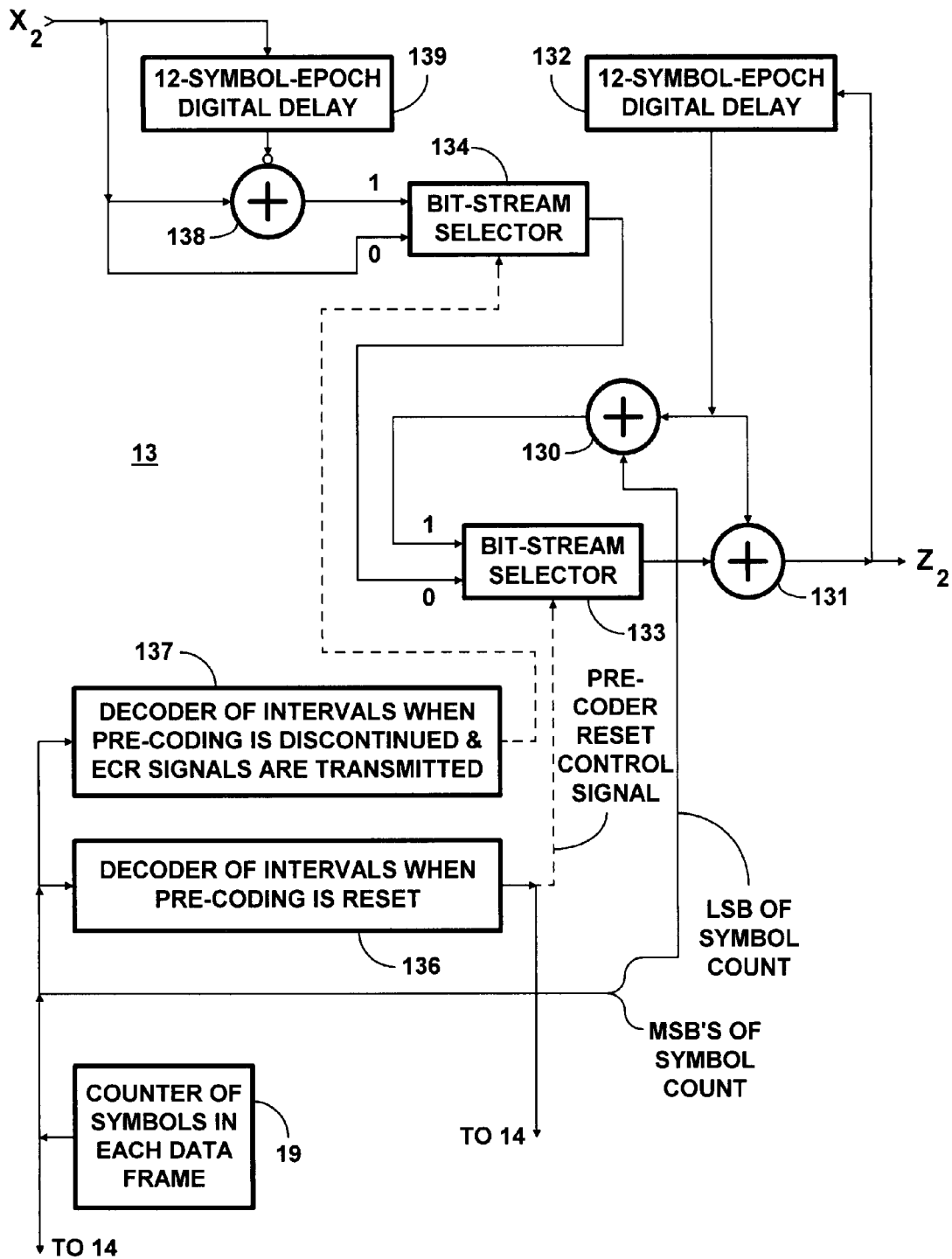
FIG. 4 is a schematic diagram showing in more detail a special 12-phase pre-coder included in the FIG. 3 DTV transmitter apparatus.

FIG. 4 shows a symbol counter 19 included in the FIG. 3 DTV transmitter apparatus, but not explicitly shown in FIG. 3. The symbol counter 19 counts the symbols in each frame of data. It is convenient to have the symbol count comprise a modulo-2 count of the fields in each data frame, a modulo-313 count of the segments in each data field, a modulo-208 count of the bytes in each data segment and a modulo-4 count of the symbols defining each 8-bit byte.

FIG. 4 also shows the elements of the 12-phase pre-coder 13 of special design which aids in a deterministic trellis reset (DTR). As in a 12-phase pre-coder of conventional design, $Z_2$ bits are furnished as the sum output signal of a modulo-2 adder 131 and are delayed twelve symbol epochs by digital delay circuitry 132 to be fed back to the adder 131 as its addend input signal. The response of a bit-stream selector 133 is supplied to the adder 131 as its augend input signal. The sum output signal from a modulo-2 adder is an exclusive-OR response to the concurrent bits in its augend and addend input signals. Ordinarily, the selector 133 receives a ZERO as its control signal conditioning the selector 133 to reproduce bits supplied to its "0" input port from the output port of another bit-stream selector 134. However, when a ONE is supplied as PRE-CODER RESET CONTROL SIGNAL to the selector 133, the selector 133 is conditioned to reproduce bits supplied to its "1" input port from the sum output port of a modulo-2 digital adder 130. The same delayed $Z_2$ bits fed back to the adder 131 as its addend input signal are applied to the adder 130 as its augend input signal, and the successive least significant bits of the count from the symbol counter 19 are applied to the adder 135 as its addend input signal. So, the modulo-2 sum output from signal of the adder 130 supplied to the "1" input port of the selector 133 alternates being different from and the same as the addend input signal of the adder 131. When the selector 133 is conditioned to reproduce this signal by the PRE-CODER RESET CONTROL SIGNAL being ONE, the augend and addend signals supplied to the adder 131 alternate being different and alike. Accordingly, the modulo-2 sum output signal from the adder 131 generates successive $Z_2$ values that are alternately ONEs and ZEROes as the output signal from the 12-phase pre-coder 13 so long as the PRE-CODER RESET CONTROL SIGNAL is ONE.

The alternating successive $Z_2$ values in this form of pre-coder reset does not tend to reduce the average modulus of the DTV signal. The average modulus of the DTV signal is reduced in an alternative design of the pre-coder 13 that omits the adder 130 and supplies the "1" input port of the selector 133 the same delayed $Z_2$ bits fed back to the adder 131 as its addend input signal.

The PRE-CODER RESET CONTROL SIGNAL is usually ONE for a respective prescribed 24-symbol period within each of a number of MPEG-2-compliant data packets of the special type referred to as an "operations and management packet" or "OMP", during which period the special trellis-code encoder 14 is also reset. The PRE-CODER RESET CONTROL SIGNAL can be ONE for only a 12-symbol period if the special pre-coder 13 is reset without resetting the special trellis-code encoder 14. The adder 131 provides twenty-four successive $Z_2$ values that are alternately ONEs and ZEROes as the output signal from the 12-phase pre-coder 13 responsive to such a PRE-CODER RESET CONTROL SIGNAL. In FIG. 4 a decoder 136 generates a ONE output signal responsive to the count from the symbol counter 19 being in one of the prescribed 24-symbol-epoch intervals during which the 12-phase pre-coder 13 is to be reset, but otherwise generates a ZERO output signal. FIG. 4 shows this output signal from the decoder 136 providing the PRE-CODER RESET CONTROL SIGNAL, but this signal can be generated in any of a number of other ways.

A decoder 137 generates a ONE output signal responsive to the count from the symbol counter 19 being in one of the ranges corresponding to prescribed intervals in which pre-coding is discontinued and ECR signals are sent, but otherwise generates a ZERO output signal. The decoder 137 supplies its output signal to the selector 134 as control signal. A ZERO output signal from the decoder 137 conditions the selector 134 to reproduce the $X_2$ bits supplied to its "0" input port from the convolutional interleaver 12.

The $X_2$ bits from the convolutional interleaver 12 are supplied to a modulo-2 digital subtractor 138 as its minuend input signal; and those $X_2$ bits as delayed twelve symbol epochs by digital delay circuitry 139 are supplied to the digital subtractor 138 as its subtrahend input signal. The difference output signal from the digital subtractor 138 is supplied to the "1" input port of the selector 134. A ONE output signal from the decoder 137 conditions the selector 134 to reproduce the bits supplied to its "1" input port from the digital subtractor 138 as difference output signal, and a ONE output signal from the decoder 137 conditions the selector 134 to reproduce these bits also. The response of the digital adder 131 to these bits as reproduced by the selector 133 and received as augend input signal causes the $X_2$ bits from the convolutional interleaver 12 to be reproduced as the sum output signal from the adder 131. These reproduced $X_2$ bits provide the $Z_2$ bits from the pre-coder 13 when both the output signals from the decoders 136 and 137 are ONEs.

FIG. 5 shows the elements of a particular embodiment 114 of the 12-phase trellis-code encoder 14 of special design. The encoder 114 is used when transmitting FIG. 1 ECR signals in which the second repetitive-PN1023 sequence is similar to the first repetitive-PN1023 sequence in each ECR signal. The derivation of $Z_0$ bits from bits used as $Z_1$ bits is carried out the same way as in a 12-phase trellis-code encoder of conventional design. Each successive bit used as a $Z_1$ bit is supplied as augend input signal to a modulo-2 adder 1140 that exclusive-ORs the bit with bit A supplied as addend input signal. This exclusive-ORing generates a modulo-2 sum bit S that is delayed twelve symbol epochs by digital delay circuitry 1141 to provide the $Z_0$ bit. The $Z_0$ bit is delayed an additional twelve symbol epochs by digital delay circuitry 1142 to provide a future bit A to be supplied as addend to the modulo-2 adder 1140. In a 12-phase trellis-code encoder design per A/53, the $Z_1$ bits would always replicate the $X_1$ bits supplied from the convolutional interleaver 12.

This is not always the case in the trellis-code encoders 14 of various special designs. In the trellis-code encoder 114 a bit-stream selector 1143 is operated so that the bits in its output signal replicate the $X_1$ bits supplied from the convolutional interleaver 12 except during the transition codes of first and second types that precede the repetitive-PN1023 sequences used as ECR signals. A succeeding bit-stream selector 1144 is operated so that the $Z_1$ bits supplied as its output signal replicate the bits in the output signal from the selector 1143 except when the pre-coder 13 is reset. The resetting of the pre-coder 13 is done at times other than during the transition codes or the ECR signals, and the $Z_1$ bits from the trellis-code encoder 114 are all ZEROes during the ECR signals. The selector 1144 is connected for receiving the PRE-CODER RESET CONTROL SIGNAL as its control signal. A "0" input port of the selector 1144 is connected for receiving the bits of the output signal of the selector 1143. When the PRE-CODER RESET CONTROL SIGNAL is a ZERO, the selector 1144 reproduces in its output signal those bits received at its "0" input port. A "1" input port of the selector 1144 is connected for receiving each successive bit A. When the PRE-CODER RESET CONTROL SIGNAL is a ONE, the selector 1144 reproduces each successive bit A that is supplied as addend input signal to the adder 1140 for application to the adder 1140 as augend input signal. The modulo-2 adder 1140 exclusive-ORs the concurrent similar bits of its augend and addend input signals to generate ZEROes in its sum output signal so long as the PRE-CODER RESET CONTROL SIGNAL is a ONE. In a DTV broadcast system in which resetting of the special trellis-code encoder 14 is done only during transition code intervals, the trellis-code encoder 114 is modified, omitting the selector 1144 and obtaining $Z_1$ bits directly from the response of the selector 1143.

The trellis-code encoder 114 derives the $Z_1$ bits from successive A bits during the transition codes. The selection of the input signal that the selector 1143 reproduces in its output signal is determined by a pair of control signals supplied by decoders 1145 and 1146 responsive to particular ranges of symbol count from the counter 19. When these control signals and the PRE-CODER RESET CONTROL SIGNAL are ZEROes all, the $Z_1$ bits supplied from the bit-stream selector 1144 replicate the $X_1$ bits supplied from the convolutional interleaver 12. A condition in which both of these control signals is ONE never occurs.

The decoder 1145 generates a ONE output signal responsive solely to the count from the symbol counter 19 being in one of the 24-symbol-epoch intervals in which the transition code of first type should occur. The decoder 1145 generates a ZERO output signal responsive to the count from the symbol counter 19 not being in any of those 24-symbol-epoch intervals. A ONE output signal from the decoder 1145 conditions the selector 1143 to reproduce the sum output signal from a modulo-2 adder 1147 supplied to a node 1148.

The decoder 1146 generates a ONE output signal responsive solely to the count from the symbol counter 19 being in one of the 24-symbol-epoch intervals in which the transition code of second type should occur. The decoder 1146 generates a ZERO output signal responsive to the count from the symbol counter 19 not being in any of those 24-symbol-epoch intervals. A ONE output signal from the decoder 1146 conditions the selector 1143 to reproduce the response of a NOT gate 1149 to the sum output signal from the modulo-2 adder 1147 supplied to the node 1148.

The modulo-2 adder 1147 receives the bit A as its augend input signal. The modulo-2 adder 1147 is connected to receive a binary addend input signal that is the same in the 24-symbol-epoch intervals in which the first and second transition codes respectively occur. The bits in the initial half of each of the 24-symbol-epoch intervals should be replicated in its final half. FIG. 5 shows this binary addend input signal to be, by way of specific example, the modulo-2 count from the symbol counter 19.

One alternative binary addend input signal is a string of twenty-four ZEROes. In such case the structure of the FIG. 5 special 12-phase trellis encoder 14 can be simplified by omitting the modulo-2 adder 1147 and applying the bit A directly to the node 1148. Another alternative binary addend input signal is a string of twenty-four ONEs, and a simplified equivalent structure eliminates the modulo-2 adder 1147. In this latter simplified equivalent structure the bit A is applied directly to the node 1148; but the 01 and 10 inputs of the selector 1143 are reversed, to connect directly from the node 1148 and to connect from the output port of the NOT gate 1149 respectively.

The special 12-phase trellis encoder 14 can be of quite different design from that shown in FIG. 5 when the ECR signal is contained within six consecutive segments of the field of interleaved data. In such different design the $Z_1$ bits of the first transition code are generated referring to previous $Z_0$ bits and time-division multiplexed into the $Z_1$ bitstream. Moreover, the second transition code can be pre-programmed in the read-only storage locations within the bank 6 of memories.

Each of FIGS. 6, 7, 8, 9, 10, 11, 12 and 13 tabulates the states in one phase of the 12-phase coding performed by the trellis encoder 14 at the outset of transmitting an approximated repetitive PN sequence, given a particular set of previous transmission conditions. The column heads A, $Z_1$, S and $Z_0$ correspond to those signals at nodes correspondingly labeled in the FIG. 5 schematic diagram of the trellis encoder 14, and each succeeding row represents the states of those signals after a twelve-symbol-epoch interval. FIGS. 6, 7, 8 and 9 illustrate how, for each of the four possible combinations of initial A and $Z_0$ bits, the FIG. 5 trellis encoder 14 causes $Z_0$ bits for one phase of trellis coding to be brought into conformity with a prescribed repetitive ZERO, ZERO, ONE, ONE pattern. This is done by the trellis encoder 14 causing the $Z_1$ bits to replicate the A bits during that phase of a transition code. FIGS. 10, 11, 12 and 13 illustrate how, for each of the four possible combinations of initial A and $Z_0$ bits, the FIG. 5 trellis encoder 14 causes $Z_0$ bits for one phase of trellis coding to be brought into conformity with a prescribed repetitive ONE, ONE, ZERO, ZERO pattern. This is done by the trellis encoder 14 causing the $Z_1$ bits to be complementary to the A bits during that phase of a transition code.

FIG. 14 shows DTV receiver apparatus for receiving transmissions from the FIG. 3 DTV transmitter apparatus. The FIG. 14 DTV receiver apparatus includes a vestigial-sideband amplitude-modulation (VSB AM) DTV receiver front-end 20 for selecting a radio-frequency DTV signal for reception, converting the selected RF DTV signal to an intermediate-frequency DTV signal, and for amplifying the IF DTV signal. An analog-to-digital converter 21 is connected for digitizing the amplified IF DTV signal supplied from the DTV receiver front-end 20. A demodulator 22 operating in the digital regime is connected for demodulating the digitized VSB AM IF DTV signal to generate a digitized baseband DTV signal. Alternatively, in substantially equivalent circuitry, as known from the prior art, the VSB AM DTV receiver front-end 20 is followed by a demodulator operating in the analog regime to recover an analog baseband DTV signal that is subsequently digitized. Demodulation is customarily a synchrodyning procedure that utilizes beat-frequency oscillations from a controlled oscillator the phase and frequency of which oscillations are controlled by frequency- and phase-lock loop or loops. Interestingly, an increase of average carrier energy during the ECR signals speeds up loop locking.

The digitized baseband DTV signal is supplied as input signal to the cascade connection of a K-factor improvement filter 23 and an adaptive (channel) equalization filter 24. A decoder 25 for 12-phase trellis code, which decoder preferably generates soft decisions and typically is of Viterbi type, is connected for receiving as its input signal the equalized baseband DTV signal that the cascade connection of filters 23 and 24 supplies as its response. The decisions from the trellis code decoder 25 are written to byte-deinterleaving memory 26. The byte-deinterleaving memory 26 reads successive words of (207, 187) LRS FEC coding to lateral Reed-Solomon forward-error-correction coding decoder and error-correction circuitry 27. The byte-deinterleaving memory 26 also reads successive words of shortened (255, 255−2t) TRS FEC codes to transverse Reed-Solomon forward-error-correction code decoder and error-correction circuitry 28, if such is used. Preferably, the TRS-FEC-code decoder and error-correction circuitry 28 exchanges soft-decision R-S decoding results with the LRS-FEC-code decoder and error-correction circuitry 27 to improve R-S decoding both in the decoder circuitry 28 and in the decoder circuitry 27.

Using cross-interleaved Reed-Solomon FEC codes to locate errors for each other and thus boost their respective error-correction capabilities is known from the recording arts. U.S. Pat. No. 4,637,021 issued 13 Jan. 1987 to D. N. Shenton and titled "Multiple pass error correction" describes error correction being performed by one set of the cross-interleaved Reed-Solomon FEC codes and then the other on a repeated basis until no further correction is possible. U.S. Pat. No. 4,796,26 issued 3 Jan. 1989 to H. Moriwaki and titled "Error correction apparatus for digital data" describes how to reduce the time required for repeated error correction by skipping over Reed-Solomon FEC codes that have already been determined to be correct. U.S. Pat. No. 4,802,173 titled "Method of and device for decoding a block of code symbols which is distributed between code words in two ways, each code word being protected by a maximum distance separable code" issued 31 Jan. 1989 to C. P. M. J. Baggen. U.S. Pat. No. 4,802,173 describes using cross-interleaved Reed-Solomon FEC codes in such way that that the codes of each interleaving pattern confirm error locations in the codes of the other interleaving pattern. U.S. Pat. No. 5,412,667 titled "Decoder for cross interleaved error correcting encoded data" issued 2 May 1955 to A. Havemose. U.S. Pat. No. 5,412,667 flags bytes corrected during decoding of a first one of cross-interleaved Reed-Solomon FEC codes to be referred to when decoding a second one of the cross-interleaved Reed-Solomon FEC codes.

The LRS decoder and error-correction circuitry 27 differs from the LRS decoder and error-correction circuitry used in prior-art commercial DTV receivers in that words of two distinct (207, 187) LRS FEC codes can be decoded and corrected. The LRS FEC coding used for data packets without MPEG-2 headers can be decoded, as well as the standard LRS FEC coding prescribed by A/53. The LRS decoder and error-correction circuitry 27 also differs from the LRS decoder and error-correction circuitry used in prior-art commercial DTV receivers in the manner in which parity bytes are discarded from the standard (207, 187) LRS FEC codewords subsequent to error-correction. Per custom, the circuitry 27 discards the respective twenty bytes that conclude each codeword of the type of (207, 187) LRS FEC codewords prescribed in A/53, thus recovering a respective corrected 187-byte MPEG-2-compatible data packet. However, the circuitry 27 does not discard the respective twenty bytes that conclude each codeword of the other type of (207, 187) LRS FEC codewords in which parity bytes are located earlier in each codeword. Rather, the circuitry 27 discards the respective parity bytes located earlier in each codeword of this other type, thus recovering a respective corrected 187-byte MPEG-2-compatible data packet.

The final R-S decoding results from the LRS-FEC-code decoder and error-correction circuitry 27 are supplied to a data de-randomizer 29. The de-randomizer 29 exclusive-ORs the bits of the data it receives from the decoder and error-correction circuitry 27 with the PRBS specified in A/53, Annex D, §§4.2.2 to generate packets of de-randomized data supplied to a transport stream de-multiplexer 30. The transport stream de-multiplexer 30 responds to the PIDs in certain types of the de-randomized data packets from the data de-randomizer 29 for sorting those types of de-randomized data packets to appropriate packet decoders. For example, video data packets are sorted to an MPEG-2 decoder 31, and audio data packets are sorted to an AC-3 decoder 32. The data de-randomizer 29 will convert to a ONE the toggled TEI bit in a data packet indicating that it still contains byte errors. The MPEG-2 decoder 31 responds to the TEI bit in a packet of de-randomized data being ONE by not using the packet and by instituting measures to mask the effects of the packet not being used. AC-3 decoders known in the art respond to the TEI bit in packet of de-randomized data being ONE by not using the packet and by instituting measures to mask the effects of the packet not being used.

FIG. 14 shows the equalized baseband DTV signal supplied as response of the cascade connection of filters 23 and 24 being supplied to circuitry 33 for extracting synchronizing signals from that response. The extracted synchronizing signals include the DSS and DFS signals. The FIG. 14 DTV receiver apparatus also includes a counter 34 for the symbols in a data frame. The counter 34 is convenient to arrange the counter 34 to count modulo-2 the fields per frame, to count modulo-313 the data segments per field, to count modulo-208 the bytes per data segment, and to count modulo-4 the symbols per byte. The circuitry 33 typically includes a PN511 match filter for generating a pulsed output response to the PN511 sequence in the DFS signal at the beginning of each data field. This pulsed output response is used by the counter 34 to reset to prescribed values the modulo-313 count of data segments per field, the modulo-208 count of the bytes per data segment, and the modulo-4 count of the symbols per byte. Typically, the circuitry 33 includes a PN63 match filter for generating a pulsed output responses to the triple-PN63 sequence that next appears in the DFS signal. Typically, too, the circuitry 33 further includes decoder circuitry to generate a gated interval for evaluating the polarity of the pulsed output response to the central PN63 sequence. If necessary, the modulo-2 count of the fields per frame supplied by the counter 34 is reset to correspond with this evaluation.

The portion of the FIG. 14 DTV receiver apparatus of primary interest in regard to the invention is circuitry 35 for responding to ECR signals that essentially fill some 208-byte data segments of the baseband DTV signal to compute a close approximation to channel impulse response (CIR). FIG. 14 shows the input port of the circuitry 35 connected for receiving the baseband DTV signal from the output port of the demodulator 22 for demodulating digitized VSB AM IF DTV signal. The digital samples of the baseband DTV signal that the demodulator 22 supplies to the circuitry 35 typically have 10-bit resolution, which resolution is maintained insofar as possible during processing in the circuitry 35. FIG. 14 shows the output port of the circuitry 35 connected for supplying the close approximation to CIR, hereinafter referred to simply as "CIR", as write input signal to a memory 36 for storing CIR. A window decoder 37 detects that range of count from the symbol counter 34 in which the close approximation to CIR will occur and generates a write-enable signal for the memory 36 during the corresponding range of time.

A computer 38 has read access to CIR stored in the memory 36. The computer 38 computes the kernel weights for the KFI filter 23 based on CIR read from the memory 36, methods for which computation are described in previous art. The computer 38 also convolves the kernel computed for the KFI filter 23 with the CIR read from the memory 36 to generate a modified CIR descriptive of CIR at the output port of the KFI filter 23. FIG. 14 shows the computer 38 connected for writing this modified CIR to a memory 39 for modified CIR. A computer 40 has read access to the modified CIR stored in the memory 39. The computer 40 computes the initial kernel weights for the adaptive equalization filter 24 based on the modified CIR, methods for which are analogous to methods described in previous art. FIG. 14 shows the computers 38 and 40 as separate elements. However, one skilled in the art will perceive it to be possible to carry out the computations delegated to the computers 38 and 40 in a single microcomputer incorporating the memories 38 and 40 as registers in the microcomputer memory.

FIG. 15 shows a particular species of the FIG. 14 DTV receiver apparatus. This species is designed for receiving transmissions from the FIG. 3 DTV transmitter apparatus that include ECR signals of the sort shown in FIG. 1, 16 or 17. FIG. 15 shows in detail a species 135 of the circuitry 35 for responding to ECR signals to compute a close approximation to CIR. The circuitry 135 computes CIR from the approximated repetitive-PN1023 sequences that are included in ECR signals of the sort shown in FIG. 1. The circuitry 135 comprises a digital adder 1351, a memory 1352 and a PN1023 match filter network 1353. The digitized baseband DTV signal supplied as input signal to the cascade connection of the filters 23 and 24 is also applied to the digital adder 1351 as its augend input signal and to a memory 1352 as its write input signal. The memory 1352 is written with the initial three data segments of a 6-segment ECR signal supplied from the VSB AM demodulator 22 and temporarily stores them. The temporarily stored initial three data segments of the ECR signal are read from that memory 1352 concurrently with the final three data segments of the ECR signal being supplied from the VSB AM demodulator 22.

When an ECR signal is of the sort shown in FIG. 1, the memory 1352 stores the Nth, (N+1)th and (N+2)th data segments of each data field and reproduces those segments as a read output signal three data-segment intervals (i. e., 2496 symbol epochs) later. The read output signal from the memory 1352 is applied to the digital adder 1351 as its addend input signal. During the (N+3)th, (N+4)th and (N+5)th data segments of the data field shown in part in FIG. 1, the sum output signal from the digital adder 1351 will be a close approximation of a repetitive-PN1023 sequence swinging between +0.25 and +8.25 normalized modulation levels. This corresponds with a close approximation to a repetitive-PN1023 sequence swinging between −4 and +4 normalized modulation levels superposed on a pedestal of +4.25 normalized level. The sum output signal from the digital adder 1351 is supplied to a PN1023 match filter network 1353, the response of which match filter network 1353 to the closely approximated repetitive-PN1023 sequence will include a close approximation to CIR. The response of the PN1023 match filter network 1353 is supplied as write input signal to the memory 36 for storing the close approximation to CIR contained in that response.

The window decoder 37 detects that range of count from the symbol counter 34 in which the PN1023 match filter network 1353 generates a close approximation to CIR responsive to the ECR signals of the particular sort being used. The window decoder 37 generates a write-enable signal for the memory 36 during the corresponding range of time. The TRS-FEC-code decoder and error-correction circuitry 28 is designed for decoding the TRS FEC code that accompanies the ECR signals of the particular sort being used.

FIG. 16 shows a type of ECR signal different from the type shown in FIG. 1. The complete ECR signal is not transmitted in six consecutive data segments in a DTV broadcast system using the type of ECR signal shown in FIG. 16. Instead, a first half of the total ECR signal is transmitted in three consecutive data segments of the earlier field in each data frame, and a second half of the total ECR signal is transmitted in three consecutive data segments of the later field in each data frame. A legacy DTV receiver will necessarily be deprived of only fifty-four data segments per data field, rather than fifty-seven. Accordingly, the encoder 7 in the FIG. 3 DTV transmitter apparatus can be modified to generate shortened 255-byte R-S FEC codes used for transverse R-S FEC coding two groups of 129 data packets each in the remaining data field. E.g., (151, 129) R-S FEC codes with a total of 2×22×207=9, 108 parity bytes are possible. The bank 6 of memories is modified to include ECR signals per FIG. 16 in appropriate read-only storage locations.

The FIG. 15 DTV receiver apparatus is modified in the following respects for usefully receiving ECR signals of the sort shown in FIG. 16. When ECR signals of the sort shown in FIG. 16 are used, the memory 1352 is preferably operated on a read-and-then-overwrite basis. The memory 1352 temporarily stores the Nth, (N+1)th and (N+2)th data segments of each data field and reproduces those segments as a read output signal a data field interval later, for application to the digital adder 1352 as addend input signal. The window decoder 37 is designed to detect that range of count from the symbol counter 34 in which the PN1023 match filter network 1353 generates a close approximation to CIR responsive to ECR signals per FIG. 16. The window decoder 37 is designed to generate a write-enable signal for the memory 36 during the corresponding range of time. The TRS-FEC-code decoder and error-correction circuitry 28 is designed for decoding the TRS FEC code that accompanies the ECR signals of the sort shown in FIG. 16.

FIG. 17 shows a type of ECR signal different from the types shown in FIGS. 1 and 16 that is used in another DTV broadcast system. As shown in FIG. 17, a first half of the total ECR signal is transmitted in the 311th, 312th and 313th data segments of an Mth field of data; and a second half of the total ECR signal is transmitted in the 2nd, 3rd and 4th consecutive data segments of the (M+1)th next field of data frame. The DFS signal is interposed between halves of the ECR signal. This is preferable over ECR signal being contained within six consecutive data segments in that long delayed echoes of the first repetitive-PN1023 sequence are less apt to overlap the beginning portion of the second repetitive-PN1023 sequence and interfere with CIR measurement. Each six segments of the FIG. 17 ECR signal spoils fifty-four data segments at the conclusion of a data field and three data segments at the beginning of the next data field.

The FIG. 3 transmitter apparatus is modified in the following respects for transmitting the ECR signals of the type shown in FIG. 17. The bank 6 of memories is modified to include ECR signals per FIG. 17 in appropriate read-only storage locations. The encoder 7 generates shortened 255-byte R-S FEC codes of the same sort used when transmitting ECR signals of the type shown in FIG. 1, but these codes are written into different locations within the bank 6 of memories.

The FIG. 15 DTV receiver apparatus is modified in the following respects for usefully receiving ECR signals of the sort shown in FIG. 17. When an ECR signal is of the sort shown in FIG. 17, the memory 1352 stores the 311th, 312th and 313th data segments of each data field and reproduces those segments as a read output signal four data-segment intervals (i. e., 3328 symbol epochs) later. The window decoder 37 is designed to detect that range of count from the symbol counter 34 in which the PN1023 match filter network 1353 generates a close approximation to CIR responsive to ECR signals per FIG. 17. The window decoder 37 is designed to generate a write-enable signal for the memory 36 during the corresponding range of time. The TRS-FEC-code decoder and error-correction circuitry 28 is designed for decoding the TRS FEC code that accompanies the ECR signals of the sort shown in FIG. 17.

FIG. 18 shows in more detail a PN1023 match filter network 353 suitable for use as the PN1023 match filter network 1353 in the FIG. 15 DTV receiver apparatus. A PN1023 match filter 3530 in the network 353 is preceded by pedestal-suppression circuitry comprising a window decoder 3531, a sample averager 3532, latch-and-hold circuitry 3533, a read-only memory 3534, digital subtractors 3535 and 3536, digital delay circuitry 3537, a symbol multiplier 3538 and a decoder 3539 for DSS intervals. The window decoder 3531 is connected to respond to the count from the symbol counter 36. The window decoder 3531 responds with a ZERO output signal to all symbol counts except those occurring during the intervals that groups of early symbols occur in the summed repetitive-PN1023 sequences from the adder 1351. The window decoder 3531 responds with a ONE output signal throughout the time one of these groups of early symbols should be supplied from the adder 1351 in its sum output signal. This ONE conditions the sample averager 3532 to average the early symbols to determine the pedestal height. The latch-and-hold circuitry 3533 stores this pedestal height for application to the ROM 3534 as its read addressing input signal and to the digital subtractor 3535 as its subtrahend input signal. The ROM 3534 responds to the pedestal height supplied as its read addressing input signal with a read output signal 5/13 the pedestal height supplied to the digital subtractor 3536 as its subtrahend input signal, which approximates the pedestal height caused just by pilot carrier. The digital delay circuitry 3537 is connected to respond to the adder 37 sum output signal after a delay equal to the time the sample averager 3532 takes to determine the pedestal height. The delay circuitry 3537 is further connected to apply its delayed response to the subtractors 3535 and 3536 as their respective minuend input signals.

The difference output signals from the subtractors 3535 and 3536 are selectively reproduced by the symbol multiplexer 3538 to generate a repetitive-PN1023 sequence with its pedestal suppressed, which repetitive-PN1023 sequence is applied to the PN1023 match filter 3530 as input signal. The one of the difference output signals from the subtractors 3535 and 3536 to be reproduced by the symbol multiplexer 3538 is selected responsive to control signal supplied from the decoder 3539 for DSS intervals. More particularly, the decoder 3539 generates a ONE during DSS intervals, which control signal conditions the symbol multiplexer 3538 to select the difference output signal from the subtractor 3536 to be reproduced as input signal for the PN1023 match filter 3530. All other times the decoder 3539 for DSS intervals generates a ZERO, which control signal conditions the symbol multiplexer 3538 to select the difference output signal from the subtractor 3535 to be reproduced as input signal for the PN1023 match filter 3530.

The CIR is extracted from the PN1023 match filter 3530 response by writing a selected portion of the filter 3530 response to the memory 36 at a suitable interval. The suitable interval is determined by the window decoder 37 in the FIG. 15 DTV receiver apparatus.

In another species of the ECR signal shown in FIG. 1 the repetitive-PN1023 sequence in the (N+3)th, (N+4)th and (N+5)th data segments is complementary to the repetitive-PN1023 sequence in the Nth, (N+1)th and (N+2)th data segments, rather than being the same. In this species of the FIG. 1 ECR signal the first and second transition codes phase the $Z_0$ patterns similarly in the two halves of the ECR signal, rather than arranging for the $Z_0$ patterns in the two halves of the ECR signal to be in anti-phasing. An approximation to a repetitive-PN1023 sequence that is not superposed on a pedestal is obtained by differentially combining the portion of the ECR signal in the Nth, (N+1)th and (N+2)th data segments and the portion of the ECR signal in the (N+3)th, (N+4)th and (N+5)th data segments. This approximation to a repetitive-PN1023 sequence has nulls where the DSS sequences occur, however, which is the reason this species of the FIG. 1 ECR signal is less preferred.

The transmitter for this less preferred ECR signal is that shown in FIG. 3 with the bank 6 of memories modified to store this less-preferred species of the FIG. 1 ECR signal in read-only, storage locations. Furthermore, the transmitter for this less preferred ECR signal uses a type 214 of special 12-phase Viterbi trellis decoder 14 the construction of which is shown in more detail in FIG. 19. The first and second transition codes are identical in this less preferred ECR signal, and the construction of the trellis decoder 214 differs from that of the trellis decoder 114 accordingly. The derivation of $Z_0$ bits from bits used as $Z_1$ bits is carried out the same way as in a 12-phase trellis encoder of conventional design. Each successive bit used as a $Z_1$ bit is supplied as augend input signal to a modulo-2 adder 2140 that exclusive-ORs the bit with bit A supplied as addend input signal. This exclusive-ORing generates a modulo-2 sum bit S that is delayed twelve symbol epochs by digital delay circuitry 2141 to provide the $Z_0$ bit. The $Z_0$ bit is delayed an additional twelve symbol epochs by digital delay circuitry 2142 to provide a future bit A to be supplied as addend to the modulo-2 adder 2140.

A bit-stream selector 2143 is operated so that the bits in its output signal replicate the $X_1$ bits supplied from the convolutional interleaver 12 except when the transition codes precede the repetitive-PN1023 sequences used as ECR signals. A succeeding bit-stream selector 2144 is operated so that the $Z_1$ bits supplied as its output signal replicate the bits in the output signal from the selector 2143 except when the pre-coder 13 is reset. The resetting of the pre-coder 13 is done at times other than during the transition codes or the ECR signals, and the $Z_1$ bits from the trellis-code encoder 214 are all ZEROes during the ECR signals. The selector 2144 is connected for receiving the PRE-CODER RESET CONTROL SIGNAL as its -control signal. A "0" input port of the selector 2144 is connected for receiving the bits of the output signal of the selector 2143.

When the PRE-CODER RESET CONTROL SIGNAL is a ZERO, the selector 2144 reproduces in its output signal those bits received at its "0" input port. A "1" input port of the selector 2144 is connected for receiving each successive bit A. When the PRE-CODER RESET CONTROL SIGNAL is a ONE, the selector 2144 reproduces each successive bit A that is supplied as addend input signal to the adder 2140 for application to the adder 2140 as augend input signal. The modulo-2 adder 2140 exclusive-ORs the concurrent similar bits of its augend and addend input signals to generate ZEROes in its sum output signal so long as the PRE-CODER RESET CONTROL SIGNAL is a ONE. In a DTV broadcast system in which resetting of the special trellis-code encoder 14 is done only during transition code intervals, the trellis-code encoder 214 is modified, omitting the selector 2144 and obtaining $Z_1$ bits directly from the response of the selector 2143.

The trellis-code encoder 214 derives the $Z_1$ bits from successive A bits during the transition codes. The selection of the input signal that the selector 2143 reproduces in its output signal is determined by a control signal generated by a decoder 2145 responsive to particular ranges of symbol count from the counter 19. When both this control signal and the PRE-CODER RESET CONTROL SIGNAL are ZEROes, the $Z_1$ bits supplied from the bit-stream selector 2144 replicate the $X_1$ bits supplied from the convolutional interleaver 12. The decoder 2145 generates a ZERO output signal responsive to the count from the symbol counter 19 not being in any of the 24-symbol-epoch intervals in which a transition code should occur.

The decoder 2145 generates a ONE output signal responsive solely to the count from the symbol counter 19 being in one of the 24-symbol-epoch intervals in which a transition code should occur. A ONE output signal from the decoder 2145 conditions the selector 2143 to reproduce the sum output signal from a modulo-2 adder 2146 that receives the bit A as its augend input signal. The modulo-2 adder 2146 is connected to receive a binary addend input signal that is the same in the 24-symbol-epoch intervals in which the first and second transition codes respectively occur.

FIG. 19 shows this binary addend input signal to be, by way of specific example, the modulo-2 count from the symbol counter 19. One alternative binary addend input signal is a string of twenty-four ZEROes. In such case the structure of the FIG. 19 special 12-phase trellis encoder 214 can be simplified by omitting the modulo-2 adder 2146 and applying the bit A directly to the "1" input port of the selector 2143. Another alternative binary addend input signal is a string of twenty-four ONEs, and a simplified equivalent structure eliminates the modulo-2 adder 2146 in favor of a NOT gate complementing the bit A for application to the "1" input port of the selector 2143. When the less preferred ECR signal is contained within six consecutive segments of the field of interleaved data, the second transition code can be pre-programmed in the read-only storage locations within the bank 6 of memories. The decoder 2145 is then modified to generate a ONE output signal only in response to the count from the symbol counter 19 being in one of the 24-symbol-epoch intervals in which a first transition code should occur.

FIG. 20 shows a particular species of the FIG. 14 DTV receiver apparatus designed for receiving a species of the FIG. 1 ECR signal in which the approximated repetitive-PN1023 sequence in the (N+3)th, (N+4)th and (N+5)th data segments complements that in the Nth, (N+1)th and (N+2)th data segments. The FIG. 20 DTV receiver apparatus differs from the FIG. 15 DTV receiver apparatus in using a different species 235 of the circuitry 35 for responding to ECR signals to compute a close approximation to CIR. The circuitry 235 comprises a digital subtractor 2351, a memory 2352 and a PN1023 match filter 2353. The digitized baseband DTV signal supplied as input signal to the cascade connection of the filters 23 and 24 is also applied to the digital subtractor 2351, as one of its minuend and subtrahend input signals, and to a memory 2352 as its write input signal. The read output signal from the memory 2352 is applied to the subtractor 2351 as the other of its minuend and subtrahend input signals. The memory 2352 stores the Nth, (N+1)th and (N+2)th data segments of each data field reproduces those segments as a read output signal three data-segment intervals (i. e., 2496 symbol epochs) later. During the (N+3)th, (N+4)th and (N+5)th data segments of the data field shown in part in FIG. 1, the difference output signal from the digital subtractor 2351 approximates a repetitive-PN1023 sequence swinging between −4 and +4 normalized modulation levels. The difference output signal from the digital subtractor 2351 is supplied to the PN1023 match filter 2353, the response of which match filter 2353 to the repetitive-PN1023 sequence with nulls at DSS intervals will include a close approximation to CIR. Since the differentially combined repetitive-PN1023 sequences are not superposed on a pedestal, a simple PN1023 match filter 2353 is used instead of the PN1023 match filter network 53 including pedestal-suppression filtering. The response of the PN1023 match filter 2353 is supplied as write input signal to the memory 36 for storing the close approximation to CIR contained in that response.

The window decoder 37 detects that range of count from the symbol counter 34 in which the PN1023 match filter 2353 generates a close approximation to CIR responsive to the ECR signals of the particular sort being used. The window decoder 37 generates a write-enable signal for the memory 36 during the corresponding range of time. As noted supra, a particular species of the window decoder 37 is used in DTV receiver apparatus designed to receive FIG. 1 ECR signals of the type in which the second repetitive-PN1023 sequence is similar to the first repetitive-PN1023 sequence in each ECR signal. The same particular species of the window decoder 37 is used in DTV receiver apparatus designed to receive FIG. 1 ECR signals of the type in which the second repetitive-PN1023 sequence is complementary to the first repetitive-PN1023 sequence in each ECR signal. The TRS-FEC-code decoder and error-correction circuitry 28 is similar in the two DTV receiver apparatus designs.

In another species of the FIG. 17 ECR signal the repetitive-PN1023 sequence in the 1st, 2nd and 3rd data segments of a field of data is complementary to the repetitive-PN1023 sequence in the 311th, 312th and 313th data segments of the preceding field of data, rather than being the same. In this variant the first and second transition codes phase the $Z_0$ patterns similarly in the two halves of the ECR signal, rather than arranging for the $Z_0$ patterns in the two halves of the ECR signal to be in anti-phasing. An approximation to a repetitive-PN1023 sequence that is not superposed on a pedestal is obtained by differentially combining the portions of the ECR signal in successive data fields. This approximation to a repetitive-PN1023 sequence has nulls where the DSS sequences occur, however, which is the reason this species of the FIG. 17 ECR signal is less preferred.

The transmitter for DTV signal including this less preferred ECR signal is that shown in FIG. 3, with the bank 6 of memories modified to store this less-preferred species of the FIG. 17 ECR signal in read-only storage locations. Furthermore, the transmitter for DTV signal including this less preferred species of the FIG. 17 ECR signal uses the type 214 of special 12-phase Viterbi trellis decoder 14 shown in detail in FIG. 19.

The DTV receiver for usefully receiving DTV signal including this less preferred species of the FIG. 17 ECR signal is generically shown in FIG. 20. Specifically, the memory 2352 temporarily stores the 311th, 312th and 313th data segments of each data field and reproduces those segments as a read-output signal four data-segment intervals (i. e., 3328 symbol epochs) later. The read-output signal is supplied to the digital subtractor 2352 as one of its minuend and subtrahend input signals. The window decoder 37 is designed to detect that range of count from the symbol counter 34 in which the PN1023 match filter 2353 generates a close approximation to CIR responsive to ECR signals per FIG. 16. The window decoder 37 is designed to generate a write-enable signal for the memory 36 during the corresponding range of time. The TRS-FEC-code decoder and error-correction circuitry 28 is designed for decoding the TRS FEC code that accompanies the ECR signals of the sort shown in FIG. 16.

In another species of the ECR signal shown in FIG. 16 the repetitive-PN1023 sequence in the Nth, (N+1)th and (N+2)th data segments of the even field of data is complementary to the repetitive-PN1023 sequence in the Nth, (N+1)th and (N+2)th data segments of the odd field of data, rather than being the same. In this other species of the FIG. 16 ECR signal the first and second transition codes phase the $Z_0$ patterns similarly in the two halves of the ECR signal, rather than arranging for the $Z_0$ patterns in the two halves of the ECR signal to be in anti-phasing. An approximation to a repetitive-PN1023 sequence that is not superposed on a pedestal is obtained by subtracting the portion of the ECR signal in an odd data field from the portion of the ECR signal in an even data field. An approximation to the complement of that repetitive-PN1023 sequence, which also is not superposed on a pedestal, is obtained by subtracting the portion of the ECR signal in an odd data field from the portion of the ECR signal in an even data field. Both of these approximations to a repetitive-PN1023 sequence have nulls where the DSS sequences occur, however, which makes this species of the FIG. 16 ECR signal is less preferable.

The transmitter for DTV signal including this less preferred ECR signal is that shown in FIG. 3, with the bank 6 of memories modified to store this less-preferred species of the FIG. 16 ECR signal in read-only storage locations. Furthermore, the transmitter for DTV signal including this less preferred species of the FIG. 16 ECR signal uses the type 214 of special 12-phase Viterbi trellis decoder 14 shown in detail in FIG. 19.

The DTV receiver for usefully receiving DTV signal including this less preferred species of the FIG. 16 ECR signal is generically shown in FIG. 20. Specifically, the memory 2352 temporarily stores the Nth, (N+1)th and (N+2)th data segments of each data field and reproduces those segments as a read output signal a data field interval later, for application to the digital subtractor 2352 as addend input signal. The window decoder 37 is designed to detect that range of count from the symbol counter 34 in which the PN1023 match filter 2353 generates a close approximation to CIR responsive to ECR signals per FIG. 16. The window decoder 37 is designed to generate a write-enable signal for the memory 36 during the corresponding range of time. The TRS-FEC-code decoder and error-correction circuitry 28 is designed for decoding the TRS FEC code that accompanies the ECR signals of the sort shown in FIG. 16.

The computer 38 operates somewhat differently in the DTV receiver for usefully receiving DTV signal including this less preferred species of the FIG. 16 ECR signal, since the polarity of the CIR written to the memory 36 in initial fields of data frames is opposite in polarity to the CIR written to the memory 36 in final fields of data frames; Accordingly, the computer 38 takes into account whether the signal read to it from the memory 36 is a close approximation to CIR or to its complement. This is usually done by the computer 38 in initial procedures of converting close approximations to the complement of CIR to close approximations to CIR. This is done utilizing information concerning whether the current field is even or is odd, made available to the computer 38 from the symbol counter 34 via connection not explicitly shown in FIG. 20.

The ECR signals thusfar described introduce segments of data in which, in effect, the average amplitude of the pilot carrier signal is substantially increased from its normal value. This is probably is beneficial to the frequency- and phase-lock loop (FPLL) used in a typical DTV receiver for controlling the local oscillator used in synchrodyning the received DTV signal to baseband. However, conceivably the protracted increase in the average amplitude of the pilot carrier signal could disrupt the operation of some legacy DTV receivers. So, there is some interest in ECR signals with little or no tendency to increase the average amplitude of the pilot carrier signal.

ECR signals of the types depicted in FIGS. 1, 16 and 17 increase the average amplitude of the pilot carrier signal because all symbols are drawn from one of two cosets of symbols—namely, the one consisting of symbols with −3, −1, +5 and +7 normalized modulation levels. The inventor considered drawing all symbols from the other of the two cosets of symbols—namely, the one consisting of symbols with −7, −5, +1 and +3 normalized modulation levels. This would be advantageous in that, by properly resetting $Z_1$ bits at the outset of a repetitive-PN sequence, $Z_0$ bits can be forced to continually be all ONEs, thereby further restricting symbol values to just −5 and +3 normalized modulation levels. The disadvantage of such ECR signal is the protracted reduction of the average amplitude of the pilot carrier signal, which adversely affects the performance of FPLLs in many DTV receivers already in the field. However, this is better than resetting $Z_1$ bits at the outset of a repetitive-PN sequence in a different way that forces $Z_0$ bits to continually be all ZEROes, thereby further restricting symbol values to just −7 and +1 normalized modulation levels. This causes protracted reversal of carrier phase, which confounds the FPLLs of DTV receivers already in the field. Furthermore, DSS sequences are better subsumed into a repetitive-PN sequence with symbol values restricted to just −5 and +3 normalized modulation levels than into a repetitive-PN sequence with symbol values restricted to just −7 and +1 normalized modulation levels.

FIG. 21 shows three successive segments in each of two successive fields of interleaved DTV data which three consecutive segments include a respective ECR signal in which a 24-symbol transition code is followed by an approximated repetitive-PN1023 sequence composed mostly of symbols having −5 and +3 normalized modulation levels. The DSS sequences in the final two segments of each ECR signal are subsumed as well as possible into the repetitive-PN1023 sequence. The advantage of these ECR signals is that each is complete in just three data segments. There is no need for another three data segments to compensate against the effects of changing $Z_0$ bits in the symbol stream.

DTV transmitter apparatus for transmitting DTV signals including ECR signals per FIG. 21 is a species of the generic DTV transmitter apparatus shown in FIG. 3. The read-only ECR bytes stored in the bank 6 of memories of the FIG. 22 DTV transmitter apparatus use symbols having −5 and +3 normalized modulation levels, of course, rather than symbols having −3, −1, +5 and +7 normalized modulation levels. The species of the DTV transmitter apparatus for transmitting DTV signals including ECR signals per FIG. 21 uses a specific type 314 of the special 12-phase trellis encoder 14, as well.

FIG. 22 shows this specific type 314 of special 12-phase trellis encoder 14 as well as the special 12-phase pre-coder 13 in more detail. The derivation of $Z_0$ bits from bits used as $Z_1$ bits is carried out the same way as in a 12-phase trellis encoder of conventional design. Each successive bit used as a $Z_1$ bit is supplied as augend input signal to a modulo-2 adder 3140 that exclusive-ORs the bit with bit A supplied as addend input signal. This exclusive-ORing generates a modulo-2 sum bit S that is delayed twelve symbol epochs by digital delay circuitry 3141 to provide the $Z_0$ bit. The $Z_0$ bit is delayed an additional twelve symbol epochs by digital delay circuitry 3142 to provide a future bit A to be supplied as addend to the modulo-2 adder 3140.

A bit-stream selector 3143 is operated so that the bits in its output signal replicate the $X_1$ bits supplied from the convolutional interleaver 12 except when the transition codes precede the repetitive-PN1023 sequences used as ECR signals. A succeeding bit-stream selector 3144 is operated so that the $Z_1$ bits supplied as its output signal replicate the bits in the output signal from the selector 3143 except when the pre-coder 13 is reset. The resetting of the pre-coder 13 is done at times other than during the transition codes or the ECR signals, and the $Z_1$ bits from the trellis-code encoder 314 are all ONEs during the ECR signals. The selector 3144 is connected for receiving the PRE-CODER RESET CONTROL SIGNAL as its control signal. A "0" input port of the selector 3144 is connected for receiving the bits of the output signal of the selector 3143. When the PRE-CODER RESET CONTROL SIGNAL is a ZERO, the selector 3144 reproduces in its output signal those bits received at its "0" input port. A "1" input port of the selector 3144 is connected for receiving each successive bit A. When the PRE-CODER RESET CONTROL SIGNAL is a ONE, the selector 3144 reproduces each successive bit A that is supplied as addend input signal to the adder 3140 for application to the adder 3140 as augend input signal. The modulo-2 adder 3140 exclusive-ORs the concurrent similar bits of its augend and addend input signals to generate ZEROes in its sum output signal so long as the PRE-CODER RESET CONTROL SIGNAL is a ONE. In a DTV broadcast system in which resetting of the special trellis-code encoder 14 is done only during transition code intervals, the trellis-code encoder 314 is modified omitting the selector 3144 and obtaining $Z_1$ bits directly from the response of the selector 3143.

The trellis-code encoder 314 derives the $Z_1$ bits from successive A bits during the transition codes. The selection of the input signal that the selector 3143 reproduces in its output signal is determined by a control signal generated by a decoder 3145 responsive to particular ranges of symbol count from the counter 19. When both this control signal and the PRE-CODER RESET CONTROL SIGNAL are ZEROes, the $Z_1$ bits supplied from the bit-stream selector 3144 replicate the $X_1$ bits supplied from the convolutional interleaver 12. The decoder 3145 generates a ZERO output signal responsive to the count from the symbol counter 19 not being in any of the 24-symbol-epoch intervals in which a transition code should occur.

The decoder 3145 generates a ONE output signal responsive solely to the count from the symbol counter 19 being in one of the 24-symbol-epoch intervals in which a transition code should occur. A ONE output signal from the decoder 3145 conditions the selector 3143 to reproduce the output signal from a NOT gate 3146 connected to complement the bit A supplied as the response from the digital delay circuitry 3142. Presuming that the PRE-CODER RESET CONTROL SIGNAL is ZERO, the selector 3144 is conditioned to reproduce the output signal of the NOT gate 3146 as reproduced by the selector 3143. This further reproduced output signal of the NOT gate 3146 causes the modulo-2 sum bit S from the modulo-2 adder 3140 to be twenty-four consecutive ONES during each 24-symbol-epoch interval in which a transition code is to occur. These ONEs continue to circulate in the loop connection through elements 3140, 3141 and 3142 while $Z_1$ bits are ZERO during the repetitive-PN1023 sequence. These circulating ONEs keep $Z_0$ bits ONE during the repetitive-PN1023 sequence, so its symbols are confined to just −5 and +3 normalized modulation values.

FIG. 23 shows DTV receiver apparatus for receiving DTV signals containing ECR signals per FIG. 21 and extracting CIR from approximated repetitive-PN1023 sequences that are the same polarity in all fields and have symbols mostly confined to just −5 and +3 normalized modulation values. The FIG. 23 DTV receiver apparatus uses a different species 335 of the circuitry 35 for responding to ECR signals to compute a close approximation to CIR. This species 335 of the circuitry 35 is composed of pedestal-suppression circuitry 3351 and a PN1023 match filter 3352 in cascade connection. The pedestal-suppression circuitry 3351 is, for example, of a type generally similar to that described supra with reference to FIG. 18. The scaling of pedestal heights during DSS intervals and other portions of the repetitive-PN1023 sequences is adjusted differently, as will be apparent to one skilled in the art of DTV receiver design. In FIG. 23 the pedestal-suppression circuitry 3351 is connected for receiving baseband DTV signal directly from the VSB AM demodulator 22 and for delivering the baseband DTV signal without pedestal to the PN1023 match filter 3352. The portion of the response of the PN1023 match filter 3352 that contains the CIR is written into the CIR memory 36 responsive to write-enable signal supplied from the window decoder 237. The FIG. 20 DTV receiver apparatus is suitable for receiving extracting CIR from ECR signals in which approximated repetitive-PN1023 sequences differ in polarity in consecutive fields and have symbols mostly confined to just −5 and +3 normalized modulation values.

FIG. 24 depicts three successive segments in each of two successive fields of interleaved DTV data, each of which groups of three successive segments contains a respective approximated repetitive-PN1023 sequence composed mostly of symbols having −5 and +3 normalized modulation levels. The second approximated repetitive-PN1023 sequence in the 2nd, 3rd and 4th segments of the (M+1)th data field is complementary to the first approximated repetitive-PN1023 sequence in the 311th, 312th and 313th segments of the Mth data field. These ECR signals are usefully received by FIG. 20 DTV receiver apparatus in which the memory 2352 delays the 311th, 312th and 313th segments of the Mth data field four data segment intervals for being differentially combined with the 2nd, 3rd and 4th segments of the (M+1)th data field.

The inventor discerned that more robust transmissions could be made using a restricted set of 8VSB symbols confined just to −5 and +3 normalized modulation levels. Somewhere around a 6 DB or better improvement in threshold of visibility over ⅔ trellis-coded 8VSB should be possible in an AWGN environment, owing to the quadrupled distance between permitted modulation levels. Such robust transmissions and the ECR signals confined just to −5 and +3 normalized modulation levels may not be received well by all legacy DTV receivers, however. FPLLs will not be as tightly controlled because there is a reduction in average amplitude of carrier energy relative to sideband energy. More recent DTV receivers are designed to achieve good frequency and phase lock of the local oscillators employed in synchronous detection despite complete loss of carrier, relying on some variation of the Costas loop technique. But DTV receivers of older design are apt to perform poorly when the average amplitude of carrier energy relative to sideband energy is reduced. Problems may arise in some legacy DTV receivers with regard to some forms of automatic gain control (AGC) because of the reduction in the average modulation level when long stretches of data are confined to −5 and +3 normalized modulation levels. Baseband DTV signal confined just to −5 and +3 normalized modulation levels are superposed on a pedestal of different value than ordinary 8VSB baseband DTV signal. This conceivably might cause problems in coping with direct signal offsets of baseband DTV signals in some legacy DTV receivers.

The inventor ascertained that there is no protracted reversal of carrier phase if the repetitive-PN sequence with symbol values restricted to just −7 and +1 normalized modulation levels is interleaved symbol by symbol with an approximated repetitive-PN sequence with symbol values having −3, −1, +5 and +7 normalized modulation levels. The inventor discerned there is still less strain on the FPLLs of DTV receivers if the repetitive-PN sequence with symbol values restricted to just −5 and +3 normalized modulation levels is interleaved symbol by symbol with the approximated repetitive-PN sequence. These observations encouraged the inventor to contemplate an ECR signal comprising two repetitive-PN511 sequences in which each +1 or −1 value occupied two symbol epochs. One of the symbol epochs would use symbols from a first coset of 8VSB symbols having −3, −1, +5 and +7 normalized modulation levels. The other of the symbol epochs would use symbols from a second coset of 8VSB symbols having −7, −5, +1 and +3 normalized modulation levels. Such an ECR signal avoids problems with legacy DTV receivers. However, the resolution of the CIR is undesirably reduced to that of a halved-code-rate PN511 sequence. Resolution is half that for a full-code-rate PN1023 sequence, so these embodiments of the invention are not preferred.

The ECR signals considered thusfar in this specification are based upon repetitive PN sequences that ideally considered have either a +1 or a −1 normalized level at each successive symbol epoch. The inventor has discerned that another general class of ECR signals useful in measuring CIR can be based upon sequences the inventor believes to be novel, which he calls "expanded repetitive PN sequences". An expanded repetitive PN sequence has either a +1 or a −1 normalized level every Kth successive symbol epoch, K being a positive integer greater than one; and intervening symbols have a 0 normalized level. The match filter used to measure CIR has a kernel corresponding to one cycle of this expanded PN sequence.

An expanded repetitive-PN511 sequence with K=2 is of particular interest to DTV because CIR can be measured without wrap-around effects over substantially the same 95 microsecond echo range as possible with a repetitive-PN1023 sequence that is not expanded. An expanded repetitive-PN511 sequence cannot be used of itself as an ECR signal, because null samples are not included in the 8VSB symbol alphabet and therefore cannot be subsumed into the ⅔ trellis coding of data fields. Two expanded repetitive-PN511 sequences with K=2 can be interleaved. If the two repetitive-PN511 sequences are orthogonal to each other, neither will have appreciable effect on the match filtering of the other. Resolution of each expanded repetitive-PN511 sequence is the same as that for a full-code-rate PN1023 sequence since it is not interleaved with a similar expanded repetitive-PN511 sequence so their respective echo spectra cannot be distinguished from each other. A known property of any PN sequence whatsoever is that it is orthogonal to the PN sequence of same length in which +1 and −1 normalized levels appear in reversed order. The inventor has found it to follow that a property of any expanded PN sequence is that it is orthogonal to the expanded PN sequence of same length in which +1, 0 and −1 normalized levels appear in reversed order. The inventor has discerned that the match filter for an expanded PN sequence will not respond to an expanded PN sequence that is of the same length and is orthogonal to the expanded PN sequence to which the match filter is designed to respond.

FIG. 25 depicts six successive segments of a field of interleaved DTV data that contain an ECR signal in each half of which a pair of approximated repetitive-PN511 sequences are interleaved with each other symbol by symbol. The repetitive-PN511 sequences that are approximated are mutually orthogonal. A first one of the approximated repetitive-PN511 sequences, contained both within the initial three data segments and within the final three data segments, uses symbols chosen from a first coset of 8VSB symbols having −3, −1, +5 and +7 normalized modulation levels. The second and other one of the approximated repetitive-PN511 sequences, contained both within the initial three data segments and within the final three data segments, uses symbols from a second coset of 8VSB symbols having −7, −5, +1 and +3 normalized modulation levels. Each of the six data segments begins with a 4-symbol DSS sequence, and the DSS sequences in the (N+1)th, (N+2)th, (N+4)th and (N+5)th data segments are preferably subsumed into the approximated repetitive-PN511 sequences as well as possible. The DSS sequences in the Nth and (N+3)th data segments are immediately followed by first and second 24-symbol transition codes, respectively.

The DTV transmitter apparatus for transmitting DTV signals including ECR signals of the sort shown in FIG. 25 is the FIG. 3 DTV transmitter apparatus with the following modifications. The bank 6 of memories store bytes of the FIG. 25 ECR signal in selected read-only storage locations, rather than storing bytes of any of the ECR signals shown in earlier figures of the drawing. A particular embodiment 414 of the special 12-phase trellis-code encoder 14 is used.

FIG. 26 shows in detail this particular embodiment 414 of the trellis-code encoder 14. The derivation of $Z_0$ bits from bits used as $Z_1$ bits is carried out the same way in the encoder 414 as in a 12-phase trellis-code encoder of conventional design. Each successive bit used as a $Z_1$ bit is supplied as augend input signal to a modulo-2 adder 4140 that exclusive-ORs the bit with bit A supplied as addend input signal. This exclusive-ORing generates a modulo-2 sum bit S that is delayed twelve symbol epochs by digital delay circuitry 4141 to provide the $Z_0$ bit. The $Z_0$ bit is delayed an additional twelve symbol epochs by digital delay circuitry 4142 to provide a future bit A to be supplied as addend to the modulo-2 adder 4140.

A bit-stream selector 4143 in the trellis-code encoder 414 is operated so that the bits in its output signal replicate the $X_1$ bits supplied from the convolutional interleaver 12 except during the transition codes of first and second types that precede the interleaved repetitive-PN511 sequences used as ECR signals. A succeeding bit-stream selector 4144 is operated so that the $Z_1$ bits supplied as its output signal replicate the bits in the output signal from the selector 4143 except when the pre-coder 13 is reset. The resetting of the pre-coder 13 is done at times other than during the transition codes or the ECR signals, and the $Z_1$ bits from the trellis-code encoder 414 alternate being ONE and ZERO during the ECR signals. When the PRE-CODER RESET CONTROL SIGNAL is a ONE, the selector 4144 reproduces each successive bit A that is supplied as addend input signal to the adder 4140 for application to the adder 4140 as augend input signal. The modulo-2 adder 4140 exclusive-ORs the concurrent similar bits of its augend and addend input signals to generate ZEROes in its sum output signal so long as the PRE-CODER RESET CONTROL SIGNAL is a ONE. In a DTV broadcast system in which resetting of the special trellis-code encoder 14 is done only during transition code intervals, the trellis-code encoder 414 is modified, omitting the selector 4144 and obtaining $Z_1$ bits directly from the response of the selector 4143.

The trellis-code encoder 414 derives the $Z_1$ bits from successive A bits during the transition codes. The selection of the input signal that the selector 4143 reproduces in its output signal is determined by a pair of control signals supplied by decoders 4145 and 4146 responsive to particular ranges of symbol count from the counter 19. When these control signals and the PRE-CODER RESET CONTROL SIGNAL are ZEROes all, the $Z_1$ bits supplied from the bit-stream selector 4144 replicate the $X_1$ bits supplied from the convolutional interleaver 12. A condition in which both of these control signals is ONE never occurs.

The decoder 4145 generates a ONE output signal responsive solely to the count from the symbol counter 19 being in one of the 24-symbol-epoch intervals in which the transition code of first type should occur. The decoder 4145 generates a ZERO output signal responsive to the count from the symbol counter 19 not being in any of those 24-symbol-epoch intervals. A ONE output signal from the decoder 4145 conditions the selector 4143 to reproduce the sum output signal from a modulo-2 adder 4147 supplied to a node 4148.

The decoder 4146 generates a ONE output signal responsive solely to the count from the symbol counter 19 being in one of the 24-symbol-epoch intervals in which the transition code of second type should occur. The decoder 4146 generates a ZERO output signal responsive to the count from the symbol counter 19 not being in any of those 24-symbol-epoch intervals. A ONE output signal from the decoder 4146 conditions the selector 4143 to reproduce the response of a NOT gate 4149 to the sum output signal from the modulo-2 adder 4147 supplied to the node 4148.

The modulo-2 adder 4147 receives the bit A as its augend input signal. The modulo-2 adder 4147 is connected to receive the response of a two-input OR gate 414A as addend input signal. The first input port of the OR gate 414A is connected to receive the modulo-2 count bit from the symbol counter 19. The second input port of the OR gate 414A is connected to receive the output signal from a decoder 414B connected to respond to the count from the symbol counter 19. A decoder 414B generates a ONE output signal responsive solely to that symbol count being within a specified dozen contiguous symbol epochs within each one of the 24-symbol-epoch intervals in which a transition code of either first type or second type should occur. The specified dozen contiguous symbol epochs are either the initial dozen or, alternatively, the final dozen.

In either case, the response of the OR gate 414A is ONE for each odd modulo-2 symbol count during the initial half of a 24-symbol-epoch interval in which a transition code should occur and is also ONE twelve symbol epochs later. The symbols twelve symbol epochs apart are similar for each of the six odd phases of a transition code. These similarities establish in each odd phase of the transition code one of the transition coding conditions for continuing with $Z_1$ bits that are all ONEs in that phase. This helps implement the transmission of an approximation of the expanded repetitive-PN511 sequence using the first coset of 8VSB symbols having −3, −1, +5 and +7 normalized modulation levels. FIGS. 6, 7, 8, 9, 10, 11, 12 and 13 tabulate the possible states in one odd phase of the 12-phase coding performed by the FIG. 26 trellis encoder 414 for transmitting this approximated repetitive-PN511 sequence, presuming various sets of previous transmission conditions. The reader is referred back to paragraph 0084 of this specification for explanation of what FIGS. 6, 7, 8, 9, 10, 11, 12 and 13 illustrate.

If the specified dozen contiguous symbol epochs during which the decoder 414B generates a ONE output signal is the initial dozen, the response of the OR gate 414A is ONE for each even modulo-2 symbol count during the initial half of a 24-symbol-epoch interval in which a transition code should occur. However, it will be a ZERO twelve symbol epochs later. If the specified dozen contiguous symbol epochs during which the decoder 414B generates a ONE output signal is the final dozen, the response of the OR gate 414A is ZERO for each even modulo-2 symbol count during the initial half of a 24-symbol-epoch interval. However, it will be a ONE twelve symbol epochs later. In either case, the symbols twelve symbol epochs apart are dissimilar for each of the six even phases of a transition code. These dissimilarities establish in each even phase of the transition code one of the transition coding conditions for continuing with $Z_1$ bits that are all ZEROes in that phase. This helps implement the transmission of an approximation of the expanded repetitive-PN511 sequence using the second coset of 8VSB symbols having −7, −5, +1 and +3 normalized modulation levels.

FIGS. 27, 28, 29, 30, 31, 32, 33 and 34 tabulate the possible states in one even phase of the 12-phase coding performed by the FIG. 26 trellis encoder 414 for transmitting this approximated repetitive-PN511 sequence, presuming various sets of previous transmission conditions. The column heads A, $Z_1$, S and $Z_0$ correspond to those signals at nodes correspondingly labeled in the FIG. 26 schematic diagram of the trellis encoder 414, and each succeeding row represents the states of those signals after a twelve-symbol-epoch interval. FIGS. 27, 28, 29 and 30 illustrate how, for each of the four possible combinations of initial A and $Z_0$ bits, the FIG. 26 trellis encoder 414 causes $Z_0$ bits for one phase of trellis coding to be brought into conformity with a prescribed repetitive ZERO, ONE, ZERO, ONE pattern. This is done by the trellis encoder 414 causing the initial $Z_1$ bit to replicate the concurrent A bit and the second $Z_1$ bit to be complementary to the concurrent A bit during that phase of a transition code. FIGS. 31, 32, 33 and 34 illustrate how, for each of the four possible combinations of initial A and $Z_0$ bits, the FIG. 26 trellis encoder 414 causes $Z_0$ bits for one phase of trellis coding to be brought into conformity with a prescribed repetitive ONE, ZERO, ONE, ZERO pattern. This is done by the trellis encoder 414 causing the initial $Z_1$ bit to be complementary to the concurrent A bit and the second $Z_1$ bit to replicate the concurrent A bit during that phase of a transition code.

FIG. 35 shows generic DTV receiver apparatus for extracting CIR from ECR signals per FIG. 25, 37 or 38 that are included in received DTV signals. The FIG. 35 generic DTV receiver apparatus differs from the FIG. 15 generic DTV receiver apparatus in using a different species 435 of the circuitry 35 for responding to ECR signals to compute a close approximation to CIR. The circuitry 435 comprises a digital adder 4351, a memory 4352 and a match filter network 4353 for interleaved mutually orthogonal PN511 sequences. The digital adder 4351 is connected for summing samples of the current ECR signal in the baseband DTV signal supplied from the VSB AM demodulator 22 with respective samples of a delayed ECR signal read from the memory 4352. The memory 4352 in specific FIG. 35 DTV receiver apparatus for extracting CIR from ECR signals per FIG. 25 stores the Nth, (N+1)th and (N+2)th data segments of each data field and reproduces those segments as a read output signal three data-segment intervals (i.e., 2496 symbol epochs) later. The memory 4352 in specific FIG. 35 DTV receiver apparatus for extracting CIR from ECR signals per FIG. 37 stores the Nth, (N+1)th and (N+2)th data segments of each data field and reproduces those segments as a read output signal one data field time later. The memory 4352 in specific FIG. 35 DTV receiver apparatus for extracting CIR from ECR signals per FIG. 38 stores the 311th, 312th and 313th data segments of each data field and reproduces those segments as a read output signal four data-segment intervals (i.e., 3328 symbol epochs) later.

FIG. 36 shows in detail a representative embodiment of the match filter network 4353 for interleaved mutually orthogonal PN511 sequences. A digital adder 41 is connected to receive the adder 4351 sum output response as augend input signal and to receive as addend input signal the adder 4351 sum output response as delayed one symbol epoch by a shift register 42. The sum output signal from the adder 41 places the interleaved repetitive-PN511 sequences on a uniform pedestal attributable to the pilot carrier and interleaved $Z_0$ bits, but introduces a spurious 1-symbol-delayed post-echo. The sum output signal from the adder 41 is applied as input signal to a pedestal suppressor 43. The pedestal suppressor 43 is generally similar to the pedestal suppression circuitry comprising elements 391-399 shown in FIG. 18 except for adjustment of the scaling factor stored in the ROM 394. The output signal from the pedestal suppressor 43 reproduces the adder 41 sum output signal freed from attendant pedestal. This pedestal-free signal is applied as minuend input signal to a digital subtractor 44, the difference output signal from which is delayed one symbol epoch by a shift register 45 for application to the subtractor 44 as its subtrahend input signal. This feedback of delayed difference output signal suppresses the spurious 1-symbol-delayed post-echo in the difference output signal from the subtractor 45. Clocking of samples forward through the expanded-PN511 match filter network 4353 proceeds only so long as the adder 4351 sum output response combines the delayed ECR signal read from the memory 4352 with the current ECR signal from the VSB AM demodulator 22.

The subtractor 44 difference output signal is supplied as respective input signals to a a match filter 46 for the leading-phase repetitive-PN511 sequence and to a match filter 47 for the lagging-phase repetitive-PN511 sequence. The response of the match filter 47 is supplied to a digital adder 48 as its augend input signal. The response of the match filter 46 is delayed one symbol epoch by a one-stage shift register 49 for application to the adder 48 as its addend input signal. The sum output signal from the adder 48 is supplied to the memory 36 as the output signal from the expanded-PN511 match filter network 4353. Alternatively, just the response from one of the match filters 46 and 47 could provide the output signal from the expanded-PN511 match filter network 4353, with the other of the match filters 46 and 47 being dispensed with as unnecessary. Combining the respective responses of the match filters 46 and 47 improves the signal-to-noise ratio of the CIR, however.

FIG. 37 is a diagram of three successive segments in each of two successive fields of interleaved DTV data, each of which groups of three successive segments in accordance with an aspect of the invention contains a respective ECR signal in which approximated repetitive-PN511 sequences that are mutually orthogonal to each other are interleaved with each other symbol by symbol. The DTV transmitter apparatus for transmitting DTV signals including ECR signals of the sort shown in FIG. 37 is the FIG. 3 DTV transmitter apparatus with the following modifications. The bank 6 of memories store bytes of the FIG. 37 ECR signal in selected read-only storage locations, rather than storing bytes of any of the ECR signals shown in earlier figures of the drawing. The species 414 of the special 12-phase trellis encoder 14 is used.

FIG. 38 shows DTV signal wherein a respective DFS sequence is interposed between halves of an ECR signal each containing a respective pair of approximated repetitive-PN511 sequences interleaved with each other symbol by symbol. The DTV transmitter apparatus for transmitting DTV signals including ECR signals of the sort shown in FIG. 38 is the FIG. 3 DTV transmitter apparatus with the following modifications. The bank 6 of memories store bytes of the FIG. 38 ECR signal in selected read-only storage locations, rather than storing bytes of any of the ECR signals shown in earlier figures of the drawing. The species 414 of the special 12-phase trellis encoder 14 is used.

There is another specific type of FIG. 25 ECR signal in which the interleaved repetitive-PN511 sequences in the final half of each ECR signal are essentially complementary to those in the initial half, rather than being essentially the same. The FIG. 3 DTV transmitter apparatus uses a different type 514 of the special 12-phase trellis encoder 14 when transmitting DTV using this other type of FIG. 25 ECR signal. Also, in the bank 6 of four memories, the bytes of FIG. 25 ECR signal stored in two of the memories are complementary to the bytes of FIG. 25 ECR signal stored in the other two of the memories, rather than being alike.

FIG. 39 shows in more detail the type 514 of the special 12-phase trellis encoder 14 included in DTV transmitter apparatus used for transmitting DTV signal including the ECR signal per FIG. 25 in which the interleaved repetitive-PN511 sequences in the final half of each ECR signal are essentially complementary to those in the initial half, rather than being essentially alike. The derivation of $Z_0$ bits from bits used as $Z_1$ bits is carried out the same way as in a 12-phase trellis encoder of conventional design. Each successive bit used as a $Z_1$ bit is supplied as augend input signal to a modulo-2 adder 5140 that exclusive-ORs the bit with bit A supplied as addend input signal. This exclusive-ORing generates a modulo-2 sum bit S that is delayed twelve symbol epochs by digital delay circuitry 5141 to provide the $Z_0$ bit. The $Z_0$ bit is delayed an additional twelve symbol epochs by digital delay circuitry 5142 to provide a future bit A to be supplied as addend to the modulo-2 adder 5140.

A bit-stream selector 5143 in the trellis-code encoder 514 is operated so that the bits in its output signal replicate the $X_1$ bits supplied from the convolutional interleaver 12 except during the transition codes that precede the interleaved repetitive-PN511 sequences used as ECR signals. A succeeding bit-stream selector 5144 is operated so that the $Z_1$ bits supplied as its output signal replicate the bits in the output signal from the selector 5143 except when the pre-coder 13 is reset. The resetting of the pre-coder 13 is done at times other than during the transition codes or the ECR signals, and the $Z_1$ bits from the trellis-code encoder 514 alternate being ONE and ZERO during the ECR signals. When the PRE-CODER RESET CONTROL SIGNAL is a ONE, the selector 5144 reproduces each successive bit A that is supplied as addend input signal to the adder 5140 for application to the adder 5140 as augend input signal. The modulo-2 adder 5140 exclusive-ORs the concurrent similar bits of its augend and addend input signals to generate ZEROes in its sum output signal so long as the PRE-CODER RESET CONTROL SIGNAL is a ONE. In a DTV broadcast system in which resetting of the special trellis-code encoder 14 is done only during transition code intervals, the trellis-code encoder 514 is modified, omitting the selector 5144 and obtaining $Z_1$ bits directly from the response of the selector 5143.

The trellis-code encoder 514 derives the $Z_1$ bits from successive A bits during the transition codes. The selection of the input signal that the selector 5143 reproduces in its output signal is determined by a control signal supplied by a decoder 5145 responsive to particular ranges of symbol count from the counter 19. When both this control signal and the PRE-CODER RESET CONTROL SIGNAL are ZEROes, the $Z_1$ bits supplied from the bit-stream selector 5144 replicate the $X_1$ bits supplied from the convolutional interleaver 12.

The decoder 5145 generates a ONE output signal solely responsive to the count from the symbol counter 19 being in one of the 24-symbol-epoch intervals in which a transition code should occur. The decoder 5145 generates a ZERO output signal responsive to the count from the symbol counter 19 not being in any of those 24-symbol-epoch intervals. A ONE output signal from the decoder 5145 conditions the selector 5143 to reproduce the sum output signal from a modulo-2 adder 5146.

The modulo-2 adder 5146 receives the bit A as its augend input signal. The modulo-2 adder 5146 is connected to receive the response of a two-input OR gate 5147 as addend input signal. The first input port of the OR gate 5147 is connected to receive the modulo-2 count bit from the symbol counter 19. The second input port of the OR gate 5147 is connected to receive the output signal from a decoder 5148 connected to respond to the count from the symbol counter 19. The decoder 5148 generates a ONE output signal responsive solely to that symbol count being within a specified dozen contiguous symbol epochs within each one of the 24-symbol-epoch intervals in which a transition code of either first or second type should occur. The specified dozen contiguous symbol epochs are either the initial dozen or, alternatively, the final dozen.

In either case, the response of the OR gate 5147 is ONE for each odd modulo-2 symbol count during the initial half of a 24-symbol-epoch interval in which a transition code should occur and is also ONE twelve symbol epochs later. The symbols twelve symbol epochs apart are similar for each of the six odd phases of a transition code. These similarities establish in each odd phase of the transition code one of the transition coding conditions for continuing with $Z_1$ bits that are all ONEs in that phase. This helps implement the transmission of an approximation of the expanded repetitive-PN511 sequence using the first coset of 8VSB symbols having −3, −1, +5 and +7 normalized modulation levels.

If the specified dozen contiguous symbol epochs during which the decoder 5148 generates a ONE output signal is the initial dozen, the response of the OR gate 5147 is ONE for each even modulo-2 symbol count during the initial half of a 24-symbol-epoch interval in which a transition code should occur. However, it will be a ZERO twelve symbol epochs later. If the specified dozen contiguous symbol epochs during which the decoder 5148 generates a ONE output signal is the final dozen, the response of the OR gate 5147 is ZERO for each even modulo-2 symbol count during the initial half of a 24-symbol-epoch interval. However, it will be a ONE twelve symbol epochs later. In either case, the symbols twelve symbol epochs apart are dissimilar for each of the six even phases of a transition code. These dissimilarities establish in each even phase of the transition code one of the transition coding conditions for continuing with $Z_1$ bits that are all ZEROes in that phase. This helps implement the transmission of an approximation of the expanded repetitive-PN511 sequence using the second coset of 8VSB symbols having −7, −5, +1 and +3 normalized modulation levels.

There is another specific type of FIG. 37 ECR signal in which the interleaved repetitive-PN511 sequences in the final half of each ECR signal are essentially complementary to those in the initial half, rather than being essentially alike. The special 12-phase trellis encoder 514 of FIG. 39 is used as the trellis encoder 14 in the FIG. 3 DTV transmitter apparatus when transmitting DTV signal that includes this other type of FIG. 37 ECR signal. Also, in the bank 6 of four memories, the bytes of FIG. 37 ECR signal stored in two of the memories are complementary to the bytes of FIG. 37 ECR signal stored in the other two of the memories, rather than the bytes of FIG. 37 ECR signal stored in all four of the memories being the same.

There is another specific type of FIG. 38 ECR signal in which the interleaved repetitive-PN511 sequences in the final half of each ECR signal are essentially complementary to those in the initial half, rather than being essentially alike. The special 12-phase trellis encoder 514 of FIG. 39 is used as the trellis encoder 14 in the FIG. 3 DTV transmitter apparatus when transmitting DTV using this other type of FIG. 38 ECR signal. Also, in the bank 6 of four memories, the bytes of FIG. 38 ECR signal stored in two of the memories are complementary to the bytes of FIG. 38 ECR signal stored in the other two of the memories, rather than being alike.

FIG. 40 shows DTV receiver apparatus suited for extracting CIR from received FIG. 25, FIG. 37 or FIG. 38 DTV signals of the specific type in which the interleaved repetitive-PN sequences in the final half of each ECR signal are essentially complementary to those in the initial half, rather than being essentially alike. The FIG. 40 DTV receiver apparatus differs from the FIG. 35 DTV receiver apparatus in using a different species 535 of the circuitry 35 for responding to ECR signals to compute a close approximation to CIR. The circuitry 535 comprises a digital subtractor 5351, a memory 5352 and a match filter 5353 for interleaved orthogonal PN511 sequences. The digitized baseband DTV signal supplied as input signal to the cascade connection of the filters 23 and 24 is also applied to the digital subtractor 5351, as one of its minuend and subtrahend input signals, and to a memory 5352 as its write input signal. The read output signal from the memory 5352 is applied to the subtractor 5351 as the other of its minuend and subtrahend input signals. The subtractor 5351 is connected for supplying its difference output signal to the match filter 5353 for interleaved orthogonal PN511 sequences.

The match filter 5353 can have a structure similar to that portion of the FIG. 36 match filter network 4353 that is subsequent to the digital subtractor 44. In such structure a pair of PN511 match filters, one for each of the orthogonal repetitive-PN511 sequences interleaved symbol by symbol in the ECR signals, receives difference output signal from the subtractor 5351. The response of the match filter for the leading-phase repetitive-PN511 sequence is delayed one symbol epoch and summed with the response of the match filter for the lagging-phase repetitive-PN511 sequence to generate as the sum signal an approximation of CIR that is subsequently written into the memory 36.

The memory 4352 in specific FIG. 35 DTV receiver apparatus for extracting CIR from ECR signals per FIG. 25 stores the Nth, (N+1)th and (N+2)th data segments of each data field and reproduces those segments as a read output signal three data-segment intervals (i. e., 2496 symbol epochs) later. The memory 4352 in specific FIG. 35 DTV receiver apparatus for extracting CIR from ECR signals per FIG. 38 stores the 311th, 312th and 313th data segments of each data field and reproduces those segments as a read output signal four data-segment intervals (i. e., 3328 symbol epochs) later. The memory 4352 in specific FIG. 35 DTV receiver apparatus for extracting CIR from ECR signals per FIG. 37 stores the Nth, (N+1)th and (N+2)th data segments of each data field and reproduces those segments as a read output signal one data field time later.

The computer 38 operates somewhat differently in the DTV receiver for usefully receiving DTV signal including FIG. 37 ECR signal of the specific type in which the interleaved repetitive-PN sequences in the final half of each ECR signal are essentially complementary to those in the initial half. This, owing to the polarity of the CIR written to the memory 36 in initial fields of data frames being opposite in polarity to the CIR written to the memory 36 in final fields of data frames. Accordingly, the computer 38 takes into account whether the signal read to it from the memory 36 is a close approximation to CIR or to its complement. This is usually done by the computer 38 in initial procedures of converting close approximations to the complement of CIR to close approximations to CIR. This is done utilizing information concerning whether the current field is even or is odd, made available to the computer 38 from the symbol counter 34 via connection not explicitly shown in FIG. 40.

Modifying the trellis-code encoder 414 shown in FIG. 26 so as to apply the complement of the modulo-2 symbol count to the OR gate 414A, instead of the modulo-2 symbol count itself, causes the following effects. The 8VSB symbols that occur in ECR signals when the modulo-2 symbol count itself is odd will be from the second coset of 8VSB symbols having −7, −5, +1 and +3 normalized modulation levels. The symbols that occur in ECR signals when the modulo-2 symbol count itself is even will be from the first coset having −3, −1, +5 and +7 normalized modulation levels. Modifying the trellis-code encoder 514 shown in FIG. 39 so as to apply the complement of the modulo-2 symbol count to the OR gate 5147, instead of the modulo-2 symbol count itself, causes similar effects.

In other aspects of the invention any one of the ECR signals depicted in FIGS. 28, 37 and 38 is modified such that the two interleaved repetitive-PN511 sequences approximate the same repetitive-PN511 sequence, one of the interleaved sequences using the first coset of symbols with −3 and −1 and +5 and +7 normalized modulation levels, and the other of the interleaved sequences using the second coset of symbols with −7 and −5 and +1 and +3 normalized modulation levels. This can result in some loss in resolution when determining CIR, however.

In still other aspects of the invention any one of the ECR signals depicted in FIGS. 28, 37 and 38 is modified such that one of the interleaved repetitive-PN511 sequences consists of symbols with −5 and +3 normalized modulation levels. The other interleaved repetitive-PN511 sequence consists of symbols with −3 and −1 and +5 and +7 normalized modulation levels. The transmitter and receiver modifications associated with such modifications are readily made by those skilled in the art of DTV system design based on acquaintance with the teachings of the foregoing specification and the accompanying drawing.

In another aspect of the invention an ECR signal that consists of symbols with −5 and +3 normalized modulation levels is included only in occasional data frames, such as every twentieth frame by way of specific example, rather than in every successive data frame. In other aspects of the invention the other types of ECR signals described herein are included only in occasional data frames, rather than in every successive data frame.

The invention has been described with specific regard to generation of long-duration ECR signals to support computation of CIR by methods of Dietrich-Greenberg type. CIR is then used as the basis for computing the weighting coefficients of adaptive equalization filtering. Long-duration ECR signals constructed from repetitive-PN sequences facilitate the computation of CIR. Such ECR signals are also useful for converging the weighting coefficients of adaptive equalization filtering using auto-regression procedures as first taught by Norbert Wiener. Furthermore, in accordance with broader aspects of the invention, other long-duration sequences of known symbols can be generated that extend over most of a segment of an interleaved data field or over more than one segment of an interleaved data field. The foregoing specification teaches relocating R-S parity bytes in segments of the data field subsequently subjected to convolutional byte interleaving and ⅔ trellis coding at the transmitter, so sequences of known symbols can be generated that extend to the conclusion of a segment of an interleaved data field. This teaching is also one of the broader aspects of the invention.

Those skilled in the art of DTV system design will, by acquaintance with the foregoing specification and the accompanying drawing, be enabled to design a variety of different DTV broadcast systems incorporating into their interleaved and trellis-coded data fields ECR signals of the general type described, having component portions that when combined closely approximate a repetitive-PN sequence useful for measuring CIR. Acquaintance with the foregoing specification and the accompanying drawing will also enable those persons to design a variety of different DTV broadcast systems using other types of ECR signals that span substantially a full segment of interleaved (⅔)-trellis-coded data or a plurality of such data segments, without having to sacrifice Reed-Solomon forward-error-correction coding. The scope of the invention and the claims descriptive thereof should be judged accordingly.

In the claims that follow, the word "said" indicates that the succeeding noun finds antecedent basis earlier in the claim or in a preceding claim, and the article "the" is used for purposes other than indicating that the succeeding noun finds antecedent basis earlier in the claim or in a preceding claim.

What is claimed is:

1. A receiver for usefully receiving the a vestigial-sideband amplitude-modulation signal manifested in electromagnetic field variations wherein the modulating signal is an digital signal formed in accordance with values selected from an eight-value symbol alphabet and superposed on a pedestal, said digital signal being composed of successive frames each composed of two respective fields of symbols of said digital signal, each said field being composed of a respective initial segment of 832 symbols succeeded by respective 312 consecutive further segments of 832 symbols apiece, the four initial symbols of each of said segments of 832 symbols being a prescribed data segment synchronizing signal sequence, the final 828 symbols of said 312 further segments of each said field of digital symbols being such as result from the interleaving of bytes of (207, 187) Reed-Solomon codewords followed by prescribed ⅔ trellis coding, at least some of said fields of digital symbols including a respective succession of at least 832 symbols with respective fixed values designed for utilization as an echo-cancellation reference (ECR) signal, the symbols in each succession of symbols designed for utilization as an ECR signal being preceded by twenty-four consecutive symbols of a respective transitional code and thereafter approximating a repetitive-PN1023 sequence using only two levels of said modulating signal, said receiver comprising:

apparatus connected for reproducing said modulating signal in response to said vestigial-sideband amplitude-modulation signal and supplying a reproduced modulating signal in digital form;

pedestal-suppression circuitry connected to receive said reproduced modulating signal and to supply a substantially pedestal-free response to said reproduced modulating signal;

a PN1023 match filter connected for responding to said substantially pedestal-free response of said pedestal-suppression circuitry to supply measurements of channel impulse response in the time domain during the periods that said ECR signals are reproduced within said reproduced modulating signal; and adaptive filtering circuitry connected for adjustment of a kernel thereof responsive to computations based on said measurements of channel impulse response supplied during the periods that said ECR signals are reproduced within said reproduced modulating signal, said adaptive filtering circuitry further connected for generating equalized reproduced modulating signal responsive to said reproduced modulating signal.

2. A receiver as set forth in claim 1, wherein said pedestal-suppression circuitry is adapted for responding to said two levels of said modulating signal approximating a repetitive-PN1023 sequence with 001 or 101 symbols from said eight-value symbol alphabet that map to −5 and +3 levels superposed on said pedestal being of +1.25 level, the respective values from said eight-value symbol alphabet mapping to −7, −5, −3, −1, +1, +3, +5 and +7 levels superposed on said pedestal being of +1.25 level.

3. A receiver for usefully receiving at least one certain sort of vestigial-sideband amplitude-modulation signal manifested in electromagnetic field variations wherein the modulating signal is a digital signal formed in accordance with values selected from an eight-value symbol alphabet and superposed on a pedestal, said digital signal being composed of successive frames each composed of two respective fields of symbols of said digital signal, each said field being composed of a respective initial segment of 832 symbols succeeded by respective 312 consecutive further segments of 832 symbols apiece, the four initial symbols of each of said segments of 832 symbols being a prescribed data segment synchronizing signal sequence, the final 828 symbols of said 312 further segments of each said field of digital symbols being such as result from the interleaving of bytes of (207, 187) Reed-Solomon codewords followed by prescribed ⅔ trellis coding, at least some of said fields of digital symbols including at least one respective succession of at least 832 symbols with respective fixed values designed for utilization as one of a number of periodically recurring echo-cancellation reference (ECR) signals, the symbols in each succession of symbols designed for utilization as an ECR signal being preceded by twenty-four consecutive symbols of a respective transitional code and thereafter using at least four levels formed in accordance with values from said eight-value symbol alphabet and superposed on said pedestal, said receiver comprising:
- apparatus connected for reproducing said modulating signal in response to said vestigial-sideband amplitude-modulation signal and supplying a reproduced modulating signal in digital form, which said reproduced modulating signal includes reproduced further segments of at least one said field of digital symbols that includes at least one of said successions of symbols with respective fixed values designed for utilization as ECR signals;
- an adaptive channel-equalization filter having an adjustable kernel, connected for generating equalized reproduced modulating signal responsive to said reproduced modulating signal;
- circuitry for generating selective responses to respective portions of said reproduced modulating signal, each consisting of at least part of one of said successions of symbols with respective fixed values designed for utilization as ECR signals and using said at least four levels; and
- apparatus for computing kernel weights for said adjustable kernel of said adaptive channel-equalization filter based on said selective responses to respective portions of said reproduced modulating signal, each consisting of at least part of one of said successions of symbols with respective fixed values designed for utilization as ECR signals and using said at least four levels.

4. A receiver as set forth in claim 3, wherein said circuitry for generating selective responses to respective portions of said reproduced modulating signal each consisting of at least part of one of said successions of symbols with respective fixed values designed for utilization as ECR signals comprises
- pedestal-suppression circuitry connected to receive said reproduced modulating signal and to supply a substantially pedestal-free response to said reproduced modulating signal; and wherein said apparatus for computing the initial kernel weights for said adjustable kernel of said adaptive channel-equalization filter comprises
- a PN1023 match filter connected for responding to said substantially pedestal-free response of said pedestal-suppression circuitry to supply measurements of channel impulse response in the time domain during the periods that said ECR signals are reproduced within said reproduced modulating signal, said adaptive filtering circuitry connected for adjustment of said kernel thereof responsive to said measurements of channel impulse response.

5. A receiver as set forth in claim 3 for usefully receiving vestigial-sideband amplitude-modulation signal of the sort in which said successions of symbols with respective fixed values designed for utilization as ECR signals contain substantially equal numbers of the eight different symbols from said eight-value symbol alphabet.

6. A receiver as set forth in claim 5 for usefully receiving vestigial-sideband amplitude-modulation signal of the sort in which each of said ECR signals is composed of symbols descriptive of first and second expanded repetitive-PN511 sequences interleaved together symbol by symbol and superposed on a pedestal, in which said receiver said circuitry for generating selective responses to respective portions of said reproduced modulating signal each consisting of at least part of one of said successions of symbols with respective fixed values designed for utilization as ECR signals comprises
- pedestal-suppression circuitry connected to receive said reproduced modulating signal and to supply a substantially pedestal-free response to said reproduced modulating signal; and wherein said apparatus for computing kernel weights for said adjustable kernel of said adaptive channel-equalization filter comprises
- a match filter network for first and second expanded repetitive-PN511 sequences interleaved together symbol by symbol, connected for responding to said substantially pedestal-free response of said pedestal-suppression circuitry to supply measurements of channel impulse response in the time domain, said adaptive channel-equalization filter connected for adjustment of said kernel thereof responsive to said measurements of channel impulse response.

7. A receiver as set forth in claim 5 wherein said adaptive channel-equalization filter is arranged for said kernel thereof being adjusted by Wiener-type auto-regression techniques based on said selective responses to respective portions of said reproduced modulating signal each consisting of at least part of one of said successions of symbols with respective fixed values designed for utilization as ECR signals.

8. A receiver as set forth in claim 3 wherein said adaptive channel-equalization filter is arranged for said kernel thereof being adjusted by Wiener-type auto-regression techniques based on said selective responses to respective portions of said reproduced modulating signal each consisting of at least part of one of said successions of symbols with respective fixed values designed for utilization as ECR signals.

9. A receiver for usefully receiving at least one certain sort of vestigial-sideband amplitude-modulation signal manifested in electromagnetic field variations wherein the modulating signal is a digital signal formed in accordance with values selected from an eight-value symbol alphabet and superposed on a pedestal, said digital signal composed of successive frames each composed of two respective fields of symbols of said digital signal, each said field composed of a respective initial segment of 832 symbols succeeded by respective 312 consecutive further segments of 832 symbols apiece, the four initial symbols of each of said segments of 832 symbols being a prescribed data segment synchronizing signal sequence, the final 828 symbols of said 312 further segments of each said field of digital symbols being consistent with prescribed ⅔ trellis coding, at least some of said fields including respective successions of symbols with respective standard fixed values designed for utilization as first components of echo-cancellation reference (ECR) signals, at least some of said fields including respective successions symbols with respective standard fixed values designed for utilization as second components of said ECR signals delayed a specified time respective to respective ones of said first components of said ECR signals, said first and said second components of each one of said ECR signals differing from each other but both containing a similar number at least 832 of symbols therewithin, said first and said second components of each one of said ECR signals composed of at least four levels of said modulating signal and designed for being combined in receivers to reproduce a respective complete one of said ECR signals, said receiver comprising:
- apparatus connected for reproducing said modulating signal in response to said vestigial-sideband amplitude-modulation signal and supplying a reproduced modulating signal in digital form including reproduced first and second components of said ECR signals composed of at least four levels of said modulating signal;
- an adaptive channel-equalization filter having an adjustable kernel, connected for generating equalized reproduced modulating signal responsive to said reproduced modulating signal;

memory connected for delaying said reproduced first components of said ECR signals from said reproduced modulating signal and supplying delayed reproduced first components of said ECR signals concurrently with said corresponding reproduced second components of said ECR signals from said reproduced modulating signal;

apparatus for combining said delayed reproduced first components of said ECR signals from said memory and said reproduced second components of said ECR signals from said reproduced modulating signal on a symbol by symbol basis to generate reproduced complete ones of said ECR signals; and apparatus for computing kernel weights for said adjustable kernel of said adaptive channel-equalization filter based on said selective responses to respective portions of said reproduced modulating signal, each consisting of at least part of one of said reproduced complete ones of said ECR signals.

10. A receiver as set forth in claim 9; said certain sort of vestigial-sideband amplitude-modulation signals that is usefully received by said receiver characterized by pairs of more significant bits of said respective fixed values of said successions of symbols designed for utilization as first components of ECR signals corresponding with pairs of more-significant bits of said respective fixed values of said successions of symbols designed for utilization as second components of ECR signals before less-significant respective parity bits are appended to said pairs of more significant bits by said ⅔ trellis coding, and each one of said successions of symbols designed for respective utilization as said first and second components of each said ECR signal being conditioned by a respective preceding transitional code to have less-significant respective parity bits after said ⅔ trellis coding that are complementary to the less-significant respective parity bits after said ⅔ trellis coding of the other said succession of symbols designed for utilization as the other of said first and second components of the same said ECR signal; and in which said receiver said apparatus for combining said delayed first components of said ECR signals from said memory and said second components of said ECR signals from said reproduced modulating signal on a symbol by symbol basis for reproducing said complete ones of said ECR signals comprises:

a digital adder connected for additively combining said delayed first components of said ECR signals from said memory and said second components of said ECR signals from said reproduced modulating signal, thereby generating a succession of digital sum signal samples.

11. A receiver as set forth in claim 10, said certain sort of vestigial-sideband amplitude-modulation signals that is usefully received by said receiver characterized by said first and said second components of each of said ECR signals being designed to be additively combined to approximate at least one cycle of a PN1023 sequence, said receiver further comprising:

a PN1023 match filter network connected for responding to said succession of digital sum signal samples to supply measurements of channel impulse response in the time domain, said adaptive channel-equalization filter being connected for adjustment of said kernel thereof responsive to computations based on said measurements of channel impulse response.

12. A receiver as set forth in claim 10; said certain sort of vestigial-sideband amplitude-modulation signals that is usefully received by said receiver characterized by said first component of each one of said ECR signals approximating first and second expanded repetitive-PN511 sequences interleaved together symbol by symbol, said second component of each one of said ECR signals approximating the complement of said first expanded repetitive-PN511 sequence and the complement of said second expanded repetitive-PN511 sequence interleaved together symbol by symbol, a first four-level coset of said eight-value symbol alphabet approximating said first expanded repetitive-PN511 sequence in both said first and said second components of each one of said ECR signals, a second four-level coset of said eight-value symbol alphabet approximating said second expanded repetitive-PN511 sequence in both said first and said second components of each one of said ECR signals, and said second four-level coset sharing no level in common with said first four-level coset; said receiver further comprising:

a match filter network for said first and said second expanded repetitive-PN511 sequences interleaved together symbol by symbol, said match filter network connected for responding to said succession of digital difference signal samples to supply measurements of channel impulse response in the time domain, said adaptive channel-equalization filter being connected for adjustment of said kernel thereof responsive to computations based on said measurements of channel impulse response.

13. A receiver as set forth in claim 9; in which said receiver said certain sort of vestigial-sideband amplitude-modulation signals that is usefully received is characterized by pairs of more significant bits of said respective fixed values of said successions of symbols designed for utilization as first components of ECR signals corresponding with pairs of more-significant bits of said respective fixed values of said successions of symbols designed for utilization as second components of ECR signals before less-significant respective parity bits are appended to said pairs of more significant bits by said ⅔ trellis coding, said successions of symbols designed for respective utilization as said first and second components of each said ECR signal both using only the same four symbols of said eight-value symbol alphabet, said four symbols of said eight-value symbol alphabet differing from each other only in regard to their respective most-significant bits or their respective least-significant bits or both their respective most-significant bits and their respective least-significant bits, and each one of said successions of symbols designed for respective utilization as said first and second components of each said ECR signal being conditioned by a respective preceding transitional code to have less-significant respective parity bits after said ⅔ trellis coding that are complementary to the less-significant respective parity bits after said ⅔ trellis coding of the other said succession of symbols designed for utilization as the other of said first and second components of the same said ECR signal,; and in which said receiver said apparatus for combining said delayed first components of said ECR signals from said memory and said second components of said ECR signals from said reproduced modulating signal on a symbol by symbol basis for reproducing said complete ones of said ECR signals comprises:

a digital adder connected for additively combining said delayed first components of said ECR signals from said memory and said second components of said ECR signals from said reproduced modulating signal, thereby generating a succession of digital sum signal samples.

14. A receiver as set forth in claim 13; in which said receiver said certain sort of vestigial-sideband amplitude-modulation signals that is usefully received is characterized by
   said first and said second components of each of said ECR signals are designed for being additively combined to approximate at least one cycle of a PN1023 sequence; said receiver further comprising:
   a PN1023 match filter network connected for responding to said succession of digital sum signal samples to supply measurements of channel impulse response in the time domain, said adaptive channel-equalization filter being connected for adjustment of said kernel thereof responsive to computations based on said measurements of channel impulse response.

15. A receiver as set forth in claim 9; in which said receiver said certain sort of vestigial-sideband amplitude-modulation signals that is usefully received is characterized by
   pairs of more significant bits of said respective fixed values of said successions of symbols designed for utilization as first components of ECR signals corresponding with pairs of more-significant bits of said respective fixed values of said successions of symbols designed for utilization as second components of ECR signals before less-significant respective parity bits are appended to said pairs of more significant bits by said ⅔ trellis coding,
   each one of said successions of symbols designed for respective utilization as said first and second components of each said ECR signal being conditioned by a respective preceding transitional code to have less-significant respective parity bits after said ⅔ trellis coding that are complementary to the less-significant respective parity bits after said ⅔ trellis coding of the other said succession of symbols designed for utilization as the other of said first and second components of the same said ECR signal,
   said successions of symbols designed for respective utilization as said first and second components of each said ECR signal both using only the 010 and 011 and 110 and 111 symbols of said eight-value symbol alphabet, and
   said successions of symbols designed for respective utilization as said first and second components of each said ECR signal preceded by respective transitional coding conditioning their respective successive least-significant bits to be complementary to each other; and in which said receiver said apparatus for combining said delayed first components of said ECR signals from said memory and said second components of said ECR signals from said reproduced modulating signal on a symbol by symbol basis for reproducing said complete ones of said ECR signals comprises:
   a digital adder connected for additively combining said delayed first components of said ECR signals from said memory and said second components of said ECR signals from said reproduced modulating signal, thereby generating a succession of digital sum signal samples.

16. A receiver as set forth in claim 15, in which said receiver said certain sort of vestigial-sideband amplitude-modulation signals that is usefully received is characterized by
   said first and said second components of each of said ECR signals being designed to be additively combined to approximate at least one cycle of a PN1023 sequence, said receiver further comprising:
   a PN1023 match filter network connected for responding to said succession of digital sum signal samples to supply measurements of channel impulse response in the time domain, said adaptive channel-equalization filter being connected for adjustment of said kernel thereof responsive to computations based on said measurements of channel impulse response.

17. A receiver as set forth in claim 9; in which said receiver said certain sort of vestigial-sideband amplitude-modulation signals that is usefully received is characterized by
   pairs of more significant bits of said respective fixed values of said successions of symbols designed for utilization as first components of ECR signals being complementary to pairs of more significant bits of said respective fixed values of said successions of symbols designed for utilization as second components of ECR signals before less significant respective parity bits are appended to said pairs of more significant bits by said ⅔ trellis coding, and
   at least one of said successions of symbols designed for respective utilization as said first and second components of each said ECR signal being conditioned by a respective preceding transitional code to have less significant respective parity bits after said ⅔ trellis coding that are similar to the less significant respective parity bits after said ⅔ trellis coding of said succession of symbols designed for utilization as the other of said first and second components of the same said ECR signal; and in which said receiver said apparatus for combining said delayed first components of said ECR signals from said memory and said second components of said ECR signals from said reproduced modulating signal on a symbol by symbol basis for reproducing said complete ones of said ECR signals comprises:
   a digital subtractor connected for differentially combining said delayed first components of said ECR signals from said memory with said second components of said ECR signals from said reproduced modulating signal, thereby generating a succession of digital difference signal samples.

18. A receiver as set forth in claim 17, in which said receiver said certain sort of vestigial-sideband amplitude-modulation signals that is usefully received is characterized by
   said first and said second components of each of said ECR signals being designed to be differentially combined to approximate at least one cycle of a PN1023 sequence, said receiver further comprising:
   a PN1023 match filter network connected for responding to said succession of digital difference signal samples to supply measurements of channel impulse response in the time domain, said adaptive channel-equalization filter being connected for adjustment of a kernel thereof responsive to computations based on said measurements of channel impulse response.

19. A receiver as set forth in claim 17; in which said receiver said certain sort of vestigial-sideband amplitude-modulation signals that is usefully received is characterized by
   said first component of each one of said ECR signals approximates first and second expanded repetitive-PN511 sequence interleaved together symbol by symbol, said second component of each one of said ECR signals approximates the complement of said first expanded repetitive-PN511 sequence and the complement of said second expanded repetitive-PN511 sequence interleaved together symbol by symbol, a first four-level coset of said eight-value symbol alphabet is used for approximating said first expanded repetitive-PN511 sequence in both said first and said second components of each one of said ECR signals, a second four-level coset of said eight-value symbol alphabet is used for approximating said second expanded repetitive-PN511 sequence in both said first and said second components of each one of said ECR signals, and said second four-level coset shares no level in common with said first four-level coset; said receiver further comprising:

a match filter network for said first and said second expanded repetitive-PN511 sequences interleaved together symbol by symbol, said match filter network connected for responding to said succession of digital difference signal samples to supply measurements of channel impulse response in the time domain, said adaptive channel-equalization filter being connected for adjustment of said kernel thereof responsive to computations based on said measurements of channel impulse response.

20. A receiver as set forth in claim 9; in which said receiver said certain sort of vestigial-sideband amplitude-modulation signals that is usefully received is characterized by pairs of more significant bits of said respective fixed values of said successions of symbols designed for utilization as first components of ECR signals being complementary to pairs of more significant bits of said respective fixed values of said successions of symbols designed for utilization as second components of ECR signals before less significant respective parity bits are appended to said pairs of more significant bits by said ⅔ trellis coding, said successions of symbols designed for respective utilization as said first and second components of each said ECR signal both using only the same four symbols of said eight-value symbol alphabet, said four symbols of said eight-value symbol alphabet differing from each other only in regard to their respective most-significant bits or their respective least-significant bits or both their respective most-significant bits and their respective least-significant bits, and at least one of said successions of symbols designed for respective utilization as said first and second components of each said ECR signal being conditioned by a respective preceding transitional code to have less significant respective parity bits after said ⅔ trellis coding that are similar to the less significant respective parity bits after said ⅔ trellis coding of said succession of symbols designed for utilization as the other of said first and second components of the same said ECR signal; and in which said receiver said apparatus for combining said delayed first components of said ECR signals from said memory and said second components of said ECR signals from said reproduced modulating signal on a symbol by symbol basis for reproducing said complete ones of said ECR signals comprises:

a digital subtractor connected for differentially combining said delayed first components of said ECR signals from said memory with said second components of said ECR signals from said reproduced modulating signal, thereby generating a succession of digital difference signal samples.

21. A receiver as set forth in claim 20, in which said receiver said certain sort of vestigial-sideband amplitude-modulation signals that is usefully received is characterized by said first and said second components of each of said ECR signals being designed to be differentially combined to approximate at least one cycle of a PN1023 sequence, said receiver further comprising:

a PN 1023 match filter network connected for responding to said succession of digital difference signal samples to supply measurements of channel impulse response in the time domain, said adaptive channel-equalization filter being connected for adjustment of a kernel thereof responsive to computations based on said measurements of channel impulse response.

22. A receiver as set forth in claim 9; in which said receiver said certain sort of vestigial-sideband amplitude-modulation signals that is usefully received is characterized by pairs of more significant bits of said respective fixed values of said successions of symbols designed for utilization as first components of ECR signals being complementary to pairs of more significant bits of said respective fixed values of said successions of symbols designed for utilization as second components of ECR signals before less significant respective parity bits are appended to said pairs of more significant bits by said ⅔ trellis coding, said successions of symbols designed for respective utilization as said first and second components of each said ECR signal both using only the 010 and 011 and 110 and 111 symbols of said eight-value symbol alphabet, and at least one of said successions of symbols designed for respective utilization as said first and second components of each said ECR signal being conditioned by a respective preceding transitional code to have less significant respective parity bits after said ⅔ trellis coding that are similar to the less significant respective parity bits after said ⅔ trellis coding of said succession of symbols designed for utilization as the other of said first and second components of the same said ECR signal; and in which said receiver said apparatus for combining said delayed first components of said ECR signals from said memory and said second components of said ECR signals from said reproduced modulating signal on a symbol by symbol basis for reproducing said complete ones of said ECR signals comprises:

a digital subtractor connected for differentially combining said delayed first components of said ECR signals from said memory with said second components of said ECR signals from said reproduced modulating signal, thereby generating a succession of digital difference signal samples.

23. A receiver as set forth in claim 22, in which said receiver said certain sort of vestigial-sideband amplitude-modulation signals that is usefully received is characterized by said first and said second components of each of said ECR signals being designed to be differentially combined to approximate at least one cycle of a PN1023 sequence, said receiver further comprising:

a PN1023 match filter network connected for responding to said succession of digital difference signal samples to supply measurements of channel impulse response in the time domain, said adaptive channel-equalization filter being connected for adjustment of a kernel thereof responsive to computations based on said measurements of channel impulse response.

24. A receiver as set forth in claim 9; in which said receiver said certain sort of vestigial-sideband amplitude-modulation signals that is usefully received is characterized by pairs of more significant bits of said respective fixed values of said successions of symbols designed for utilization as first components of ECR signals being complementary to pairs of more significant bits of said respective fixed values of said successions of symbols designed for utilization as second components of ECR signals before less significant respective parity bits are appended to said pairs of more significant bits by said ⅔ trellis coding, said successions of symbols designed for respective utilization as said first and second components of each said ECR signal both use only the same two symbols of said eight-value symbol alphabet each having a ZERO secondmost-significant bit, at least one of said successions of symbols designed for respective utilization as said first and second components of each said ECR signal being conditioned by a respective preceding transitional code to have less significant respective parity bits after said ⅔ trellis coding that are similar to the less significant respective parity bits after said ⅔ trellis coding of said succession of symbols designed for utilization as the other of said first and second components of the same said ECR signal; and in which said receiver said apparatus for combining said delayed first components of said ECR signals from said memory and said second components of said ECR signals from said reproduced modulating signal on a symbol by symbol basis for reproducing said complete ones of said ECR signals comprises:

a digital subtractor connected for differentially combining said delayed first components of said ECR signals from said memory with said second components of said ECR signals from said reproduced modulating signal, thereby generating a succession of digital difference signal samples.

25. A receiver as set forth in claim 24, in which said receiver said certain sort of vestigial-sideband amplitude-modulation signals that is usefully received is characterized by said first and said second components of each of said ECR signals being designed to be differentially combined to approximate at least one cycle of a PN1023 sequence, said receiver further comprising:

a PN1023 match filter network connected for responding to said succession of digital difference signal samples to supply measurements of channel impulse response in the time domain, said adaptive channel-equalization filter being connected for adjustment of a kernel thereof responsive to computations based on said measurements of channel impulse response.

26. A receiver as set forth in claim 9; in which said receiver said certain sort of vestigial-sideband amplitude-modulation signals that is usefully received is characterized by pairs of more significant bits of said respective fixed values of said successions of symbols designed for utilization as first components of ECR signals being complementary to pairs of more significant bits of said respective fixed values of said successions of symbols designed for utilization as second components of ECR signals before less significant respective parity bits are appended to said pairs of more significant bits by said ⅔ trellis coding, said successions of symbols designed for respective utilization as said first and second components of each said ECR signal both using only the 001 and 101 symbols of said eight-value symbol alphabet, at least one of said successions of symbols designed for respective utilization as said first and second components of each said ECR signal being conditioned by a respective preceding transitional code to have less significant respective parity bits after said ⅔ trellis coding that are similar to the less significant respective parity bits after said ⅔ trellis coding of said succession of symbols designed for utilization as the other of said first and second components of the same said ECR signal; and in which said receiver said apparatus for combining said delayed first components of said ECR signals from said memory and said second components of said ECR signals from said reproduced modulating signal on a symbol by symbol basis for reproducing said complete ones of said ECR signals comprises:

a digital subtractor connected for differentially combining said delayed first components of said ECR signals from said memory with said second components of said ECR signals from said reproduced modulating signal, thereby generating a succession of digital difference signal samples.

27. A receiver as set forth in claim 26, in which said receiver said certain sort of vestigial-sideband amplitude-modulation signals that is usefully received is characterized by said first and said second components of each of said ECR signals are designed for being differentially combined to approximate at least one cycle of a PN1023 sequence, said receiver further comprising:

a PN1023 match filter network connected for responding to said succession of digital difference signal samples to supply measurements of channel impulse response in the time domain, said adaptive channel-equalization filter being connected for adjustment of a kernel thereof responsive to computations based on said measurements of channel impulse response.

* * * * *